US012724877B1

(12) United States Patent
Kocher

(10) Patent No.: US 12,724,877 B1

(45) Date of Patent: Sep. 1, 2026

(54) SECURE ENVIRONMENT PUBLIC REGISTER (SEPR)

(71) Applicant: P4 X Group, Inc., Miami, FL (US)

(72) Inventor: Robert William Kocher, McLean, VA (US)

(73) Assignee: P4 X Group, Inc., Miami, FL (US)

( * ) Notice: Subject to any disclaimer, the term of this patent is extended or adjusted under 35 U.S.C. 154(b) by 0 days.

(21) Appl. No.: 19/443,728

(22) Filed: Jan. 8, 2026

Related U.S. Application Data

(63) Continuation of application No. 19/041,956, filed on Jan. 30, 2025, now Pat. No. 12,566,841, which is a continuation-in-part of application No. 18/376,776, filed on Oct. 4, 2023, now Pat. No. 12,254,084, which is a continuation of application No. 17/986,037, filed on Nov. 14, 2022, now Pat. No. 11,797,666.

(60) Provisional application No. 63/282,012, filed on Nov. 22, 2021.

(51) Int. Cl.
*G06F 21/53* (2013.01)
*G07B 15/00* (2011.01)

(52) U.S. Cl.
CPC ............ *G06F 21/53* (2013.01); *G07B 15/00* (2013.01); *G06F 2221/034* (2013.01); *G06Q 2240/00* (2013.01)

(58) Field of Classification Search
CPC ... G06F 21/53; G06F 2221/034; G07B 15/00; G06Q 2240/00
See application file for complete search history.

(56) References Cited

U.S. PATENT DOCUMENTS

| | | | |
|---|---|---|---|
| 6,389,402 | B1 | 5/2002 | Ginter et al. |
| 7,143,062 | B2 | 11/2006 | Turk et al. |
| 8,032,436 | B2 | 10/2011 | Dailey et al. |
| 8,577,689 | B1 | 11/2013 | Czarnetzky |
| 8,626,641 | B1 | 1/2014 | Merk |
| 9,990,625 | B2 | 6/2018 | Pitroda et al. |
| 10,140,658 | B1 | 11/2018 | Bagherzadeh |
| 10,970,549 | B1 | 4/2021 | Krishnan et al. |
| 11,386,492 | B1 | 7/2022 | Weiner |
| 2005/0044022 | A1 | 2/2005 | Spirgel et al. |

(Continued)

FOREIGN PATENT DOCUMENTS

WO WO 2024/107360 A1 5/2024

OTHER PUBLICATIONS

International Search Report (PCT/ISA/220 and PCT/ISA/210) issued in PCT Application No. PCT/US2025/015573 dated May 19, 2025 (4 pages).

(Continued)

*Primary Examiner* — A. Hunter Wilder
*Assistant Examiner* — Hunter Wilder
(74) *Attorney, Agent, or Firm* — Crowell & Moring LLP

(57) ABSTRACT

A Secure Environment Public Register (SEPR) provides a method and system that allow precious metals in the shape of bar(s) or units to be certified, specially numbered to provide exact linkage to an owner, allow secure movement of precious metals between secure facilities, and, through Blockchain, allow secure transfer of ownership between individuals and organizations. The SEPR allows gold and other precious metals to be easily held and traded in commerce with all the advantages of holding precious metals. The SEPR system allows exact audits of the metal bars on hand and avoids over-selling units since each bar is serialized and ownership is documented in a public register.

2 Claims, 31 Drawing Sheets

1600

1610 PSE SERVICE CENTER PUBLISHES CONVERSION PRICES BASED ON PRECIOUS METAL TYPE, QUALITY, WEIGHT, TARGET PSE PROCESSING FACILITY AND TARGET PSE STORAGE FACILITY

1620 PSE ACCOUNT HOLDER FILLS OUT CONVERSION FORM WITH OPTIONS FROM PUBLISHED CONVERSION PRICES, SENDS CONVERSION FORM TO PSE SERVICE CENTER, AND SHIPS NON-PSE PRECIOUS METAL TO TARGET PSE PROCESSING FACILITY

1630 PSE SERVICE CENTER SENDS CONVERSION FORM INFORMATION TO TARGET PSE PROCESSING FACILITY TO DETERMINE ANY DISCREPANCIES IN RECEIVED NON-PSE PRECIOUS METAL TO CONVERSION FORM DATA FROM PSE ACCOUNT HOLDER

1640 PSE PROCESSING CENTER PROCESSES NON-PSE PRECIOUS METAL INTO CERTIFIED PRECIOUS METAL UNIT(S) PER CONVERSION FORM DATA FROM PSE ACCOUNT HOLDER

1650 PSE PROCESSING CENTER CHARGES CONVERSION COSTS OF PRECIOUS METAL OF PSE ACCOUNT HOLDER BY 1) REDUCING A CERTIFIED PRECIOUS METAL UNIT VALUE BY THE CONVERSION COSTS, OR 2) CHARGING THE ACCOUNT HOLDER TO PAY THE CONVERSION COST IN A CURRENCY

1660 PSE CERTIFICATION FACILITY CERTIFIES THE PROCESSED PRECIOUS METAL UNITS AND PROVIDES A CUSIP-TYPE NUMBER AND/OR A UNIQUE SERIALIZED NUMBER FOR EACH CERTIFIED PRECIOUS METAL UNIT, AND TRANSMITS CERTIFICATION INFORMATION FOR THE CERTIFIED PRECIOUS METAL UNIT TO THE PSE SERVICE CENTER TO CREATE A CERTIFIED PRECIOUS METAL UNIT RECORD FOR STORAGE IN A CERTIFIED PRECIOUS METAL UNIT REGISTRY

1670 PSE FACILITY COORDINATES WITH PSE COURIER TO TRANSPORT CERTIFIED PRECIOUS METAL UNIT TO TARGET PSE STORAGE FACILITY AS DESIGNATED IN CONVERSION FORM, SHIP CERTIFIED PRECIOUS METAL UNIT WITH PSM COURIER ALONG PSE TRANSPORTION ROUTE TO TARGET STORAGE FACILITY, AND TRANSMIT SHIPPING STATUS INFORMATION TO PSE SERVICE CENTER TO UPDATE TRANSPORATION INFORMATION IN CERTIFIED PRECIOUS METAL UNIT RECORD

1680 RECEIVE CERTIFIED PRECIOUS METAL UNIT VIA PSE COURIER AT TARGET PSE STORAGE FACILITY AND TRANSMIT STORAGE STATUS INFORMAITON TO PSE SERVICE CENTER TO UPDATE STORAGE INFORMATION IN CERTIFIED PRECIOUS METAL UNIT RECORD

1690 PSE SERVICE CENTER UPDATES PSE ACCOUNT HOLDER ACCOUNT WITH NEWLY PROCESSED, CERTIFIED AND STORED CERTIFIED PRECIOUS METAL UNIT

(56) References Cited

U.S. PATENT DOCUMENTS

| | | | |
|---|---|---|---|
| 2007/0106612 | A1 | 5/2007 | O'Brien et al. |
| 2008/0167965 | A1 | 7/2008 | Von Nothaus et al. |
| 2009/0076941 | A1 | 3/2009 | Schneierson et al. |
| 2009/0164328 | A1 | 6/2009 | Bishop et al. |
| 2009/0172035 | A1 | 7/2009 | Lessing et al. |
| 2011/0047062 | A1 | 2/2011 | Kerschner et al. |
| 2012/0254009 | A1 | 10/2012 | Thorp |
| 2013/0073473 | A1 | 3/2013 | Heath |
| 2014/0025553 | A1 | 1/2014 | Jones et al. |
| 2014/0201033 | A1 | 7/2014 | Crain et al. |
| 2015/0066728 | A1 | 3/2015 | Newall |
| 2017/0024818 | A1 | 1/2017 | Wager et al. |
| 2019/0028276 | A1 | 1/2019 | Pierce et al. |
| 2019/0095987 | A1 | 3/2019 | Seergy et al. |
| 2019/0130484 | A1 | 5/2019 | de Jong |
| 2019/0188790 | A1 | 6/2019 | Lovato et al. |
| 2019/0251526 | A1 | 8/2019 | Jackson |
| 2019/0253256 | A1 | 8/2019 | Saab et al. |
| 2019/0337322 | A1 | 11/2019 | Tanko |
| 2021/0082044 | A1 | 3/2021 | Sliwka et al. |
| 2021/0158456 | A1 | 5/2021 | Morgan et al. |
| 2021/0201299 | A1 | 7/2021 | Hilton |
| 2021/0256070 | A1 | 8/2021 | Tran et al. |
| 2023/0074283 | A1 | 3/2023 | Malcolm |
| 2023/0082841 | A1 | 3/2023 | Marsh |
| 2024/0027706 | A1 | 1/2024 | Tadayon et al. |
| 2024/0028706 | A1 | 1/2024 | Kocher et al. |
| 2024/0112172 | A1 | 4/2024 | Wilson et al. |

OTHER PUBLICATIONS

Written Opinion (PCT/ISA/237) issued in Application No. PCT/US2025/015573 dated May 19, 2025 (8 pages).

International Search Report and Written Opinion issued in PCT Application No. PCT/US2023/036921 dated Dec. 21, 2023 (7 pages).

U.S. Non-Final Office Action issued in U.S. Appl. No. 18/933,425 dated Dec. 3, 2024 (13 pages).

U.S. Non-Final Office Action issued in U.S. Appl. No. 19/041,958 dated Mar. 19, 2025 (16 pages).

U.S. Non-Final Office Action issued in U.S. Appl. No. 19/041,959 dated Mar. 20, 2025 (16 pages).

U.S. Non-Final Office Action issued in U.S. Appl. No. 19/041,957 dated Mar. 25, 2025 (14 pages).

U.S. Non-Final Office Action issued in U.S. Appl. No. 19/041,961 dated Mar. 31, 2025 (16 pages).

U.S. Non-Final Office Action issued in U.S. Appl. No. 19/041,960 dated Apr. 2, 2025 (20 pages).

Strata Trust Company, "IRA Transfer Request: Precious Metal", Jul. 2017, https://www/stratatrust.com/content/uploads/2017/07/IRA-Transfer-Request_Precious-Metals.pdf, 2017, (3 pages).

Caton, J. et al., "Cryptoliquidity: The Blockchain and Monetary Stability." Journal of Entrepreneurship and Public Policy, Sep. 27, 2018, pp. 1-42 (42 pages).

Mohanty, D., "Supply Chain-Gold Tokenization, In: R3 Corda for Architects and Developers", Apress, Berkeley, CA, 2019, https://doi.org/10.1007/978-1-4842-4529-3_11 pp. 193-198 (6 pages).

Morris, C., "The London Bullion Market Association", Alchemist Issue Seveny Nine, Oct. 2015 (28 pages).

U.S. Non-Final Office Action issued in U.S. Appl. No. 19/205,326 dated Oct. 3, 2025 (19 pages).

U.S. Non-Final Office Action issued in U.S. Appl. No. 19/336,365 dated Dec. 9, 2025 (21 pages).

International Search Report (PCT/ISA/220 & PCT/ISA/210) issued in PCT Application No. PCT/US2026/011258 dated May 21, 2026 (5 pages).

Written Opinion (PCT/ISA/237) issued in PCT Application No. PCT/US2026/011258 dated May 21, 2026 (6 pages).

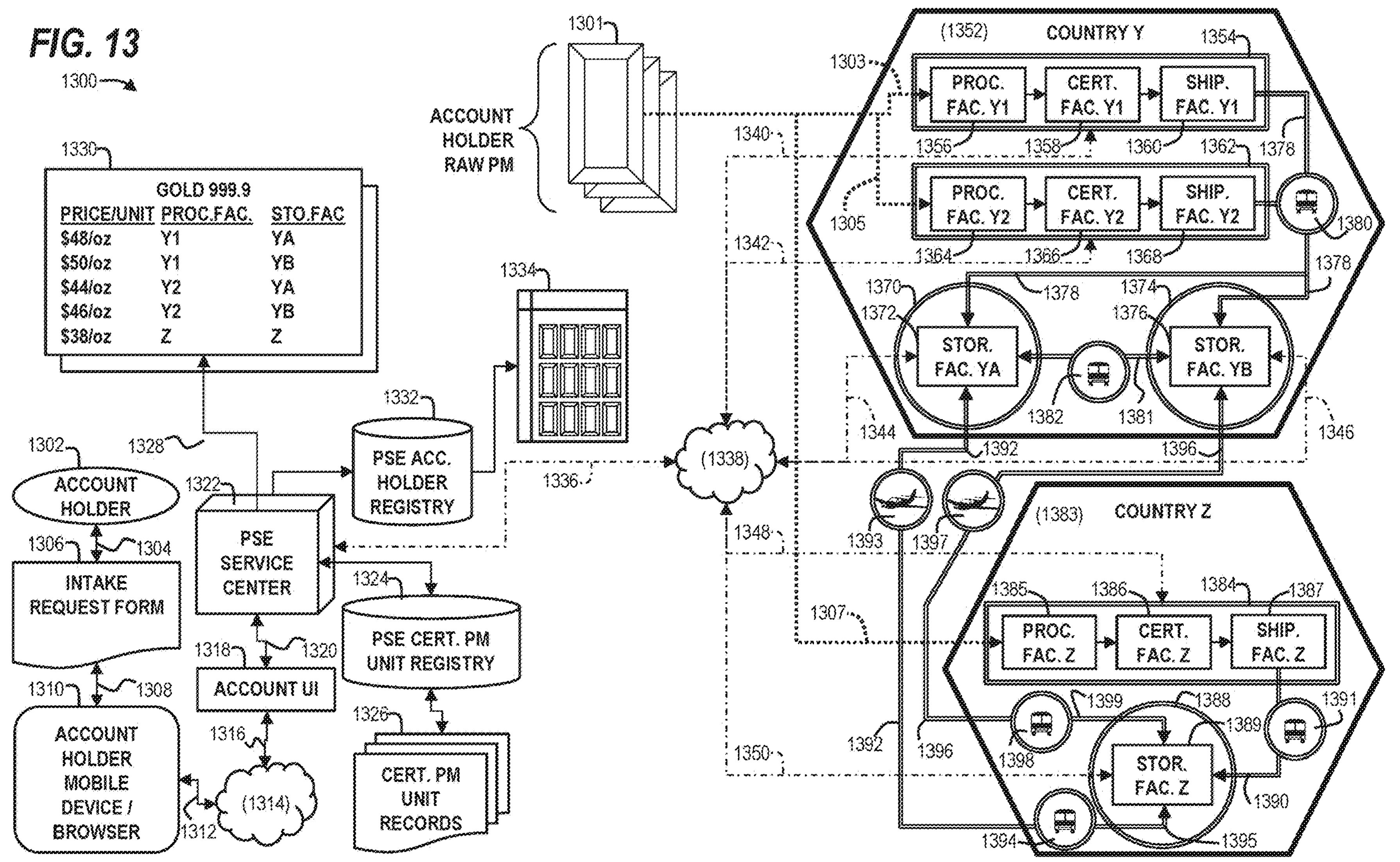
FIG. 13
1300
ACCOUNT HOLDER RAW PM
1301
GOLD 999.9
PRICE/UNIT PROC.FAC. STO.FAC
$48/oz Y1 YA
$50/oz Y1 YB
$44/oz Y2 YA
$46/oz Y2 YB
$38/oz Z Z
1330
COUNTRY Y
(1352)
PROC. FAC. Y1
CERT. FAC. Y1
SHIP. FAC. Y1
PROC. FAC. Y2
CERT. FAC. Y2
SHIP. FAC. Y2
STOR. FAC. YA
STOR. FAC. YB
COUNTRY Z
(1383)
PROC. FAC. Z
CERT. FAC. Z
SHIP. FAC. Z
STOR. FAC. Z
(1338)
(1314)
ACCOUNT HOLDER
INTAKE REQUEST FORM
ACCOUNT HOLDER MOBILE DEVICE / BROWSER
PSE SERVICE CENTER
ACCOUNT UI
PSE ACC. HOLDER REGISTRY
PSE CERT. PM UNIT REGISTRY
CERT. PM UNIT RECORDS
1302 1303 1304 1305 1306 1307 1308 1310 1312 1316 1318 1320 1322 1324 1326 1328 1332 1334 1336 1340 1342 1344 1346 1348 1350
1354 1356 1358 1360 1362 1364 1366 1368 1370 1372 1374 1376 1378 1380 1381 1382
1384 1385 1386 1387 1388 1389 1390 1391 1392 1393 1394 1395 1396 1397 1398 1399

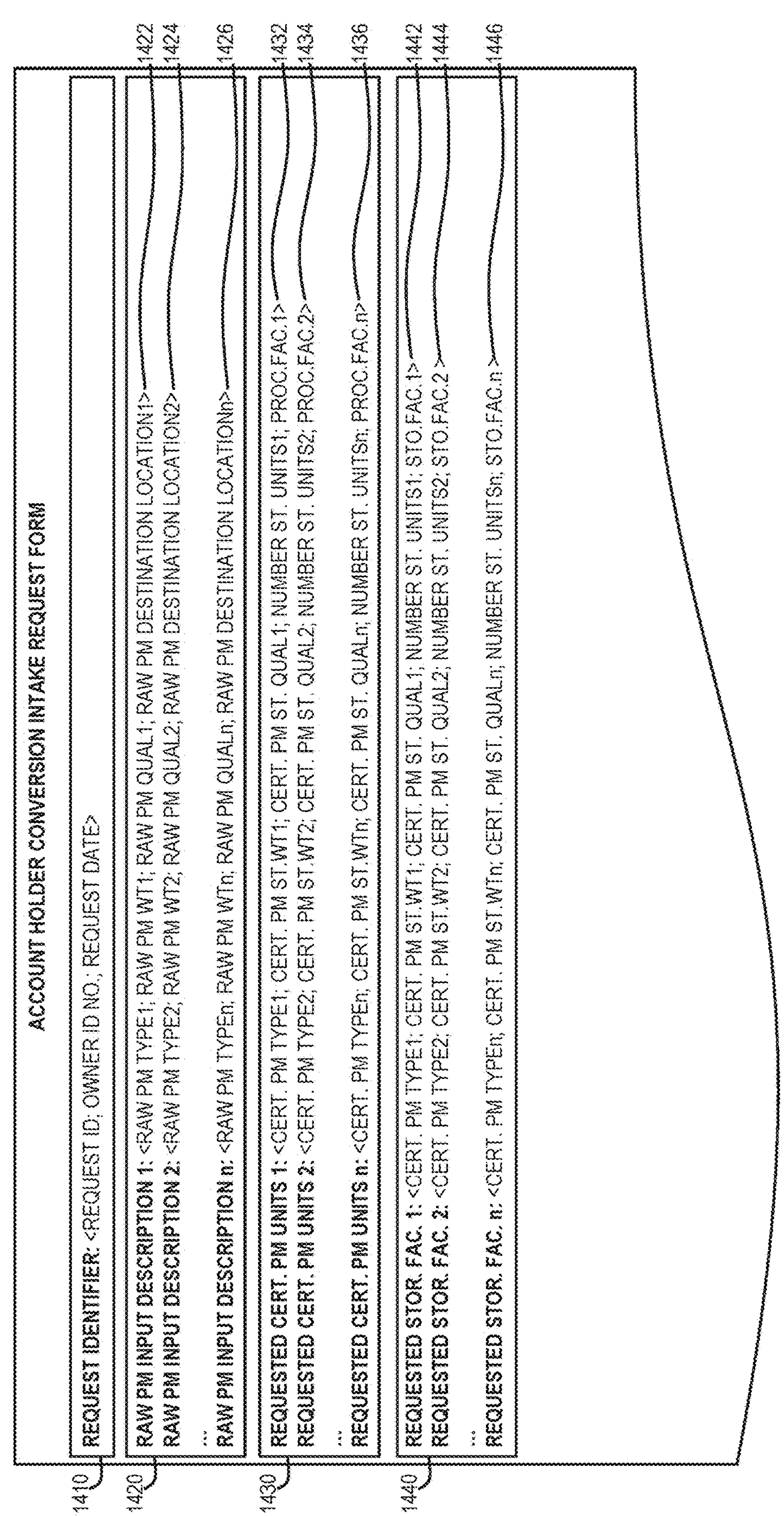
FIG. 14
1400
ACCOUNT HOLDER CONVERSION INTAKE REQUEST FORM
REQUEST IDENTIFIER: <REQUEST ID; OWNER ID NO.; REQUEST DATE>
RAW PM INPUT DESCRIPTION 1: <RAW PM TYPE1; RAW PM WT1; RAW PM QUAL1; RAW PM DESTINATION LOCATION1>
RAW PM INPUT DESCRIPTION 2: <RAW PM TYPE2; RAW PM WT2; RAW PM QUAL2; RAW PM DESTINATION LOCATION2>
...
RAW PM INPUT DESCRIPTION n: <RAW PM TYPEn; RAW PM WTn; RAW PM QUALn; RAW PM DESTINATION LOCATIONn>
REQUESTED CERT. PM UNITS 1: <CERT. PM TYPE1; CERT. PM ST.WT1; CERT. PM ST. QUAL1; NUMBER ST. UNITS1; PROC.FAC.1>
REQUESTED CERT. PM UNITS 2: <CERT. PM TYPE2; CERT. PM ST.WT2; CERT. PM ST. QUAL2; NUMBER ST. UNITS2; PROC.FAC.2>
...
REQUESTED CERT. PM UNITS n: <CERT. PM TYPEn; CERT. PM ST.WTn; CERT. PM ST. QUALn; NUMBER ST. UNITSn; PROC.FAC.n>
REQUESTED STOR. FAC. 1: <CERT. PM TYPE1; CERT. PM ST.WT1; CERT. PM ST. QUAL1; NUMBER ST. UNITS1; STO.FAC.1>
REQUESTED STOR. FAC. 2: <CERT. PM TYPE2; CERT. PM ST.WT2; CERT. PM ST. QUAL2; NUMBER ST. UNITS2; STO.FAC.2>
...
REQUESTED STOR. FAC. n: <CERT. PM TYPEn; CERT. PM ST.WTn; CERT. PM ST. QUALn; NUMBER ST. UNITSn; STO.FAC.n>
1410
1420
1422
1424
1426
1430
1432
1434
1436
1440
1442
1444
1446

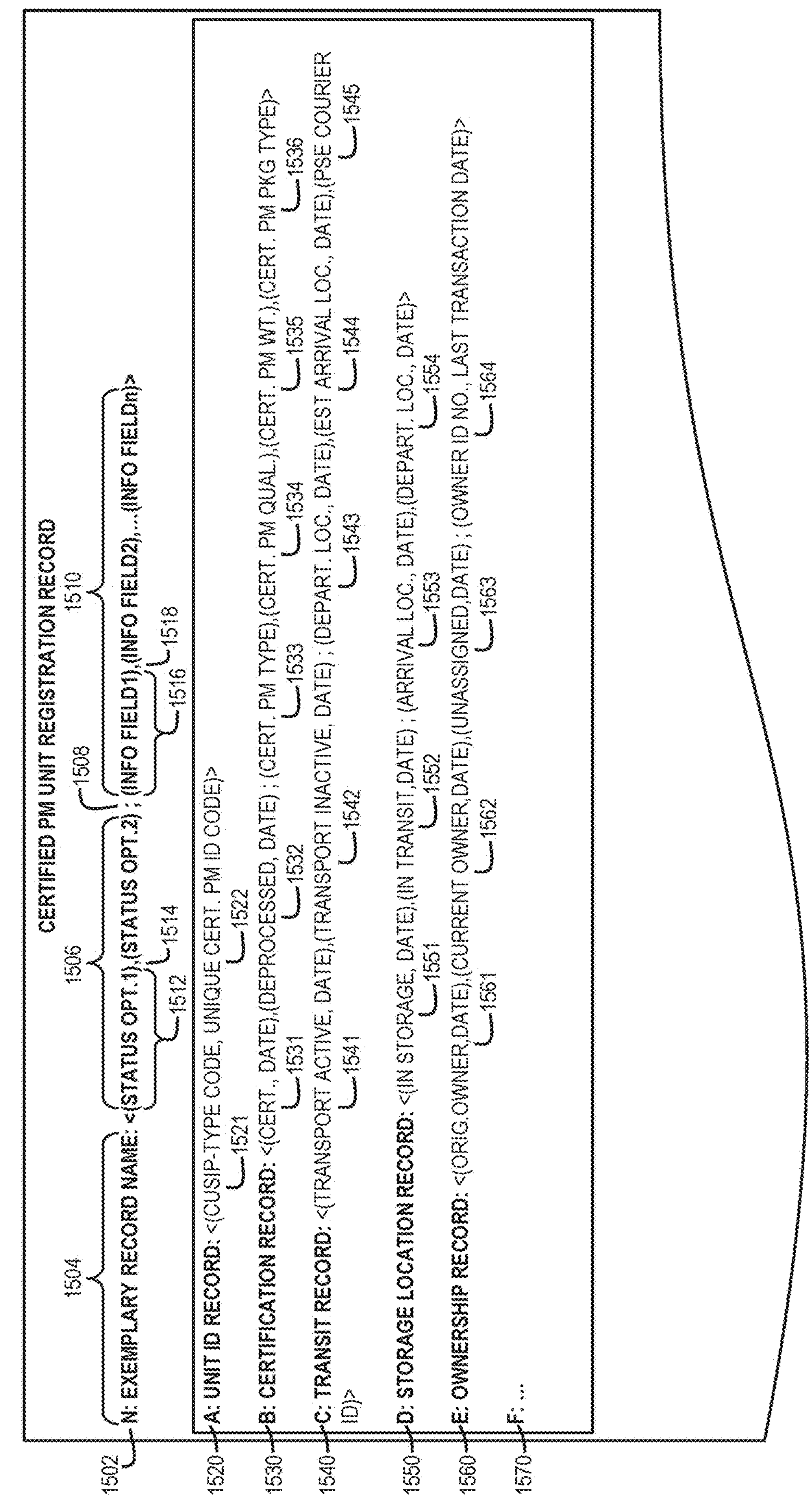
FIG. 15
1500
CERTIFIED PM UNIT REGISTRATION RECORD
1502
N: EXEMPLARY RECORD NAME: <(STATUS OPT.1),(STATUS OPT.2) ; (INFO FIELD1),(INFO FIELD2),...(INFO FIELDn)>
1504
1506
1508
1510
1512
1514
1516
1518
1520
A: UNIT ID RECORD: <(CUSIP-TYPE CODE, UNIQUE CERT. PM ID CODE)>
1521
1522
1530
B: CERTIFICATION RECORD: <(CERT., DATE),(DEPROCESSED, DATE) ; (CERT. PM TYPE),(CERT. PM QUAL.),(CERT. PM WT.),(CERT. PM PKG TYPE)>
1531
1532
1533
1534
1535
1536
1540
C: TRANSIT RECORD: <(TRANSPORT ACTIVE, DATE),(TRANSPORT INACTIVE, DATE) ; (DEPART. LOC., DATE),(EST ARRIVAL LOC., DATE),(PSE COURIER ID)>
1541
1542
1543
1544
1545
1550
D: STORAGE LOCATION RECORD: <(IN STORAGE, DATE),(IN TRANSIT,DATE) ; (ARRIVAL LOC., DATE),(DEPART. LOC., DATE)>
1551
1552
1553
1554
1560
E: OWNERSHIP RECORD: <(ORIG.OWNER,DATE),(CURRENT OWNER,DATE),(UNASSIGNED,DATE) ; (OWNER ID NO., LAST TRANSACTION DATE)>
1561
1562
1563
1564
1570
F: ...

Figure 16:
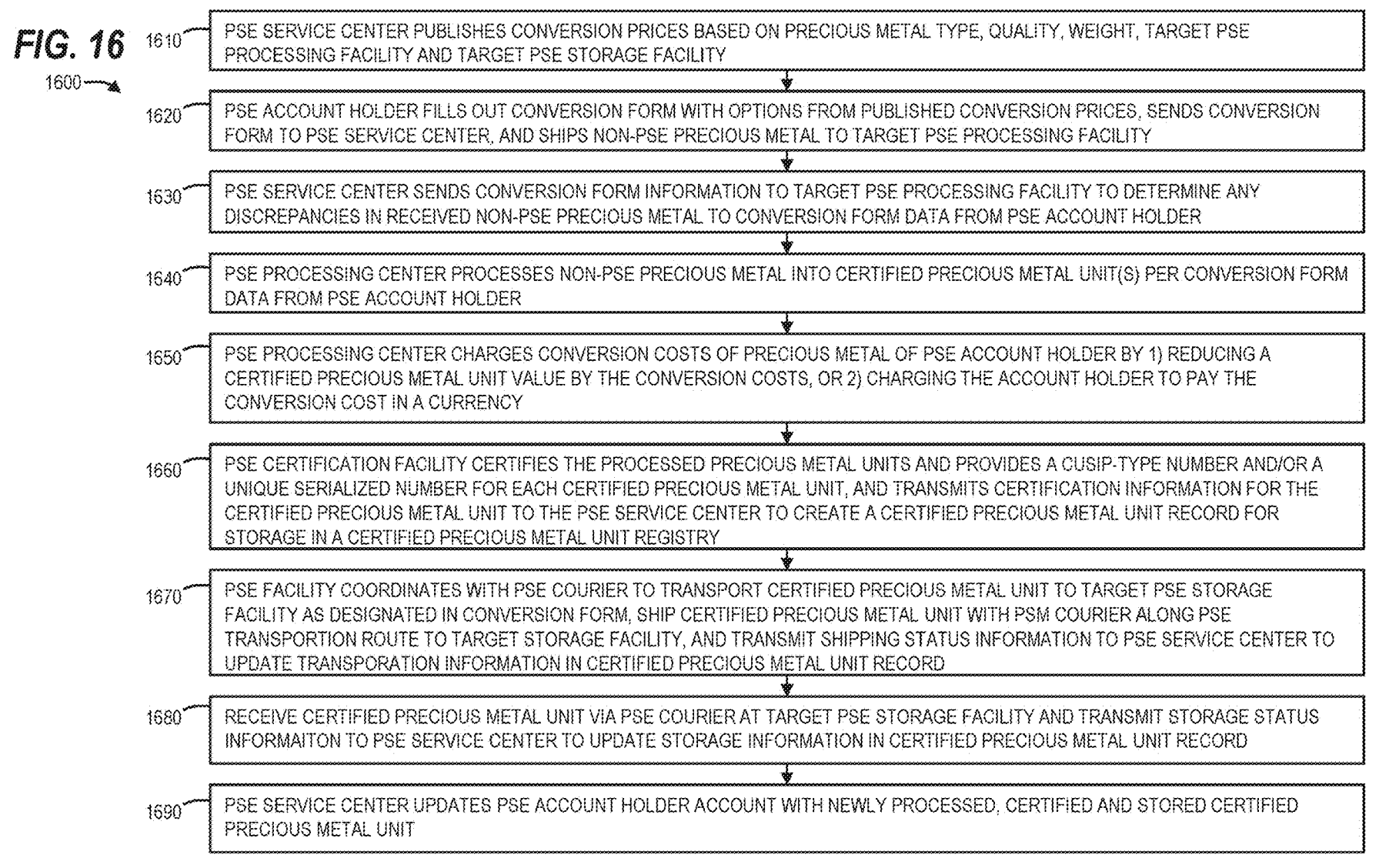

1610 PSE SERVICE CENTER PUBLISHES CONVERSION PRICES BASED ON PRECIOUS METAL TYPE, QUALITY, WEIGHT, TARGET PSE PROCESSING FACILITY AND TARGET PSE STORAGE FACILITY

1620 PSE ACCOUNT HOLDER FILLS OUT CONVERSION FORM WITH OPTIONS FROM PUBLISHED CONVERSION PRICES, SENDS CONVERSION FORM TO PSE SERVICE CENTER, AND SHIPS NON-PSE PRECIOUS METAL TO TARGET PSE PROCESSING FACILITY

1630 PSE SERVICE CENTER SENDS CONVERSION FORM INFORMATION TO TARGET PSE PROCESSING FACILITY TO DETERMINE ANY DISCREPANCIES IN RECEIVED NON-PSE PRECIOUS METAL TO CONVERSION FORM DATA FROM PSE ACCOUNT HOLDER

1640 PSE PROCESSING CENTER PROCESSES NON-PSE PRECIOUS METAL INTO CERTIFIED PRECIOUS METAL UNIT(S) PER CONVERSION FORM DATA FROM PSE ACCOUNT HOLDER

1650 PSE PROCESSING CENTER CHARGES CONVERSION COSTS OF PRECIOUS METAL OF PSE ACCOUNT HOLDER BY 1) REDUCING A CERTIFIED PRECIOUS METAL UNIT VALUE BY THE CONVERSION COSTS, OR 2) CHARGING THE ACCOUNT HOLDER TO PAY THE CONVERSION COST IN A CURRENCY

1660 PSE CERTIFICATION FACILITY CERTIFIES THE PROCESSED PRECIOUS METAL UNITS AND PROVIDES A CUSIP-TYPE NUMBER AND/OR A UNIQUE SERIALIZED NUMBER FOR EACH CERTIFIED PRECIOUS METAL UNIT, AND TRANSMITS CERTIFICATION INFORMATION FOR THE CERTIFIED PRECIOUS METAL UNIT TO THE PSE SERVICE CENTER TO CREATE A CERTIFIED PRECIOUS METAL UNIT RECORD FOR STORAGE IN A CERTIFIED PRECIOUS METAL UNIT REGISTRY

1670 PSE FACILITY COORDINATES WITH PSE COURIER TO TRANSPORT CERTIFIED PRECIOUS METAL UNIT TO TARGET PSE STORAGE FACILITY AS DESIGNATED IN CONVERSION FORM, SHIP CERTIFIED PRECIOUS METAL UNIT WITH PSM COURIER ALONG PSE TRANSPORTION ROUTE TO TARGET STORAGE FACILITY, AND TRANSMIT SHIPPING STATUS INFORMATION TO PSE SERVICE CENTER TO UPDATE TRANSPORATION INFORMATION IN CERTIFIED PRECIOUS METAL UNIT RECORD

1680 RECEIVE CERTIFIED PRECIOUS METAL UNIT VIA PSE COURIER AT TARGET PSE STORAGE FACILITY AND TRANSMIT STORAGE STATUS INFORMAITON TO PSE SERVICE CENTER TO UPDATE STORAGE INFORMATION IN CERTIFIED PRECIOUS METAL UNIT RECORD

1690 PSE SERVICE CENTER UPDATES PSE ACCOUNT HOLDER ACCOUNT WITH NEWLY PROCESSED, CERTIFIED AND STORED CERTIFIED PRECIOUS METAL UNIT

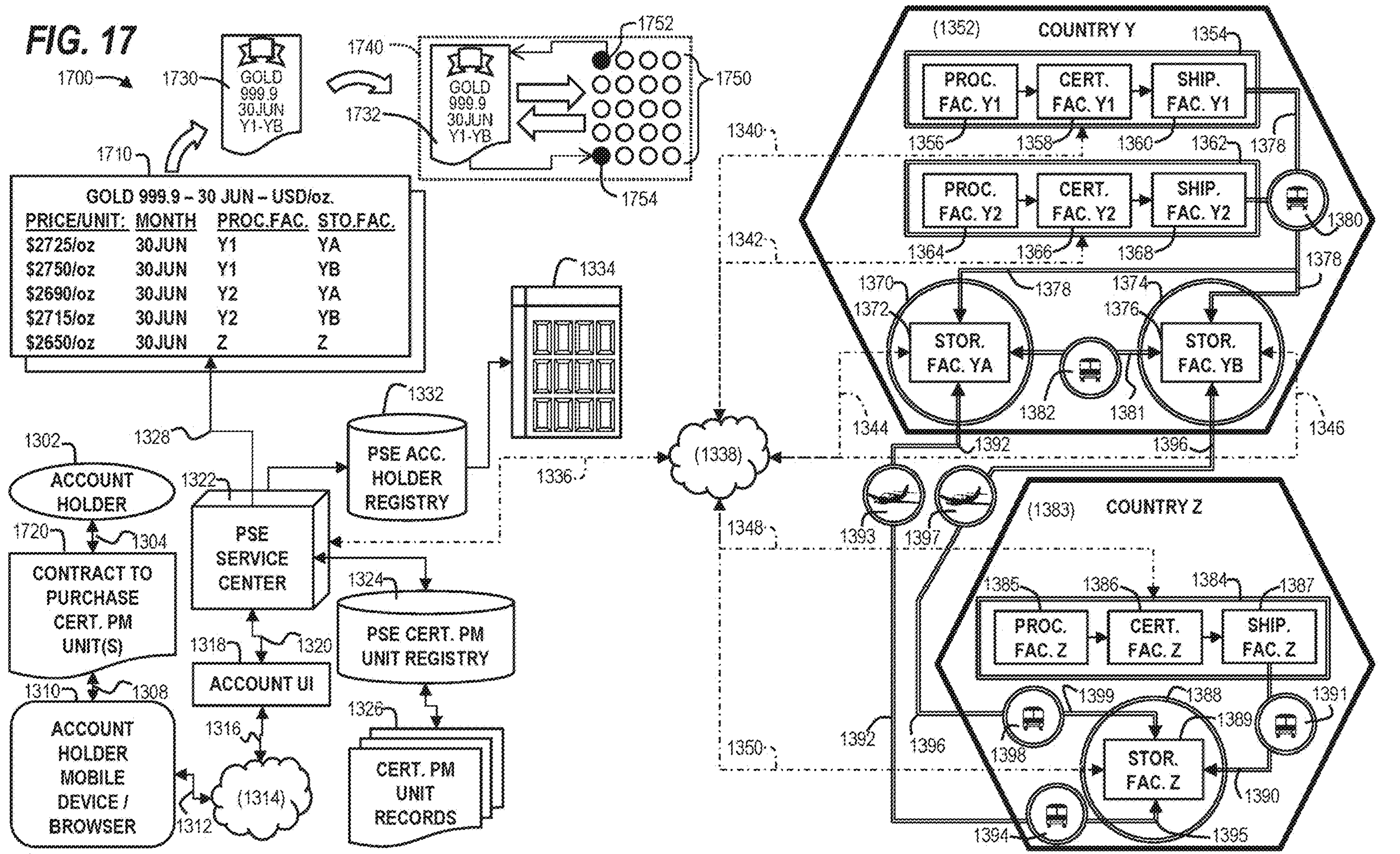
FIG. 17
1700
1730
GOLD 999.9 30JUN Y1-YB
1740
GOLD 999.9 30JUN Y1-YB
1732
1752
1750
1754
1710
GOLD 999.9 – 30 JUN – USD/oz.
PRICE/UNIT: MONTH PROC.FAC. STO.FAC.
$2725/oz 30JUN Y1 YA
$2750/oz 30JUN Y1 YB
$2690/oz 30JUN Y2 YA
$2715/oz 30JUN Y2 YB
$2650/oz 30JUN Z Z
1334
1332
1302
ACCOUNT HOLDER
1328
PSE ACC. HOLDER REGISTRY
1336
(1338)
1322
PSE SERVICE CENTER
1720
1304
CONTRACT TO PURCHASE CERT. PM UNIT(S)
1324
PSE CERT. PM UNIT REGISTRY
1318
1320
ACCOUNT UI
1310
1308
ACCOUNT HOLDER MOBILE DEVICE / BROWSER
1316
(1314)
1312
1326
CERT. PM UNIT RECORDS
1340
1342
1344
1346
1348
1350
(1352)
COUNTRY Y
1354
PROC. FAC. Y1
CERT. FAC. Y1
SHIP. FAC. Y1
1356
1358
1360
1362
1378
PROC. FAC. Y2
CERT. FAC. Y2
SHIP. FAC. Y2
1380
1364
1366
1368
1370
1372
1374
1376
STOR. FAC. YA
STOR. FAC. YB
1382
1381
1392
1396
1393
1397
(1383)
COUNTRY Z
1385
1386
1384
1387
PROC. FAC. Z
CERT. FAC. Z
SHIP. FAC. Z
1399
1388
1389
1391
1398
STOR. FAC. Z
1390
1394
1395

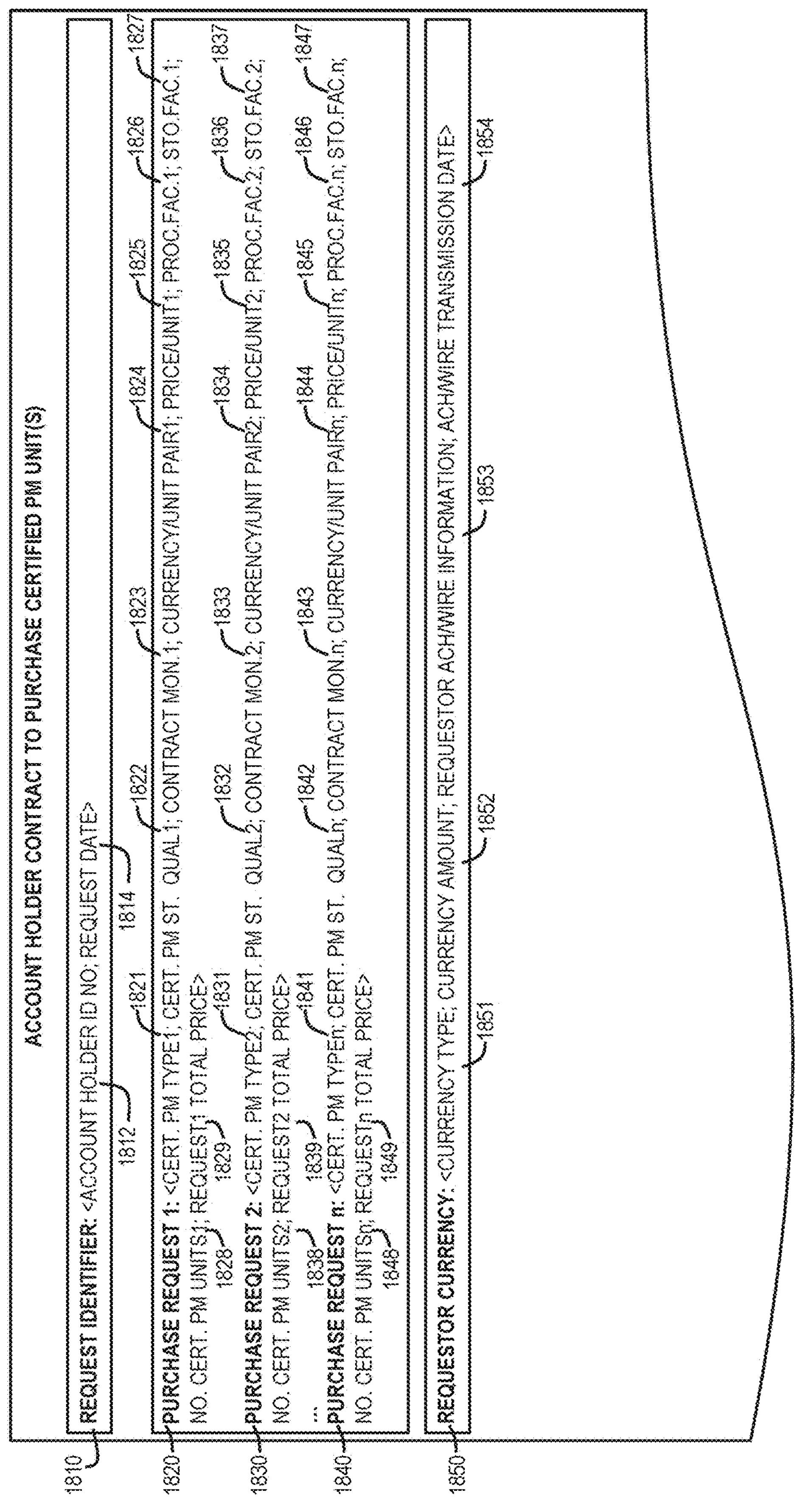
FIG. 18
1800
ACCOUNT HOLDER CONTRACT TO PURCHASE CERTIFIED PM UNIT(S)
1810
REQUEST IDENTIFIER: <ACCOUNT HOLDER ID NO; REQUEST DATE>
1812
1814
1820
PURCHASE REQUEST 1: <CERT. PM TYPE1; CERT. PM ST. QUAL1; CONTRACT MON.1; CURRENCY/UNIT PAIR1; PRICE/UNIT1; PROC.FAC.1; STO.FAC.1;
NO. CERT. PM UNITS1; REQUEST1 TOTAL PRICE>
1821
1822
1823
1824
1825
1826
1827
1828
1829
1830
PURCHASE REQUEST 2: <CERT. PM TYPE2; CERT. PM ST. QUAL2; CONTRACT MON.2; CURRENCY/UNIT PAIR2; PRICE/UNIT2; PROC.FAC.2; STO.FAC.2;
NO. CERT. PM UNITS2; REQUEST2 TOTAL PRICE>
1831
1832
1833
1834
1835
1836
1837
1838
1839
...
1840
PURCHASE REQUEST n: <CERT. PM TYPEn; CERT. PM ST. QUALn; CONTRACT MON.n; CURRENCY/UNIT PAIRn; PRICE/UNITn; PROC.FAC.n; STO.FAC.n;
NO. CERT. PM UNITSn; REQUESTn TOTAL PRICE>
1841
1842
1843
1844
1845
1846
1847
1848
1849
1850
REQUESTOR CURRENCY: <CURRENCY TYPE; CURRENCY AMOUNT; REQUESTOR ACH/WIRE INFORMATION; ACH/WIRE TRANSMISSION DATE>
1851
1852
1853
1854

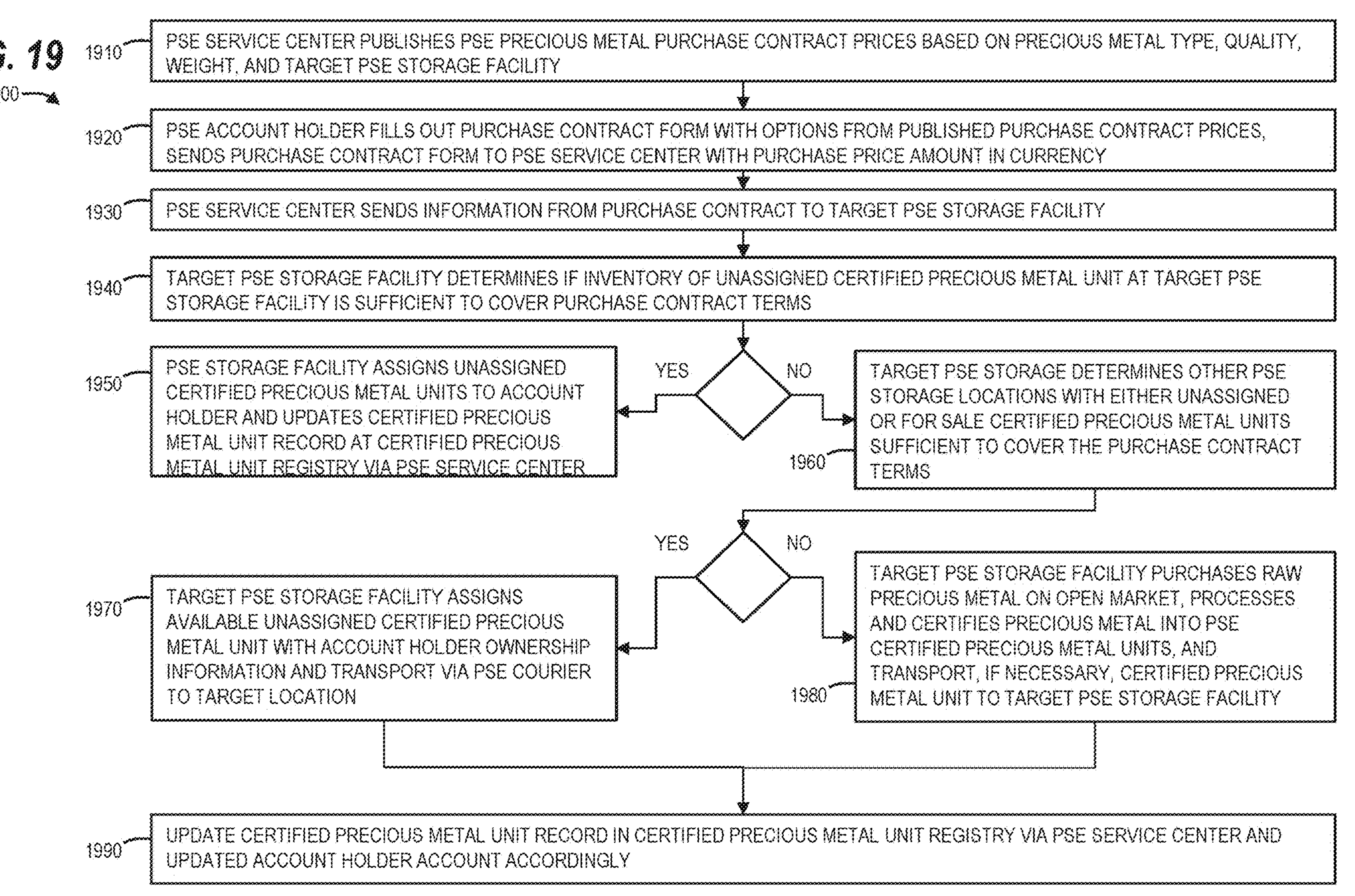
FIG. 19
1900
1910
PSE SERVICE CENTER PUBLISHES PSE PRECIOUS METAL PURCHASE CONTRACT PRICES BASED ON PRECIOUS METAL TYPE, QUALITY, WEIGHT, AND TARGET PSE STORAGE FACILITY
1920
PSE ACCOUNT HOLDER FILLS OUT PURCHASE CONTRACT FORM WITH OPTIONS FROM PUBLISHED PURCHASE CONTRACT PRICES, SENDS PURCHASE CONTRACT FORM TO PSE SERVICE CENTER WITH PURCHASE PRICE AMOUNT IN CURRENCY
1930
PSE SERVICE CENTER SENDS INFORMATION FROM PURCHASE CONTRACT TO TARGET PSE STORAGE FACILITY
1940
TARGET PSE STORAGE FACILITY DETERMINES IF INVENTORY OF UNASSIGNED CERTIFIED PRECIOUS METAL UNIT AT TARGET PSE STORAGE FACILITY IS SUFFICIENT TO COVER PURCHASE CONTRACT TERMS
YES
NO
1950
PSE STORAGE FACILITY ASSIGNS UNASSIGNED CERTIFIED PRECIOUS METAL UNITS TO ACCOUNT HOLDER AND UPDATES CERTIFIED PRECIOUS METAL UNIT RECORD AT CERTIFIED PRECIOUS METAL UNIT REGISTRY VIA PSE SERVICE CENTER
1960
TARGET PSE STORAGE DETERMINES OTHER PSE STORAGE LOCATIONS WITH EITHER UNASSIGNED OR FOR SALE CERTIFIED PRECIOUS METAL UNITS SUFFICIENT TO COVER THE PURCHASE CONTRACT TERMS
YES
NO
1970
TARGET PSE STORAGE FACILITY ASSIGNS AVAILABLE UNASSIGNED CERTIFIED PRECIOUS METAL UNIT WITH ACCOUNT HOLDER OWNERSHIP INFORMATION AND TRANSPORT VIA PSE COURIER TO TARGET LOCATION
1980
TARGET PSE STORAGE FACILITY PURCHASES RAW PRECIOUS METAL ON OPEN MARKET, PROCESSES AND CERTIFIES PRECIOUS METAL INTO PSE CERTIFIED PRECIOUS METAL UNITS, AND TRANSPORT, IF NECESSARY, CERTIFIED PRECIOUS METAL UNIT TO TARGET PSE STORAGE FACILITY
1990
UPDATE CERTIFIED PRECIOUS METAL UNIT RECORD IN CERTIFIED PRECIOUS METAL UNIT REGISTRY VIA PSE SERVICE CENTER AND UPDATED ACCOUNT HOLDER ACCOUNT ACCORDINGLY 2000
ACCOUNT HOLDER
1302
REQUEST FOR PHYSICAL TRANSFER OF CERT. PM UNIT(S)
2010
1304
1308
1310
ACCOUNT HOLDER MOBILE DEVICE / BROWSER
1312
(1314)
1316
ACCOUNT UI
1318
1320
PSE SERVICE CENTER
1322
PSE ACC. HOLDER REGISTRY
1332
PSE CERT. PM UNIT REGISTRY
1324
CERT. PM UNIT RECORDS
1326
1334
1336
(1338)
1340
1342
1344
1346
1348
1350
COUNTRY Y
(1352)
PROC. FAC. Y1
CERT. FAC. Y1
SHIP. FAC. Y1
1354
1356
1358
1360
PROC. FAC. Y2
CERT. FAC. Y2
SHIP. FAC. Y2
1362
1364
1366
1368
STOR. FAC. YA
STOR. FAC. YB
1370
1372
1374
1376
1378
1380
1381
1382
1392
1393
1396
1397
COUNTRY Z
(1383)
PROC. FAC. Z
CERT. FAC. Z
SHIP. FAC. Z
STOR. FAC. Z
1384
1385
1386
1387
1388
1389
1390
1391
1394
1395
1398
1399

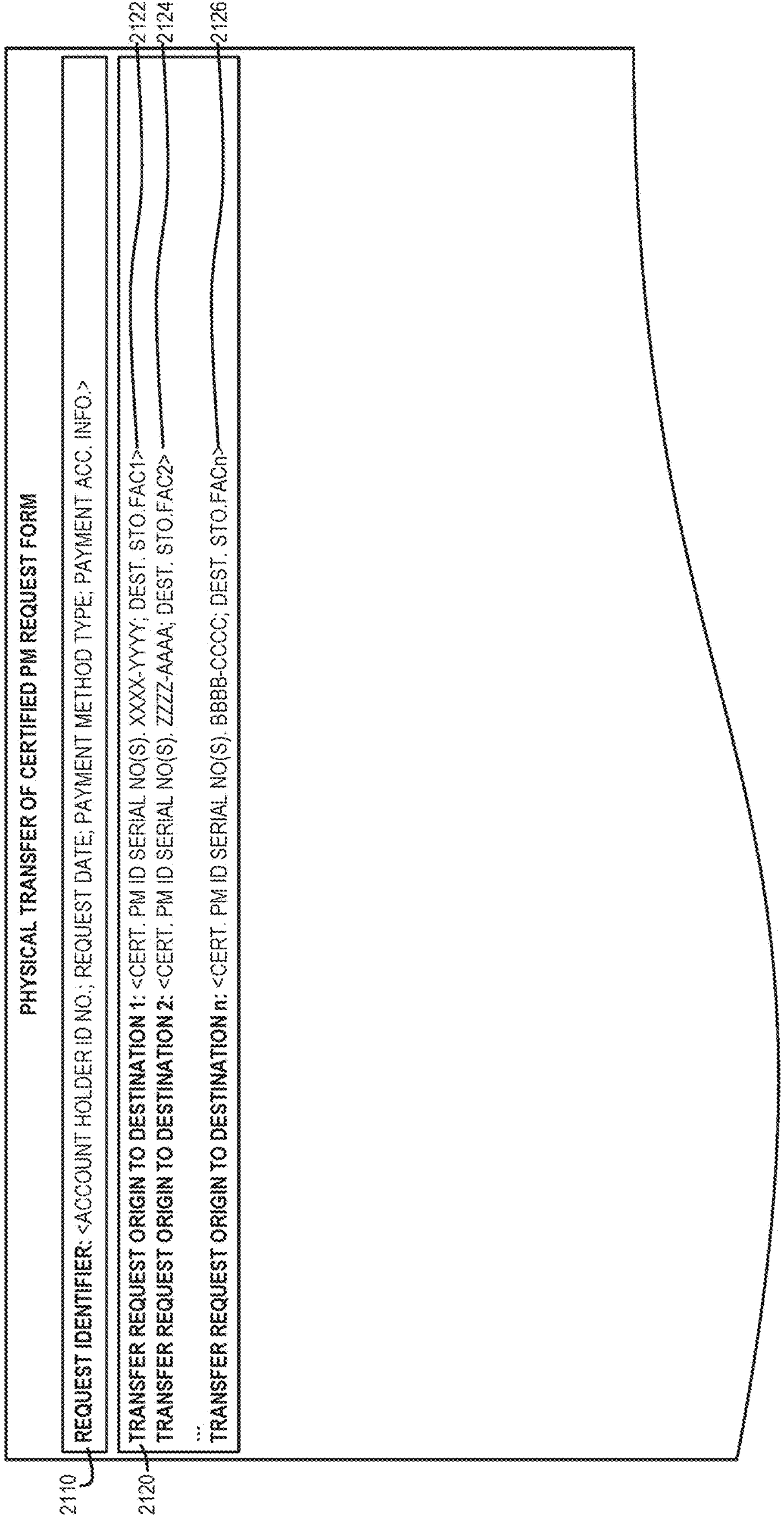

FIG. 21
2100
PHYSICAL TRANSFER OF CERTIFIED PM REQUEST FORM
REQUEST IDENTIFIER: <ACCOUNT HOLDER ID NO.; REQUEST DATE; PAYMENT METHOD TYPE; PAYMENT ACC. INFO.>
2110
TRANSFER REQUEST ORIGIN TO DESTINATION 1: <CERT. PM ID SERIAL NO(S). XXXX-YYYY; DEST. STO.FAC1>
TRANSFER REQUEST ORIGIN TO DESTINATION 2: <CERT. PM ID SERIAL NO(S). ZZZZ-AAAA; DEST. STO.FAC2>
...
TRANSFER REQUEST ORIGIN TO DESTINATION n: <CERT. PM ID SERIAL NO(S). BBBB-CCCC; DEST. STO.FACn>
2120
2122
2124
2126

Figure 22:
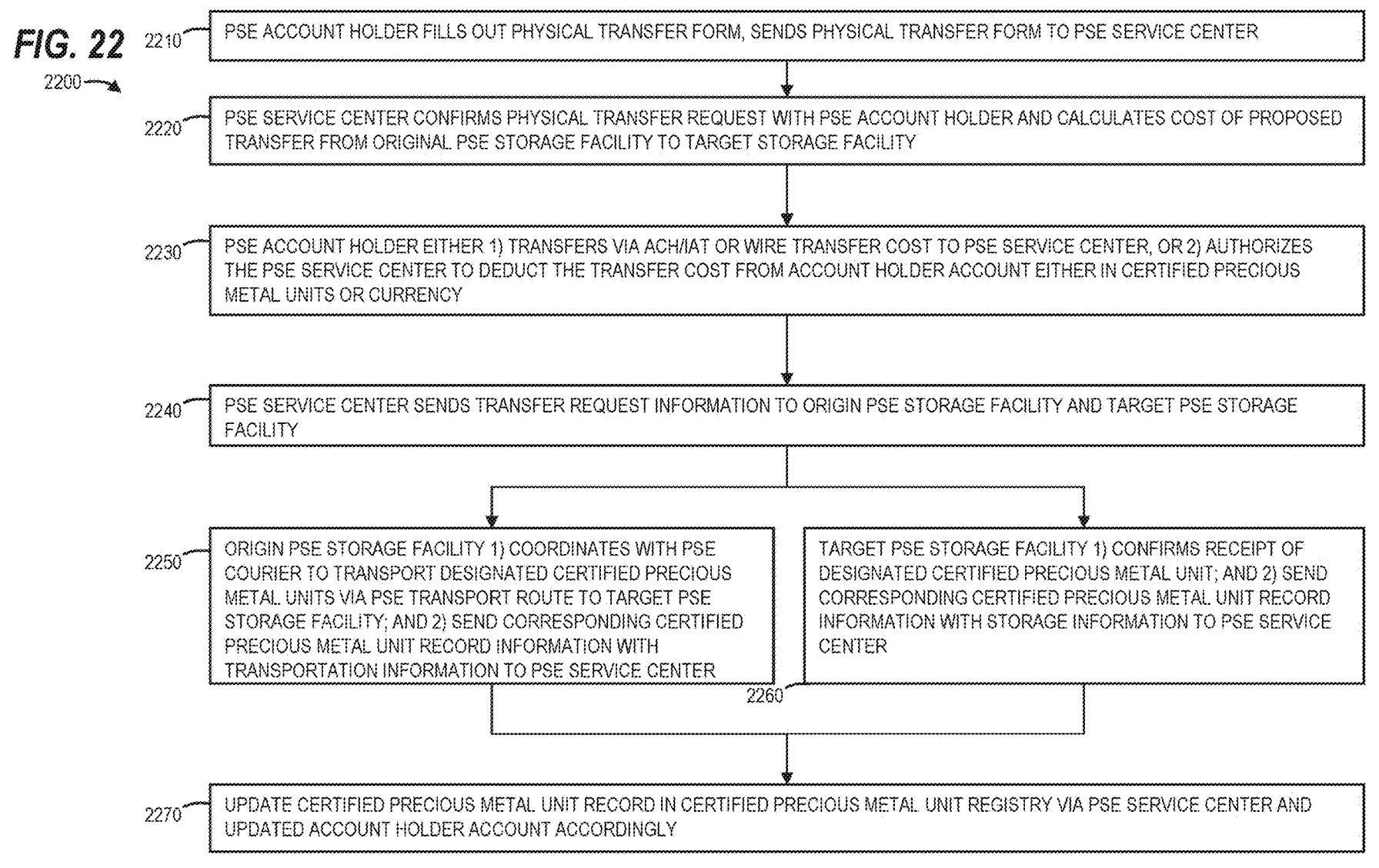

2210 PSE ACCOUNT HOLDER FILLS OUT PHYSICAL TRANSFER FORM, SENDS PHYSICAL TRANSFER FORM TO PSE SERVICE CENTER

2220 PSE SERVICE CENTER CONFIRMS PHYSICAL TRANSFER REQUEST WITH PSE ACCOUNT HOLDER AND CALCULATES COST OF PROPOSED TRANSFER FROM ORIGINAL PSE STORAGE FACILITY TO TARGET STORAGE FACILITY

2230 PSE ACCOUNT HOLDER EITHER 1) TRANSFERS VIA ACH/IAT OR WIRE TRANSFER COST TO PSE SERVICE CENTER, OR 2) AUTHORIZES THE PSE SERVICE CENTER TO DEDUCT THE TRANSFER COST FROM ACCOUNT HOLDER ACCOUNT EITHER IN CERTIFIED PRECIOUS METAL UNITS OR CURRENCY

2240 PSE SERVICE CENTER SENDS TRANSFER REQUEST INFORMATION TO ORIGIN PSE STORAGE FACILITY AND TARGET PSE STORAGE FACILITY

2250 ORIGIN PSE STORAGE FACILITY 1) COORDINATES WITH PSE COURIER TO TRANSPORT DESIGNATED CERTIFIED PRECIOUS METAL UNITS VIA PSE TRANSPORT ROUTE TO TARGET PSE STORAGE FACILITY; AND 2) SEND CORRESPONDING CERTIFIED PRECIOUS METAL UNIT RECORD INFORMATION WITH TRANSPORTATION INFORMATION TO PSE SERVICE CENTER

2260 TARGET PSE STORAGE FACILITY 1) CONFIRMS RECEIPT OF DESIGNATED CERTIFIED PRECIOUS METAL UNIT; AND 2) SEND CORRESPONDING CERTIFIED PRECIOUS METAL UNIT RECORD INFORMATION WITH STORAGE INFORMATION TO PSE SERVICE CENTER

2270 UPDATE CERTIFIED PRECIOUS METAL UNIT RECORD IN CERTIFIED PRECIOUS METAL UNIT REGISTRY VIA PSE SERVICE CENTER AND UPDATED ACCOUNT HOLDER ACCOUNT ACCORDINGLY 2300
1302
ACCOUNT HOLDER
2310
1304
REQUEST TO ASSIGN CERT. PM UNIT(S)
1310
1308
ACCOUNT HOLDER MOBILE DEVICE / BROWSER
1312
(1314)
1316
1322
PSE SERVICE CENTER
1318
1320
ACCOUNT UI
1332
PSE ACC. HOLDER REGISTRY
1324
PSE CERT. PM UNIT REGISTRY
1326
CERT. PM UNIT RECORDS
2320
$ X00
£ Y00
¥ Z00
2324
2322
1336
(1338)
1340
1342
1344
1346
1348
1350
(1352)
COUNTRY Y
1354
PROC. FAC. Y1
CERT. FAC. Y1
SHIP. FAC. Y1
1356
1358
1360
1362
1378
PROC. FAC. Y2
CERT. FAC. Y2
SHIP. FAC. Y2
1364
1366
1368
1380
1370
1372
1374
1376
STOR. FAC. YA
STOR. FAC. YB
1382
1381
1392
1396
1393
1397
(1383)
COUNTRY Z
1385
1386
1384
1387
PROC. FAC. Z
CERT. FAC. Z
SHIP. FAC. Z
1399
1388
1389
1391
1398
STOR. FAC. Z
1390
1394
1395

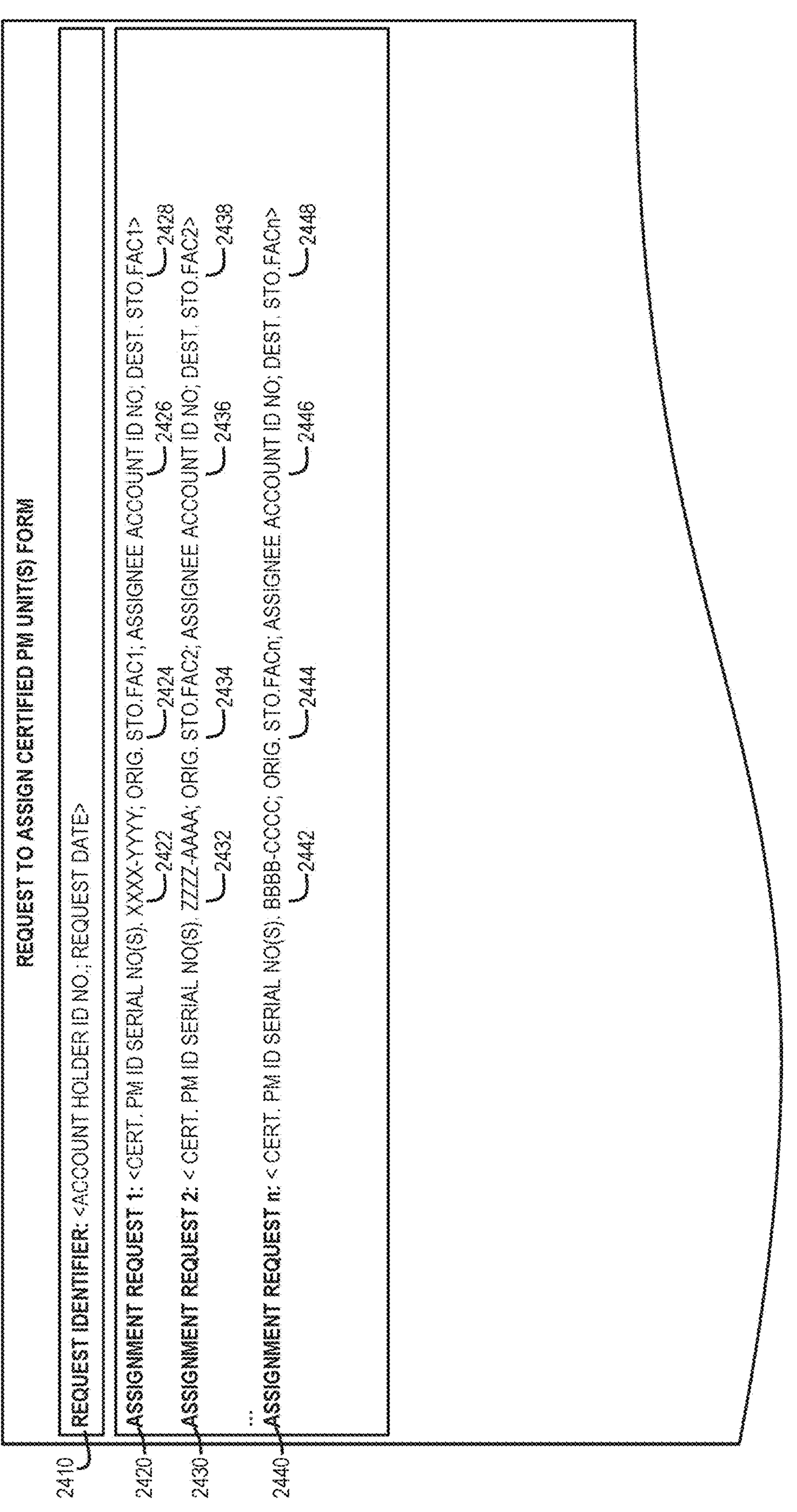
FIG. 24
2400
REQUEST TO ASSIGN CERTIFIED PM UNIT(S) FORM
2410
REQUEST IDENTIFIER: <ACCOUNT HOLDER ID NO.; REQUEST DATE>
2420
ASSIGNMENT REQUEST 1: <CERT. PM ID SERIAL NO(S). XXXX-YYYY; ORIG. STO.FAC1; ASSIGNEE ACCOUNT ID NO; DEST. STO.FAC1>
2422
2424
2426
2428
2430
ASSIGNMENT REQUEST 2: < CERT. PM ID SERIAL NO(S). ZZZZ-AAAA; ORIG. STO.FAC2; ASSIGNEE ACCOUNT ID NO; DEST. STO.FAC2>
2432
2434
2436
2438
...
2440
ASSIGNMENT REQUEST n: < CERT. PM ID SERIAL NO(S). BBBB-CCCC; ORIG. STO.FACn; ASSIGNEE ACCOUNT ID NO; DEST. STO.FACn>
2442
2444
2446
2448

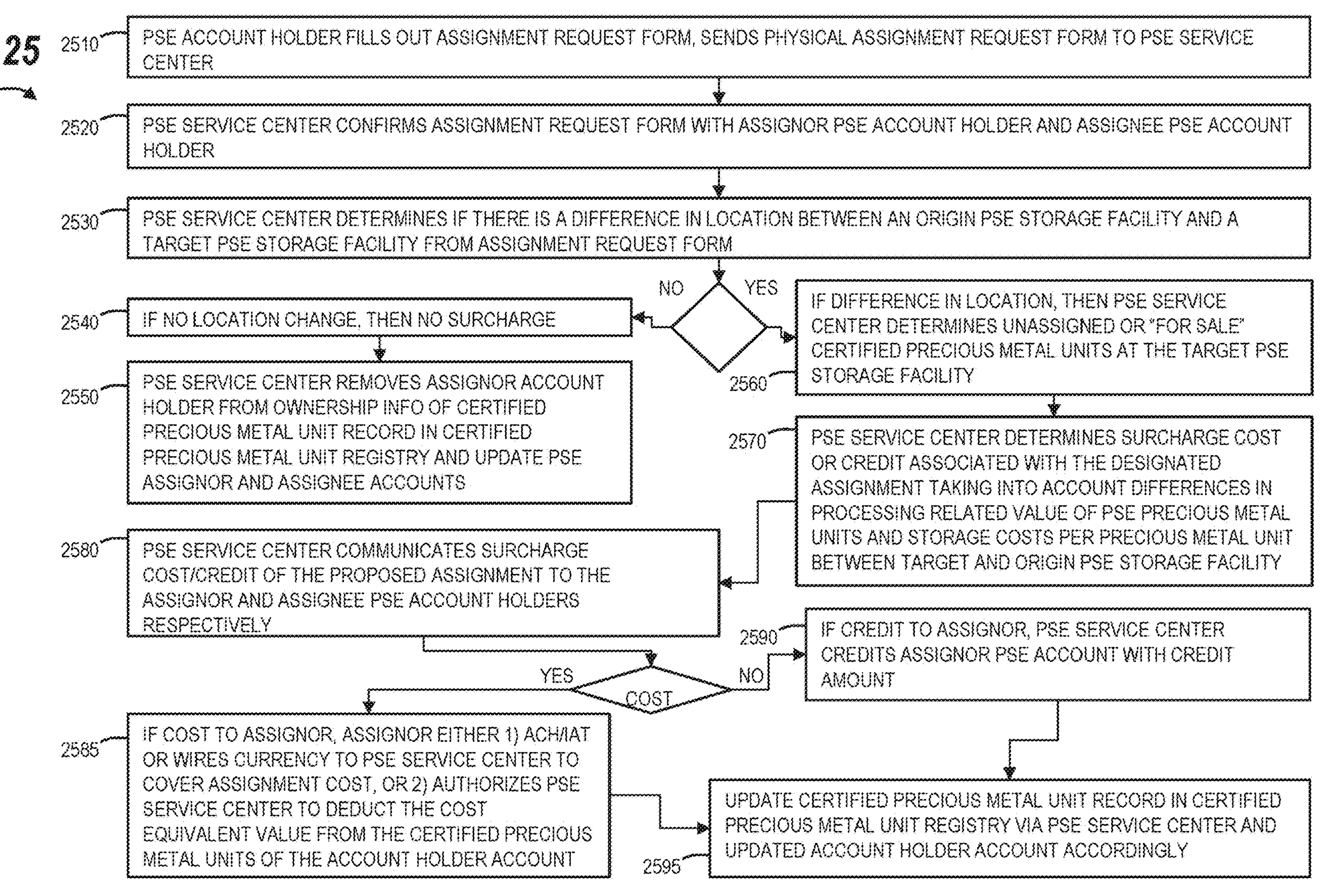
FIG. 25
2500
2510
PSE ACCOUNT HOLDER FILLS OUT ASSIGNMENT REQUEST FORM, SENDS PHYSICAL ASSIGNMENT REQUEST FORM TO PSE SERVICE CENTER
2520
PSE SERVICE CENTER CONFIRMS ASSIGNMENT REQUEST FORM WITH ASSIGNOR PSE ACCOUNT HOLDER AND ASSIGNEE PSE ACCOUNT HOLDER
2530
PSE SERVICE CENTER DETERMINES IF THERE IS A DIFFERENCE IN LOCATION BETWEEN AN ORIGIN PSE STORAGE FACILITY AND A TARGET PSE STORAGE FACILITY FROM ASSIGNMENT REQUEST FORM
NO
YES
2540
IF NO LOCATION CHANGE, THEN NO SURCHARGE
2560
IF DIFFERENCE IN LOCATION, THEN PSE SERVICE CENTER DETERMINES UNASSIGNED OR "FOR SALE" CERTIFIED PRECIOUS METAL UNITS AT THE TARGET PSE STORAGE FACILITY
2550
PSE SERVICE CENTER REMOVES ASSIGNOR ACCOUNT HOLDER FROM OWNERSHIP INFO OF CERTIFIED PRECIOUS METAL UNIT RECORD IN CERTIFIED PRECIOUS METAL UNIT REGISTRY AND UPDATE PSE ASSIGNOR AND ASSIGNEE ACCOUNTS
2570
PSE SERVICE CENTER DETERMINES SURCHARGE COST OR CREDIT ASSOCIATED WITH THE DESIGNATED ASSIGNMENT TAKING INTO ACCOUNT DIFFERENCES IN PROCESSING RELATED VALUE OF PSE PRECIOUS METAL UNITS AND STORAGE COSTS PER PRECIOUS METAL UNIT BETWEEN TARGET AND ORIGIN PSE STORAGE FACILITY
2580
PSE SERVICE CENTER COMMUNICATES SURCHARGE COST/CREDIT OF THE PROPOSED ASSIGNMENT TO THE ASSIGNOR AND ASSIGNEE PSE ACCOUNT HOLDERS RESPECTIVELY
2590
IF CREDIT TO ASSIGNOR, PSE SERVICE CENTER CREDITS ASSIGNOR PSE ACCOUNT WITH CREDIT AMOUNT
YES
COST
NO
2585
IF COST TO ASSIGNOR, ASSIGNOR EITHER 1) ACH/IAT OR WIRES CURRENCY TO PSE SERVICE CENTER TO COVER ASSIGNMENT COST, OR 2) AUTHORIZES PSE SERVICE CENTER TO DEDUCT THE COST EQUIVALENT VALUE FROM THE CERTIFIED PRECIOUS METAL UNITS OF THE ACCOUNT HOLDER ACCOUNT
2595
UPDATE CERTIFIED PRECIOUS METAL UNIT RECORD IN CERTIFIED PRECIOUS METAL UNIT REGISTRY VIA PSE SERVICE CENTER AND UPDATED ACCOUNT HOLDER ACCOUNT ACCORDINGLY 2600
COUNTRY Y
(1352)
PROC. FAC. Y1
CERT. FAC. Y1
SHIP. FAC. Y1
PROC. FAC. Y2
CERT. FAC. Y2
SHIP. FAC. Y2
STOR. FAC. YA
STOR. FAC. YB
COUNTRY Z
(1383)
PROC. FAC. Z
CERT. FAC. Z
SHIP. FAC. Z
STOR. FAC. Z
(1338)
ACH
$, £, ¥, ...
WIRE
$, £, ¥, ...
PSE ACC. HOLDER REGISTRY
PSE SERVICE CENTER
PSE CERT. PM UNIT REGISTRY
CERT. PM UNIT RECORDS
ACCOUNT UI
(1314)
ACCOUNT HOLDER
WITHDRAWAL-TRANSFER REQUEST FORM
ACCOUNT HOLDER MOBILE DEVICE / BROWSER
$ X00
£ Y00
¥ Z00

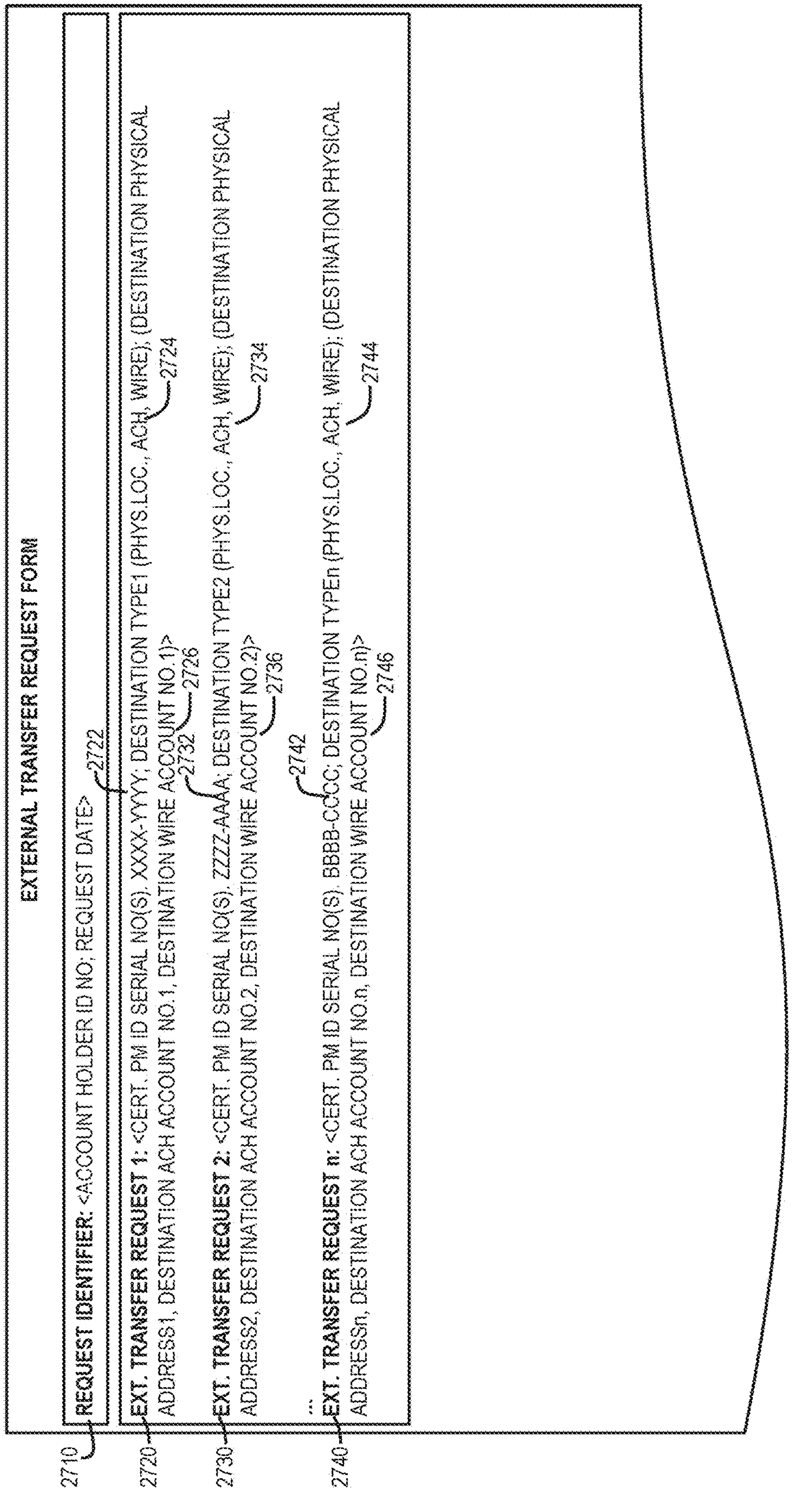
FIG. 27
2700
EXTERNAL TRANSFER REQUEST FORM
2710
REQUEST IDENTIFIER: <ACCOUNT HOLDER ID NO; REQUEST DATE>
2720
EXT. TRANSFER REQUEST 1: <CERT. PM ID SERIAL NO(S). XXXX-YYYY; DESTINATION TYPE1 (PHYS.LOC., ACH, WIRE); (DESTINATION PHYSICAL ADDRESS1, DESTINATION ACH ACCOUNT NO.1, DESTINATION WIRE ACCOUNT NO.1)>
2722
2724
2726
2730
EXT. TRANSFER REQUEST 2: <CERT. PM ID SERIAL NO(S). ZZZZ-AAAA; DESTINATION TYPE2 (PHYS.LOC., ACH, WIRE); (DESTINATION PHYSICAL ADDRESS2, DESTINATION ACH ACCOUNT NO.2, DESTINATION WIRE ACCOUNT NO.2)>
2732
2734
2736
...
2740
EXT. TRANSFER REQUEST n: <CERT. PM ID SERIAL NO(S). BBBB-CCCC; DESTINATION TYPEn (PHYS.LOC., ACH, WIRE); (DESTINATION PHYSICAL ADDRESSn, DESTINATION ACH ACCOUNT NO.n, DESTINATION WIRE ACCOUNT NO.n)>
2742
2744
2746

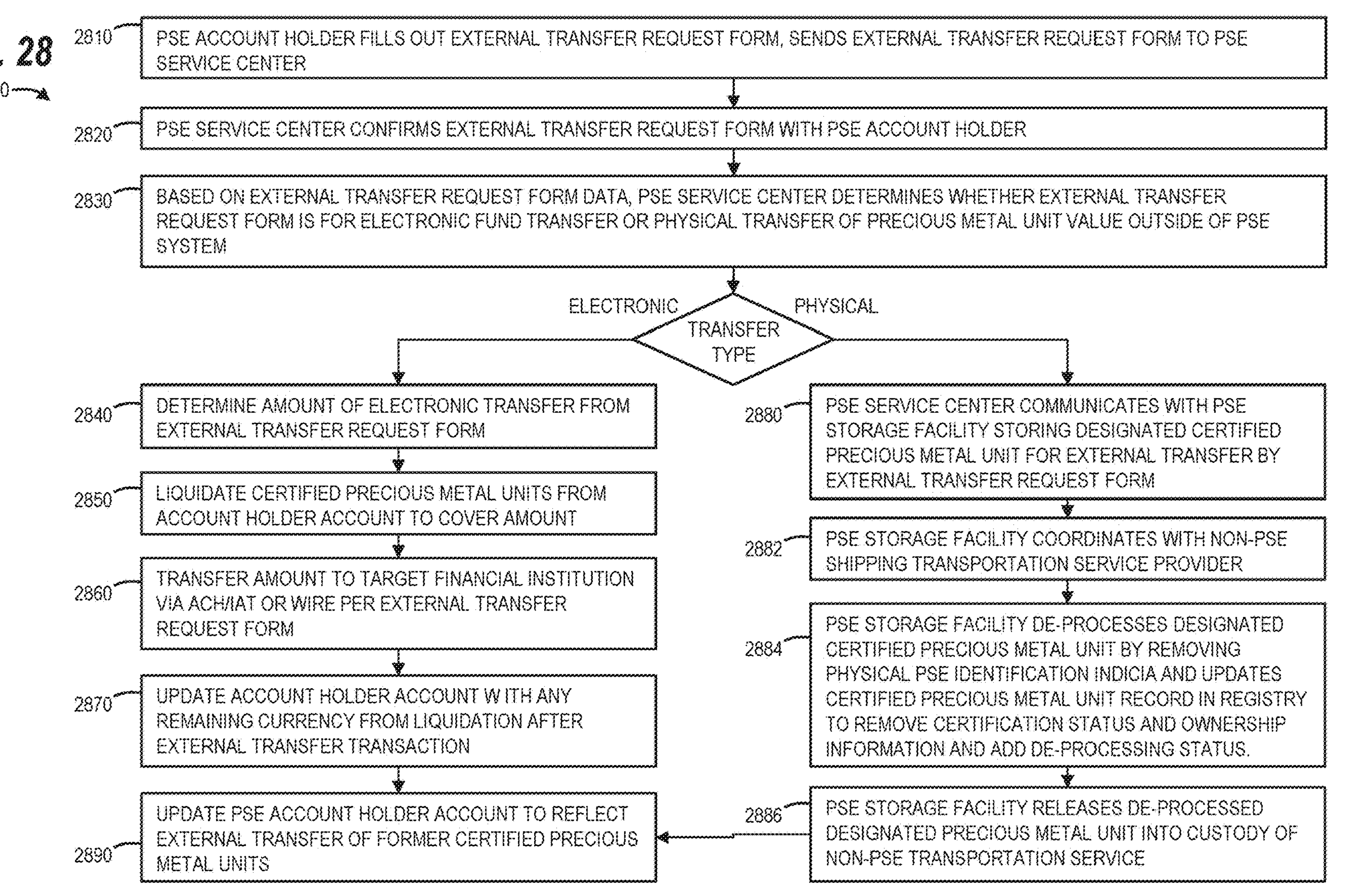
FIG. 28
2800
2810
PSE ACCOUNT HOLDER FILLS OUT EXTERNAL TRANSFER REQUEST FORM, SENDS EXTERNAL TRANSFER REQUEST FORM TO PSE SERVICE CENTER
2820
PSE SERVICE CENTER CONFIRMS EXTERNAL TRANSFER REQUEST FORM WITH PSE ACCOUNT HOLDER
2830
BASED ON EXTERNAL TRANSFER REQUEST FORM DATA, PSE SERVICE CENTER DETERMINES WHETHER EXTERNAL TRANSFER REQUEST FORM IS FOR ELECTRONIC FUND TRANSFER OR PHYSICAL TRANSFER OF PRECIOUS METAL UNIT VALUE OUTSIDE OF PSE SYSTEM
ELECTRONIC
TRANSFER TYPE
PHYSICAL
2840
DETERMINE AMOUNT OF ELECTRONIC TRANSFER FROM EXTERNAL TRANSFER REQUEST FORM
2850
LIQUIDATE CERTIFIED PRECIOUS METAL UNITS FROM ACCOUNT HOLDER ACCOUNT TO COVER AMOUNT
2860
TRANSFER AMOUNT TO TARGET FINANCIAL INSTITUTION VIA ACH/IAT OR WIRE PER EXTERNAL TRANSFER REQUEST FORM
2870
UPDATE ACCOUNT HOLDER ACCOUNT W ITH ANY REMAINING CURRENCY FROM LIQUIDATION AFTER EXTERNAL TRANSFER TRANSACTION
2890
UPDATE PSE ACCOUNT HOLDER ACCOUNT TO REFLECT EXTERNAL TRANSFER OF FORMER CERTIFIED PRECIOUS METAL UNITS
2880
PSE SERVICE CENTER COMMUNICATES WITH PSE STORAGE FACILITY STORING DESIGNATED CERTIFIED PRECIOUS METAL UNIT FOR EXTERNAL TRANSFER BY EXTERNAL TRANSFER REQUEST FORM
2882
PSE STORAGE FACILITY COORDINATES WITH NON-PSE SHIPPING TRANSPORTATION SERVICE PROVIDER
2884
PSE STORAGE FACILITY DE-PROCESSES DESIGNATED CERTIFIED PRECIOUS METAL UNIT BY REMOVING PHYSICAL PSE IDENTIFICATION INDICIA AND UPDATES CERTIFIED PRECIOUS METAL UNIT RECORD IN REGISTRY TO REMOVE CERTIFICATION STATUS AND OWNERSHIP INFORMATION AND ADD DE-PROCESSING STATUS.
2886
PSE STORAGE FACILITY RELEASES DE-PROCESSED DESIGNATED PRECIOUS METAL UNIT INTO CUSTODY OF NON-PSE TRANSPORTATION SERVICE

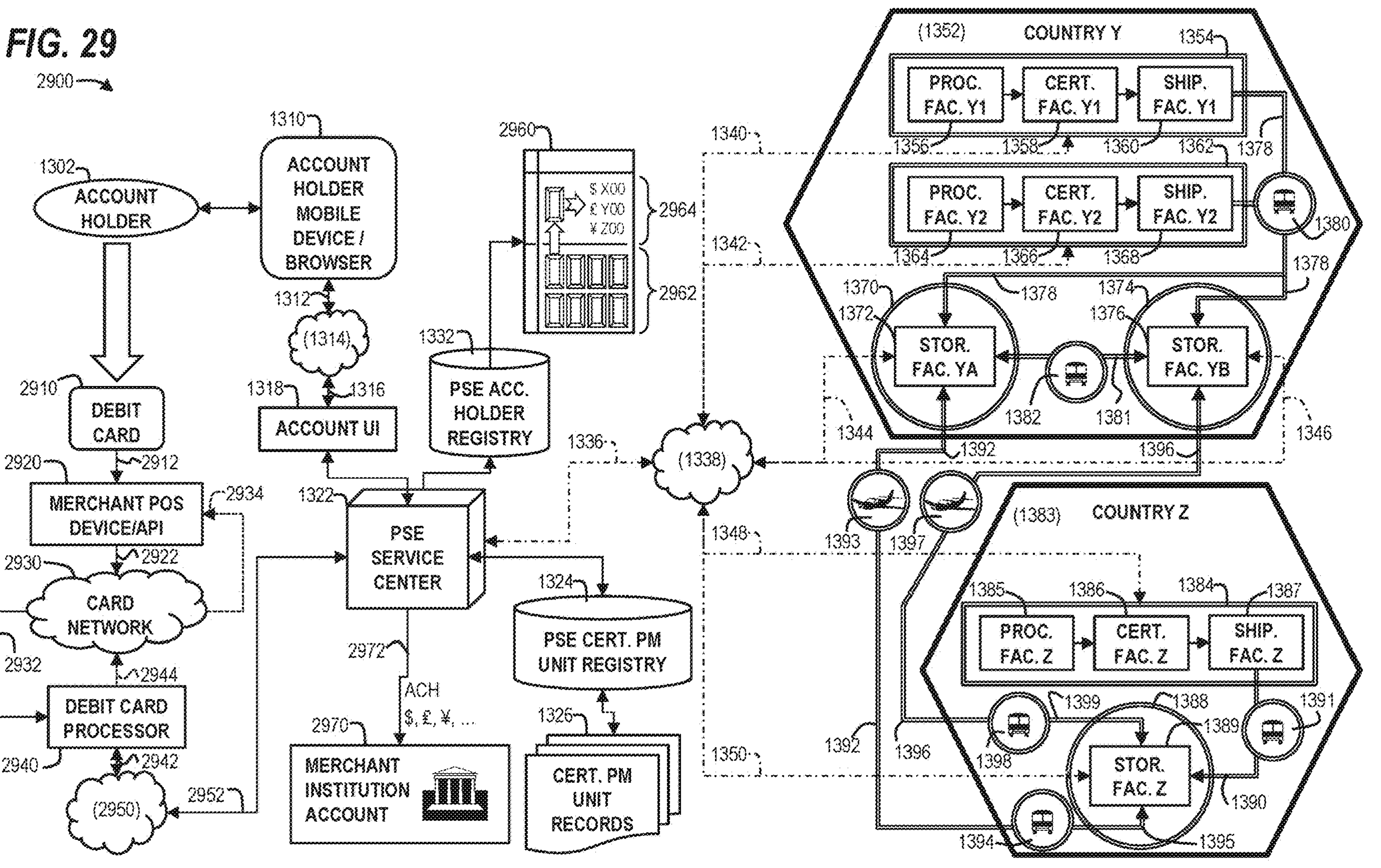
FIG. 29
2900
ACCOUNT HOLDER
1302
ACCOUNT HOLDER MOBILE DEVICE / BROWSER
1310
1312
(1314)
1316
ACCOUNT UI
1318
2960
$ X00
£ Y00
¥ Z00
2964
2962
PSE ACC. HOLDER REGISTRY
1332
DEBIT CARD
2910
2912
MERCHANT POS DEVICE/API
2920
2934
2922
CARD NETWORK
2930
2932
2944
DEBIT CARD PROCESSOR
2940
2942
(2950)
2952
PSE SERVICE CENTER
1322
1336
(1338)
2972
ACH
$, £, ¥, ...
MERCHANT INSTITUTION ACCOUNT
2970
PSE CERT. PM UNIT REGISTRY
1324
CERT. PM UNIT RECORDS
1326
1340
1342
1348
1350
(1352)
COUNTRY Y
1354
PROC. FAC. Y1
CERT. FAC. Y1
SHIP. FAC. Y1
1356
1358
1360
1362
1378
PROC. FAC. Y2
CERT. FAC. Y2
SHIP. FAC. Y2
1380
1364
1366
1368
1378
1370
1378
1374
1372
1376
STOR. FAC. YA
STOR. FAC. YB
1382
1381
1344
1346
1392
1396
1393
1397
(1383)
COUNTRY Z
1385
1386
1384
1387
PROC. FAC. Z
CERT. FAC. Z
SHIP. FAC. Z
1399
1388
1389
1391
1392
1396
1398
STOR. FAC. Z
1390
1394
1395

Figure 30:
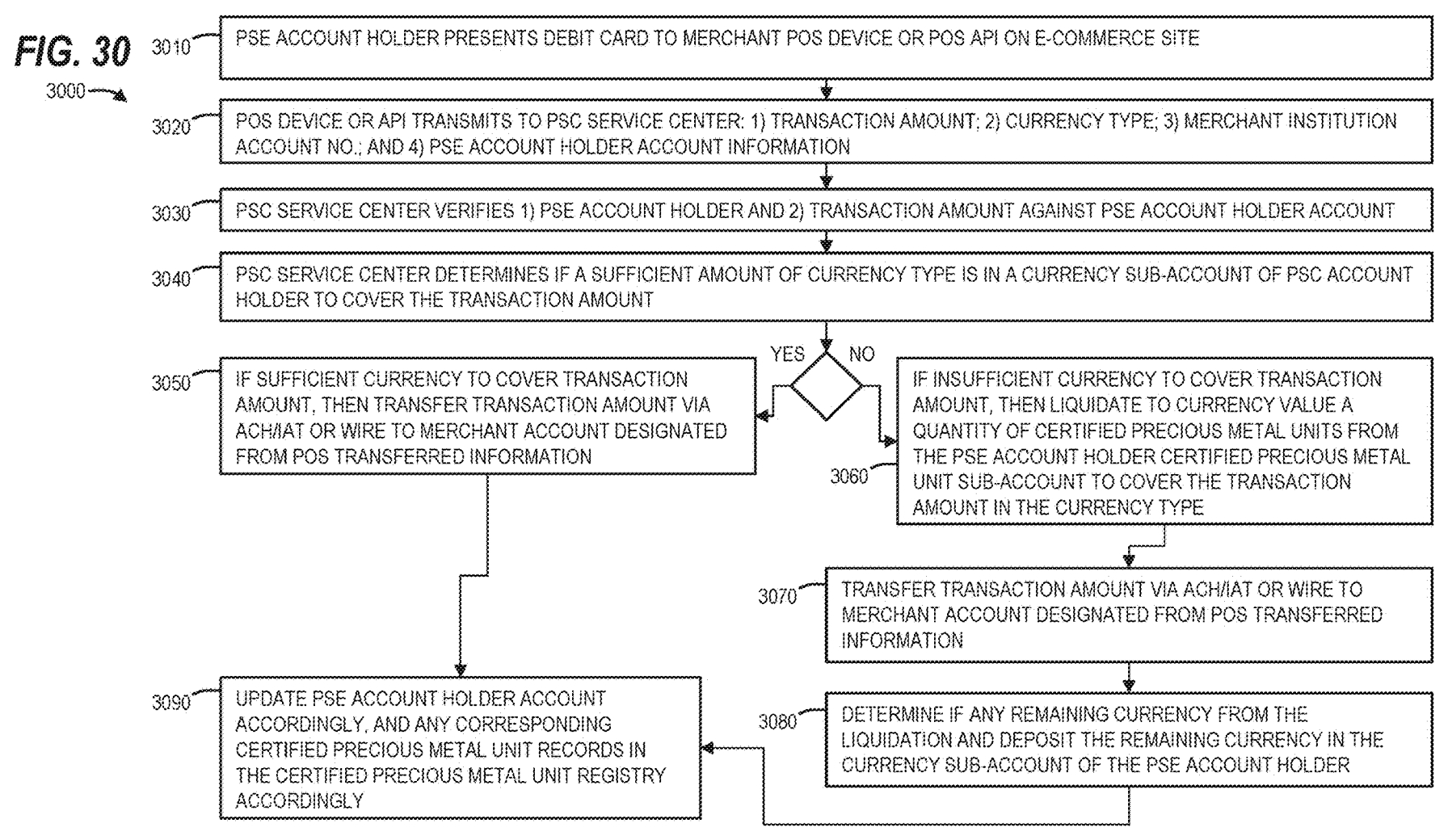

3010 PSE ACCOUNT HOLDER PRESENTS DEBIT CARD TO MERCHANT POS DEVICE OR POS API ON E-COMMERCE SITE

3020 POS DEVICE OR API TRANSMITS TO PSC SERVICE CENTER: 1) TRANSACTION AMOUNT; 2) CURRENCY TYPE; 3) MERCHANT INSTITUTION ACCOUNT NO.; AND 4) PSE ACCOUNT HOLDER ACCOUNT INFORMATION

3030 PSC SERVICE CENTER VERIFIES 1) PSE ACCOUNT HOLDER AND 2) TRANSACTION AMOUNT AGAINST PSE ACCOUNT HOLDER ACCOUNT

3040 PSC SERVICE CENTER DETERMINES IF A SUFFICIENT AMOUNT OF CURRENCY TYPE IS IN A CURRENCY SUB-ACCOUNT OF PSC ACCOUNT HOLDER TO COVER THE TRANSACTION AMOUNT

YES

NO

3050 IF SUFFICIENT CURRENCY TO COVER TRANSACTION AMOUNT, THEN TRANSFER TRANSACTION AMOUNT VIA ACH/IAT OR WIRE TO MERCHANT ACCOUNT DESIGNATED FROM POS TRANSFERRED INFORMATION

3060 IF INSUFFICIENT CURRENCY TO COVER TRANSACTION AMOUNT, THEN LIQUIDATE TO CURRENCY VALUE A QUANTITY OF CERTIFIED PRECIOUS METAL UNITS FROM THE PSE ACCOUNT HOLDER CERTIFIED PRECIOUS METAL UNIT SUB-ACCOUNT TO COVER THE TRANSACTION AMOUNT IN THE CURRENCY TYPE

3070 TRANSFER TRANSACTION AMOUNT VIA ACH/IAT OR WIRE TO MERCHANT ACCOUNT DESIGNATED FROM POS TRANSFERRED INFORMATION

3080 DETERMINE IF ANY REMAINING CURRENCY FROM THE LIQUIDATION AND DEPOSIT THE REMAINING CURRENCY IN THE CURRENCY SUB-ACCOUNT OF THE PSE ACCOUNT HOLDER

3090 UPDATE PSE ACCOUNT HOLDER ACCOUNT ACCORDINGLY, AND ANY CORRESPONDING CERTIFIED PRECIOUS METAL UNIT RECORDS IN THE CERTIFIED PRECIOUS METAL UNIT REGISTRY ACCORDINGLY

3100

SECURE ENVIRONMENT PUBLIC REGISTER (SEPR)

A system and method of operation for a physically secure environment configured to receive precious metal thereto, to retain precious metal therein, and release precious metal therefrom. The system may include a registration system configured to record and maintain records containing precious metal information and may be configured to allocate a portion of a total quantity of certified precious metal units in a first location within the physically secure environment to be associated with a first lot. The system may then create a private registry with corresponding records associated with the allocated portion of certified SUC precious metal units in the first location.

CROSS REFERENCE TO RELATED APPLICATIONS

This application is a continuation of U.S. Non-Provisional patent application Ser. No. 19/041,956, filed Jan. 30, 2025, which is a continuation-in-part of U.S. Non-Provisional patent application Ser. No. 18/376,776, filed on Oct. 4, 2023, and issued on Mar. 18, 2025 as U.S. Pat. No. 12,254,084, which is a continuation of U.S. Non-Provisional patent application Ser. No. 17/986,037, filed on Nov. 14, 2022, and issued on Oct. 24, 2023 as U.S. Pat. No. 11,797,666, which claims priority from U.S. Provisional Patent Application No. 63/282,012, filed on Nov. 22, 2021, titled Secure Environment Public Register (SEPR), all the contents of which are incorporated herein by reference, in their entirety.

BACKGROUND

Field of the Invention

This invention relates to the general field of storage, verifying of quality, diversion of storage locations and trading of physical gold with institutions, gold handlers, and individuals.

Description of the Related Art

For thousands of years, gold and other precious metals, such as silver, have been a key storage for wealth, currency and a safe haven during crisis. Gold has also been a traditional hedge against inflation. The current state of the art for ownership of gold is part of a gold fund that holds physical gold, such as the Electronically Trades Fund (ETF) GLD, or owning physical gold. There are several options in owning physical gold. The first option is to buy and hold physical gold at home or in a safe location that you control. The more common approach is to own gold as part of a bank's physical holding. Withdrawing gold out of a bank is relatively complex because many investors want to store their gold in other countries such as Switzerland, Singapore, or United States. When gold is held offshore, there are significant problems getting access and transporting when an owner wants to withdraw the gold. Personal use of gold is also a significant problem. If someone is selling you an ounce of gold, how do you know it is real gold or the amount they claim? How do you know the purity of gold? Person-to-person transfer of gold is risky. Transporting gold is risky. Security and storage of gold is risky. Person-to-institution, and the reverse, is also risky. Many of the current physical gold storage facilities state that you have a piece of a large gold block. This approach has the risk of the facility selling more pieces of gold than they physically have on hand. This can lead to a significant shortage should owners wish to withdraw their amount of gold. The prior art has not solved these problems in any way that the common man can avoid the significant risks of owning and trading physical gold. Transferring gold from one country to another involves a lot of local and international rules and regulations.

From all of the above, there exists a need for a system that overcomes the above-described problems associated with the current state of the art.

BRIEF SUMMARY

It should be appreciated that this Summary is provided to introduce a selection of concepts in a simplified form that are further described below in the Detailed Description. This Summary is not intended to be used to limit the scope of the claimed subject matter.

A method comprising: a PSE (Physical Secure Environment) service center publishing conversion prices based on precious metal type, quality, weight, target PSE processing facility, and target PSE storage facility; a PSE account holder fills out a conversion form with options from published conversion prices, sends the conversion form to the PSE service center, and ships non-PSE precious metal to the target PSE processing facility; the PSE service center sends conversion form information to the target PSE processing facility to determine any discrepancies in the received non-PSE precious metal to conversion form data from the PSE account holder; the PSE processing center processes non-PSE precious metal into certified precious metal unit(s) per conversion form data from the PSE account holder; the PSE processing center charges conversion costs of the precious metal of the PSE account holder by either reducing a certified precious metal unit value by the conversion costs, or charging the account holder to pay the conversion cost in a currency; the PSE certification facility certifies the processed precious metal units and provides a CUSIP-type number and/or a unique serialized number for each certified precious metal unit, and transmits certification information for the certified precious metal unit to the PSE service center to create a certified precious metal unit record for storage in a certified precious metal unit registry; the PSE facility coordinates with a PSE courier to transport the certified precious metal unit to the target PSE storage facility as designated in the conversion form, ships the certified precious metal unit with the PSE courier along the PSE transportation route to the target storage facility, and transmits shipping status information to the PSE service center to update transportation information in the certified precious metal unit record; the target PSE storage facility receives the certified precious metal unit via PSE courier and transmits storage status information to the PSE service center to update storage information in the certified precious metal unit record; and the PSE service center updates the PSE account holder account with the newly processed, certified, and stored certified precious metal unit.

A method comprising: a PSE service center publishing PSE precious metal purchase contract prices based on precious metal type, quality, weight, and target PSE storage facility; the PSE account holder filling out a purchase contract form with options from published purchase contract prices and sending the purchase contract form to the PSE service center with the purchase price amount in currency; the PSE service center sending information from the purchase contract to the target PSE storage facility; a target PSE storage facility determining if the inventory of unassigned certified precious metal units at the target PSE storage facility is sufficient to cover the purchase contract terms; if so, the PSE storage facility assigns unassigned certified precious metal units to the account holder and updates the certified precious metal unit record at the certified precious metal unit registry via the PSE service center; if not, the target PSE storage facility determines other PSE storage locations with either unassigned or for sale certified precious metal units sufficient to cover the purchase contract terms; if so, the target PSE storage facility assigns available unassigned certified precious metal units with account holder ownership information and transports them via PSE courier to the target location; if not, the target PSE storage facility purchases raw precious metal on the open market, processes and certifies the precious metal into PSE certified precious metal units, and transports, if necessary, the certified precious metal units to the target PSE storage facility; and the target PSE storage facility updates the certified precious metal unit record in the certified precious metal unit registry via the PSE service center and updates the account holder account accordingly.

A method comprising: a PSE account holder filling out a physical transfer form and sending the physical transfer form to a PSE service center; the PSE service center confirming the physical transfer request with the PSE account holder and calculates the cost of the proposed transfer from the original PSE storage facility to the target storage facility; the PSE account holder either transfers via ACH/IAT or wire transfer the cost to the PSE service center, or authorizes the PSE service center to deduct the transfer cost from the account holder account either in certified precious metal units or currency; the PSE service center sends the transfer request information to the origin PSE storage facility and the target PSE storage facility; the origin PSE storage facility coordinates with a PSE courier to transport designated certified precious metal units via a PSE transport route to the target PSE storage facility and sends corresponding certified precious metal unit record information with transportation information to the PSE service center; the target PSE storage facility confirms receipt of the designated certified precious metal unit and sends corresponding certified precious metal unit record information with storage information to the PSE service center; and updates the certified precious metal unit record in the certified precious metal unit registry via the PSE service center and updates the account holder account accordingly.

A method comprising: a PSE account holder filling out an assignment request form and sending the physical assignment request form to a PSE service center; the PSE service center confirming the assignment request form with the assignor PSE account holder and the assignee PSE account holder; the PSE service center determining if there is a difference in location between an origin PSE storage facility and a target PSE storage facility from the assignment request form; if no location change, then no surcharge and the PSE service center removes the assignor account holder from ownership info of the certified precious metal unit record in the certified precious metal unit registry and updates the PSE assignor and assignee accounts; if a difference in location, then the PSE service center determines unassigned or "for sale" certified precious metal units at the target PSE storage facility; the PSE service center determines a surcharge cost or credit associated with the designated assignment taking into account differences in processing related value of PSE precious metal units and storage costs per precious metal unit between the target and origin PSE storage facility; the PSE service center communicates the surcharge cost/credit of the proposed assignment to the assignor and assignee PSE account holders respectively; if a cost to the assignor, the assignor either ACH/IAT or wires currency to the PSE service center to cover the assignment cost, or authorizes the PSE service center to deduct the cost equivalent value from the certified precious metal units of the account holder account; if a credit to the assignor, the PSE service center credits the assignor PSE account with the credit amount and updates the certified precious metal unit record in the certified precious metal unit registry via the PSE service center and updates the account holder account accordingly.

A method comprising: APSE account holder fills out an external transfer request form and sends the external transfer request form to a PSE service center; the PSE service center confirms the external transfer request form with the PSE account holder; based on external transfer request form data, the PSE service center determines whether the external transfer request form is for an electronic fund transfer or a physical transfer of precious metal unit value outside of the PSE system; if an electronic transfer type, determine the amount of the electronic transfer from the external transfer request form; liquidate certified precious metal units from the account holder account to cover the amount; transfer the amount to the target financial institution via ACH/IAT or wire per the external transfer request form; update the account holder account with any remaining currency from the liquidation after the external transfer transaction; if a physical transfer type, the PSE service center communicates with the PSE storage facility storing the designated certified precious metal unit for external transfer by the external transfer request form; the PSE storage facility coordinates with a non-PSE shipping transportation service provider; the PSE storage facility de-processes the designated certified precious metal unit by removing physical PSE identification indicia and updates the certified precious metal unit record in the registry to remove the certification status and ownership information and add de-processing status; the PSE storage facility releases the de-processed designated precious metal unit into the custody of the non-PSE transportation service; and then, for both types of external transfer, update the PSE account holder account to reflect the external transfer of former certified precious metal units.

A method comprising: a PSE account holder presenting a debit card to a merchant POS device or POS API on an e-commerce site; the POS device or API transmitting to a PSE service center the transaction amount, currency type, merchant institution account number, and PSE account holder account information; the PSE service center verifying the PSE account holder and transaction amount against the PSE account holder account; the PSE service center determining if a sufficient amount of the currency type is in a currency sub-account of the PSE account holder to cover the transaction amount; if sufficient currency to cover the transaction amount, transferring the transaction amount via ACH/IAT or wire to the merchant account designated from POS transferred information; if insufficient currency to cover the transaction amount, liquidating to currency value a quantity of certified precious metal units from the PSE account holder certified precious metal unit sub-account to cover the transaction amount in the currency type; transferring the transaction amount via ACH/IAT or wire to the merchant account designated from POS transferred information; determining if any remaining currency from the liquidation and depositing the remaining currency in the currency sub-account of the PSE account holder; and updating the PSE account holder account accordingly, and any corresponding certified precious metal unit records in the certified precious metal unit registry accordingly.

BRIEF DESCRIPTION OF THE DRAWINGS

The aspects of the system will be better understood from the following detailed description with reference to the drawings, which are not necessarily drawing to scale and in which:

FIG. 13 illustrates a physical secure environment system and a method of conversion of raw precious metal into the physical secure environment;

FIG. 14 illustrates an account holder conversion request form;

FIG. 15 illustrates a certified precious metal unit registration record;

FIG. 16 illustrates a method of converting raw precious metal into the physical secure environment;

FIG. 17 illustrates a second physical secure environment system and a method of presenting a contract to purchase certified precious metal units in the physical secure environment system;

FIG. 18 illustrates an account holder contract form to purchase certified precious metal units;

FIG. 19 illustrates a method of presenting a contract to purchase certified precious metal units in the physical secure environment system;

FIG. 21 illustrates an account holder physical transfer request form;

FIG. 22 illustrates a method of requesting the physical transfer of certified precious metal units within the physical secure environment system;

FIG. 24 illustrates an assignment request form;

FIG. 25 illustrates a method of requesting to assign designated certified precious metal units to an assignee within the physical secure environment system;

FIG. 27 illustrates an external transfer request form;

FIG. 28 illustrates a method of requesting to externally transfer designated certified precious metal units or the value of the designated certified precious metal units out of the physical secure environment system;

FIG. 29 illustrates a sixth physical secure environment system and a method of using a debit card of a physical secure environment account holder to conduct a financial transaction with a merchant via a point-of-sale API an e-commerce platform or a point-of-sale device in a physical store;

FIG. 30 illustrates a method of using a debit card of a physical secure environment account holder to conduct a financial transaction with a merchant.

DETAILED DESCRIPTION

Figure 1:
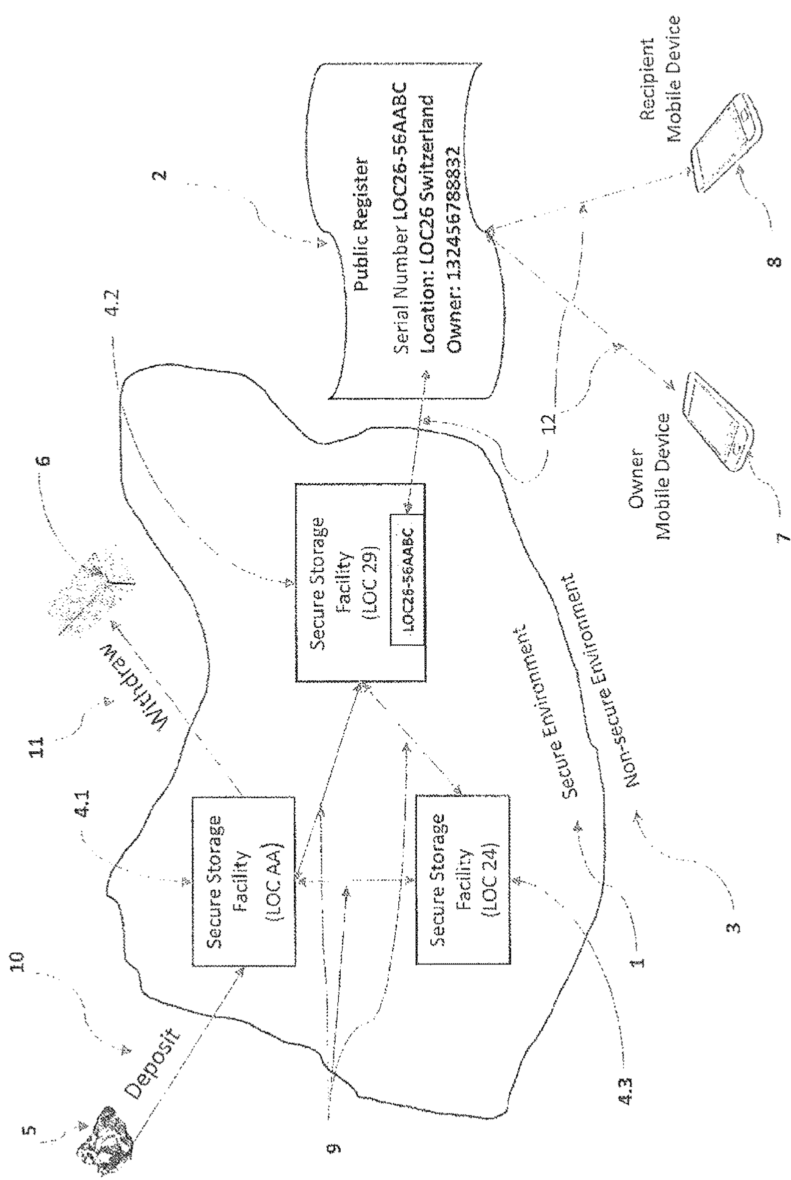
FIG. 1 illustrates the primary components of the Secure Environment Register system and method.

To overcome the problems associated with the current state of the art, and to provide a safe, secure method of trading gold or other precious metals, a system and method are provided which provide quality verification, storage, and transactions in a secure environment and meeting government laws and regulations using a blockchain public register, allowing individuals and institutions a novel method for use of physical precious metals such as gold.

The Secure Environment Public/Private Register (SEPR) is a method and system that allows precious metals bar or units to be certified, specially numbered to provide exact linkage to an owner, allow secure movement of precious metals between secure facilities, and through blockchain, allow secure transfer of ownership between individuals, organizations, international institutions, and countries. The SEPR allows gold and other precious metals to be easily in commerce with all the advantages of holding precious metals. The SEPR system will also allow exact audits of the metal bars on hand and avoid over-selling units since each bar is serialized and ownership is documented in a public register.

In one aspect, the SEPR system is built on one or more secure storage facilities connected with secure transfer transportation equipment that verifies shipping and receipt of precious metals between secure facilities, different locations, countries, or with the metal owners. The secure environment has controlled entry and exit points for accepting metals, analyzing metals, refining metals to achieve the proper quality, forming metals to a designated weight, engraving, packaging, serial numbering, each metal bar, then entering each serial-numbered metal bar into a register. Each secure facility has exact accountability of the metal bars it holds. The register can be a blockchain register, Nonfungible Token (NFT) or any other public register system. The blockchain, NFT, or other public register system confirms to the owner assurances of quality, quantity, location, and security whereby the system allows for secure transfer of metals between secure storage facilities either physically or virtually, and to and from individuals and between individuals. The serial number can be on the bar or the packaging, or both.

The secure environment has one of more said secure facilities, secure entry and exit points. The entry points are configured to receive, inspect, process, and verify quality of metals entering the secure environment. The entry points have instruments to measure the weight and quality of metal they are receiving in the secure facility. The secure facility has a machine that can process metals entering the secure facility and can form metal bars to specific quality and weight specified in a bar unit. The entry point has equipment for engraving or labeling metal bars with a unique identification number. The secure facility has a register and documents each metal bar to include physical location and assigned owner. Each secure storage facility has a secure structure sufficient for storage of metal bars, a secure access protocol to maintain security and accountability of metal bars.

The secure environment has a secure transportation system which allows secure transfer of said gold bars between secure facilities.

The secure environment has a secure ownership accountability system, such as a blockchain register system to document ownership, transactions, and physical location of each metal bar.

Metal bar location is important since investors may want to locate different quantities of bars in different countries. A key factor in owning physical gold is deciding which countries an owner wants to locate their physical gold or other precious metals. International uncertainty and crises play a major part in diversification and confidence levels where to store precious metals. The SEPR system allows storage and transferring of metal bars between countries seamlessly and documented in a public register. The SEPR system would take into consideration international laws, storage requirements, and banking protocols.

In one aspect, the SEPR system uses gold and silver and other metals. An alternate aspect of the SEPR method and system uses other metals such as palladium, copper, or rare earth minerals.

With the invention of Blockchain, Public Key Infrastructure (PKI), internet connectivity, Nonfungible Tokens, a revolutionary approach has been developed with a configuration of our invention that solves current problems with owning, securing, storing, trading, and transferring gold and other precious metals.

FIG. 1 illustrates one aspect of the SEPR system. A physically secure environment 1 is established comprising physically secure storage facilities 4, 4.1, 4.2, and . . . 4.*n*; physically secure storage facilities transfer gold bars virtually or physically through physically secure links 9, within the physically secure environment 1.

The physically secure environment 1 differs from a non-secure environment 3 in such a manner that the metal bars remain in the physically secure environment 1 and are not stored with the owner. The owner may withdraw 11 of the bars 6 from the physically secure environment 1, but the bars are no longer considered part of the physically secure environment 1. Should an owner want to deposit 10 bars of gold 5 back into the physically secure environment 1, the bars have to go through a secure storage facility 4.1, 4.2 or 4.3 where bars are created or recertified 6. This aspect provides assurance that all bars within the physically secure environment 1 are certified and accounted for, at each of the physically secure locations. This provides confidence among individuals and organizations that trade metal bars.

The facilities within the physically secure environment 1 communicate with a public or private register 2 documenting all transactions, locations, and quantities of metal bars. Metal bar owners communicate through the Internet 12 on mobile devices 7 in order to conduct transactions to recipients through the Internet 12 and mobile device 8. Raw and bar metal deposits 5 are deposited into 10 a physically secure environment 1 facility for processing. Withdrawals 11 from the physically secure environment 1 can be made by owners requesting their bar 6 or bars.

Figure 2:
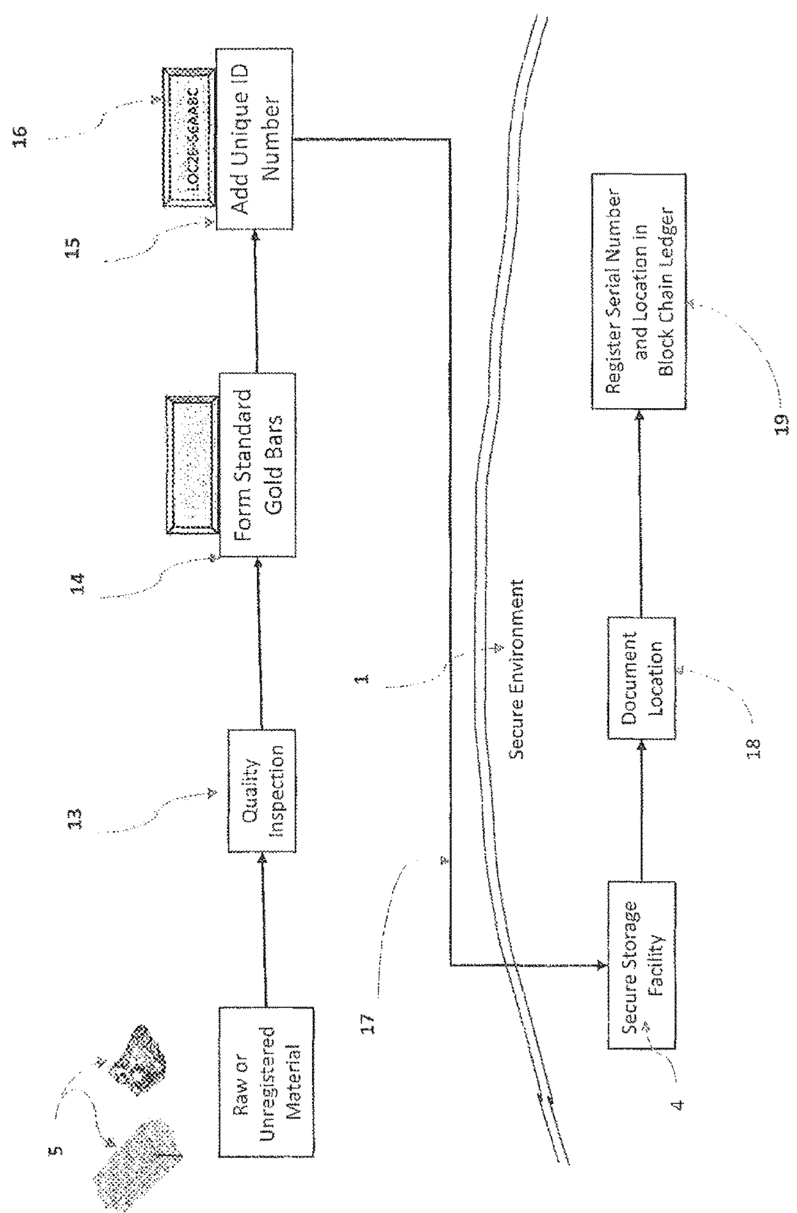
FIG. 2 illustrates a process for raw or unregistered precious metals entering the secure environment and secure storage facility.

FIG. 2 illustrates the detailed process of entering raw or unregistered material 5 into a physically secure environment 1. The raw, unregistered material 5 is inspected 13 for material quality, fineness, and composition. The material is processed to form standard metal bars of specific uniform characteristics that will allow for trade. Unique ID numbers 15 and identification information are added to each of the metal bars in order to create a unique metal bar 16. Once the unique metal bars 16 are created, they are officially entered 17 into the physically secure environment 1 at a physically secure facility 4. The physical secure facility 4 adds location information 18 for each metal bar and enters the data 19 into the public register 2.

Figure 3:
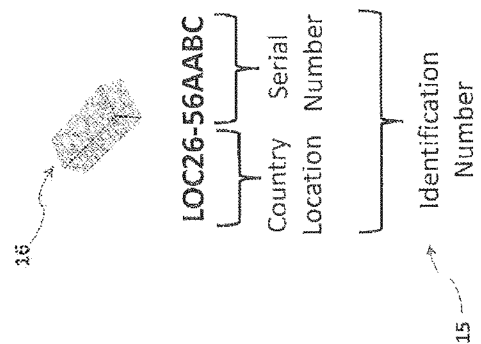
FIG. 3 illustrates the construction of an identification number.

FIG. 3 illustrates how a metal bar 16 is tracked and identified by a combination of country, location, and secure storage facility location 15. An alternate aspect for tracking can be utilizing the same identification number 15 and tracking location in the public register 2.

Figure 4:
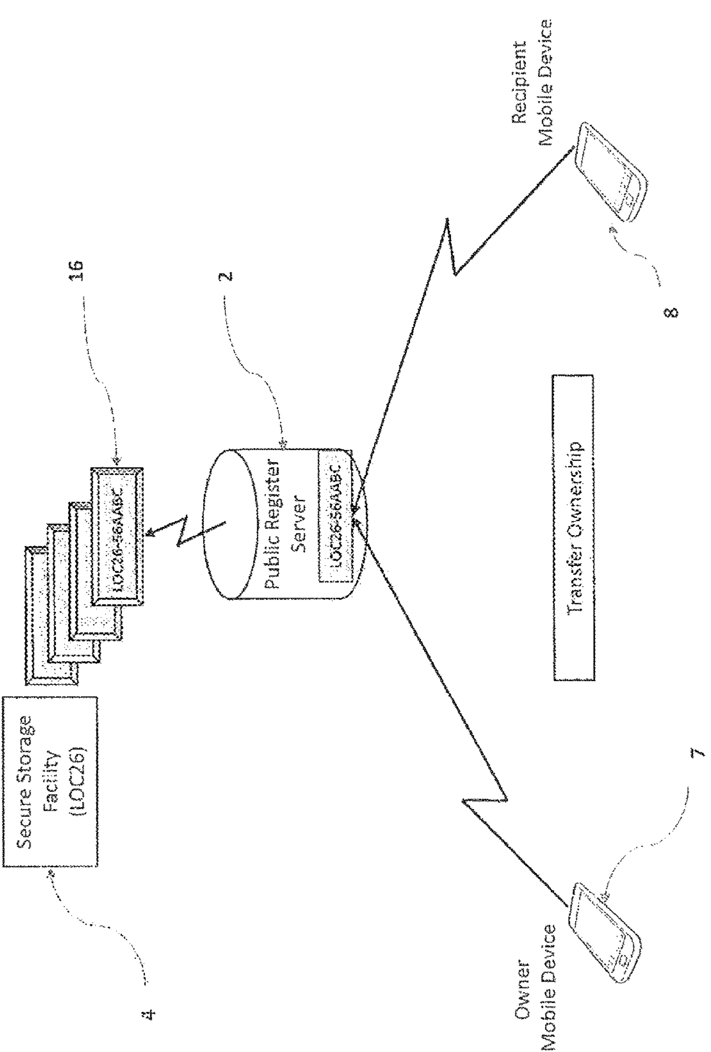
FIG. 4 illustrates transfer of a metal bar ownership between two mobile devices.

FIG. 4 illustrates the transfer of ownership from a mobile device 7 to a recipient's device 8 documented on the public register 2. The owner certifies his ownership of a gold bar 16 located at secure storage facility 4, as proof of ownership and availability for transfer of the gold bar or other metal bar. This transfer is done in accordance with standard blockchain, NFT, Internet business processes such as EIP-721. EIP-721 (Ethereum Improvement Proposal 712) is the standard industry process that defines the general standard that enables Ethereum wallets to display data in a structured, human-readable, and machine-verifiable format. This specification improves on EIP-191, the foundational signed data scheme that concealed users' private keys when approving transactions. It was implemented to streamline the verification of off-chain signatures within the Ethereum ecosystem, thereby enhancing the ecosystem's security and user experience. The EIP-721 specification introduced typed data—structured data consisting of type information. This enabled developers to parse data and identify its components in a message, given its known structure. Additionally, it allows users to verify the authenticity of messages before signing them, thereby enhancing security.

These transactions could also be represented by NFTs, using the standard practice described in EIP-721. As an alternative, a separate, privately controlled entity could be specifically set up for brokering the transactions between individuals, organizations and corporations.

Figure 5:
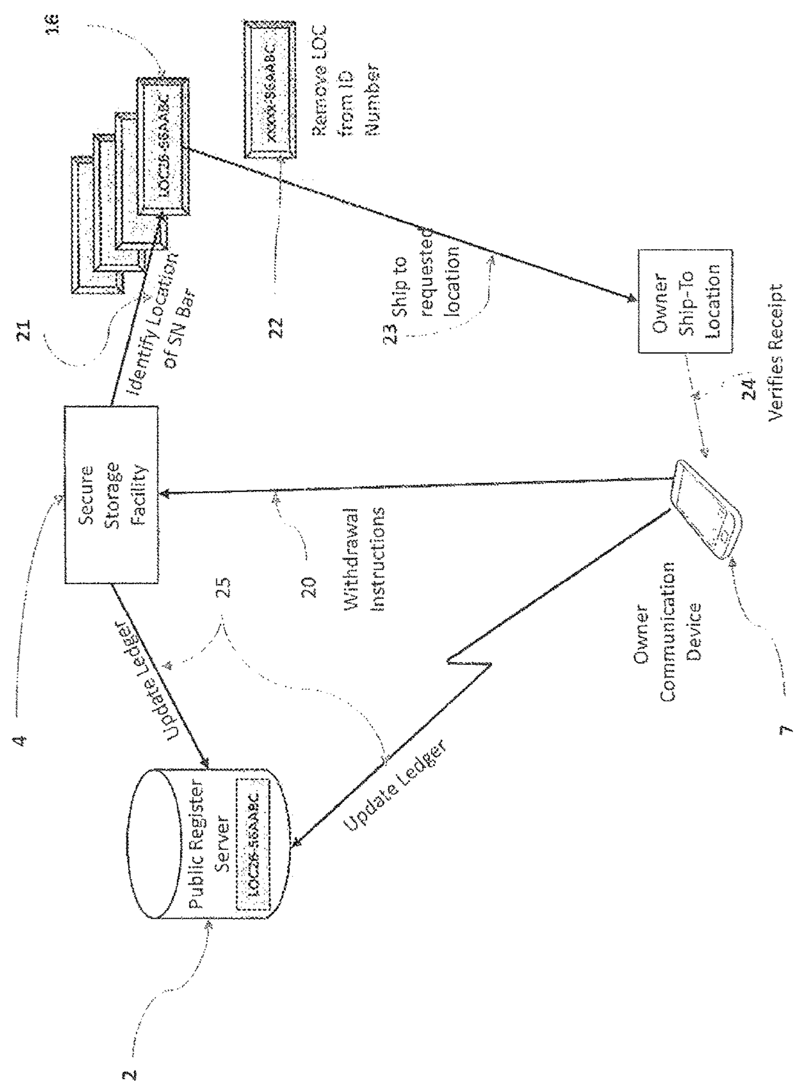
FIG. 5 illustrates the process of withdrawing a metal bar from the secure environment.

FIG. 5 illustrates the process for an owner requesting to receive his metal bar 16. The owner's communication device 7 communicates to the physically secure storage facility 4 a request for his documented gold bar(s) 16. The physically secure storage facility 4 then identifies the location 21 of the gold bar 16. The physically secure storage facility 4, along with the owner's communication device 7 would update 25 the public/private register 2. The physically secure storage facility 4 would then de-process the gold bar 16 by removing specific location information 22 and shipping the de-processed gold bar 22 to the owner's requested location 23. The owner then verifies receipt 24.

Figure 6:
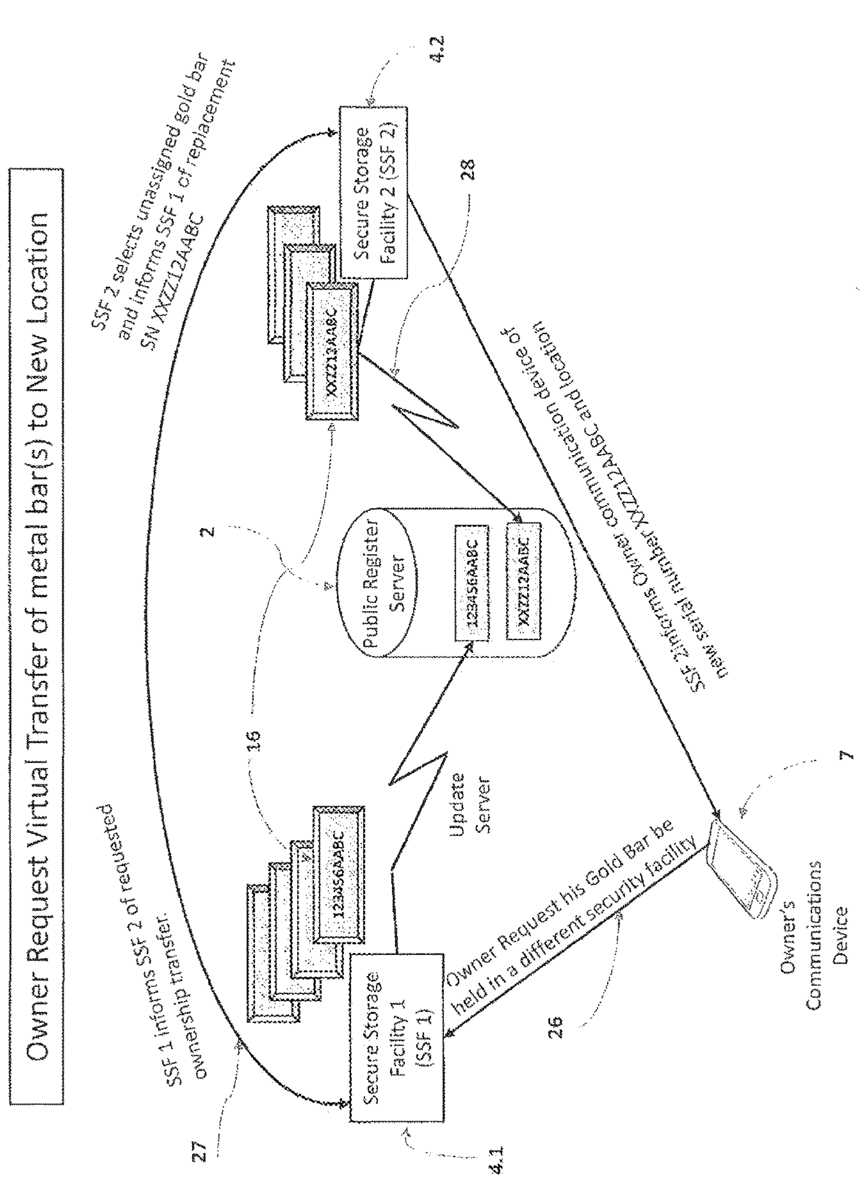
FIG. 6 illustrates the process to transfer ownership virtually to a new location within the secure environment.

FIG. 6 illustrates an owner's request to virtually transfer metal bars to a new location. Owner's communication device 7 then sends a request 26 to the physically secure storage facility 4.1 where the owner's metal bar 16 currently resides, to transfer the metal bar 16 to a specific new physically secure storage facility 4.2 in a different location or different country. Physically secure storage facility 4.1 requests a virtual transfer 27 to transfer an equivalent metal bar 16. Physically secure storage facility 4.2 selects unassigned metal bars and informs the physically secure storage facility 4.1 of replacement identification number. Physically secure facility 4.2 and the physically secure facility 4.1 both update the public/private register record 2 of the change of ownership of metal bar 16 through the equivalent bar with different location and serial number. The physically secure facility 4.2 informs owner's communication device 7 of the new serial number and location as documented in the public/private register 2.1.

Figure 7:
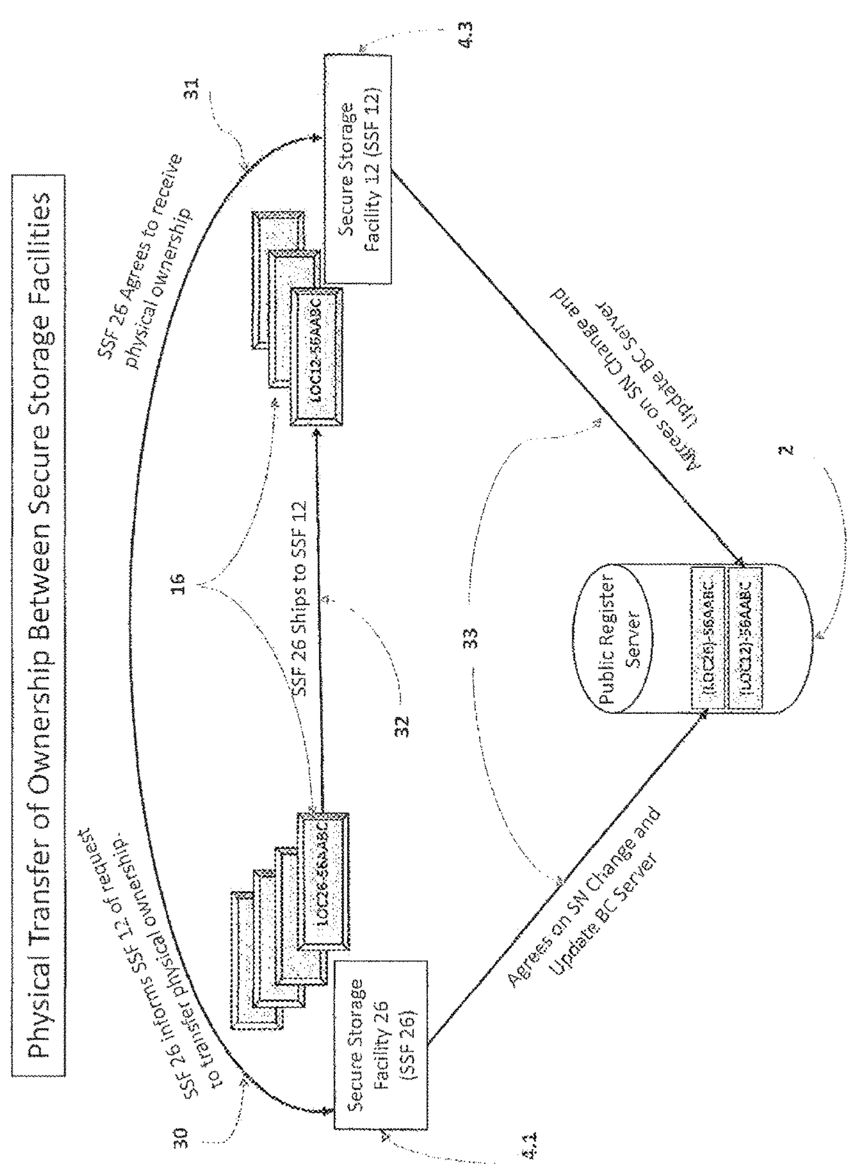
FIG. 7 illustrates the process to physically transfer ownership to a new location within the secure environment.

FIG. 7 illustrates physical transfer of ownership between secure storage facilities. Physically secure storage facility 4.1 informs 30 physically secure storage facility 4.3 of a request to send or receive physical bars. Physically secure storage facility 4.3 agrees 31 to the shipping or receiving of physical bars. Physically secure storage facility 4.1 ships or receives metal bar 16 to the physically secure storage facility 4.2. The corresponding record 2 at the public/private register 2.1 is updated 33 by both secure storage facilities 4.1, 4.2.

Figure 8:
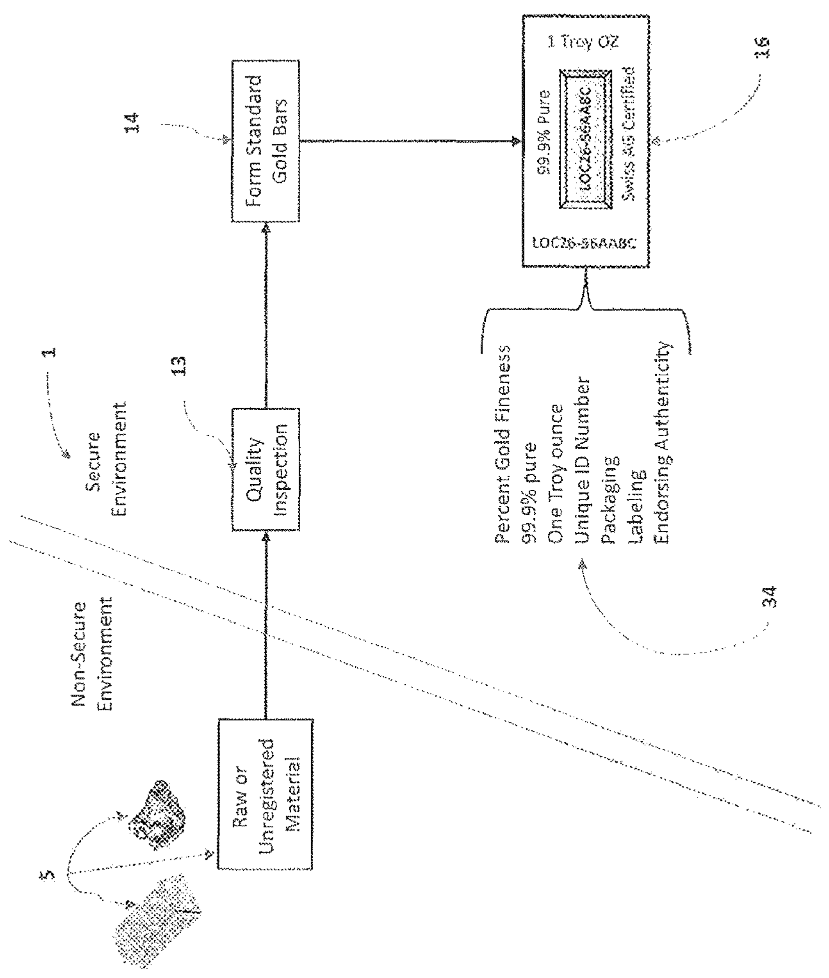
FIG. 8 illustrates several quality requirements for metals outside the secure environment to be performed to convert to standard metal bars for trading inside the secure environment.

FIG. 8 illustrates depositing raw or unregistered material 5 from a non-secure environment 3 into a physically secure environment 1. The raw or unregistered material 5 goes through quality inspections 13 and metal bars are formed 14. These metal bars 14 meet requirement standards 34 and once properly labeled, they become certified metal bars 16.

Figure 9:
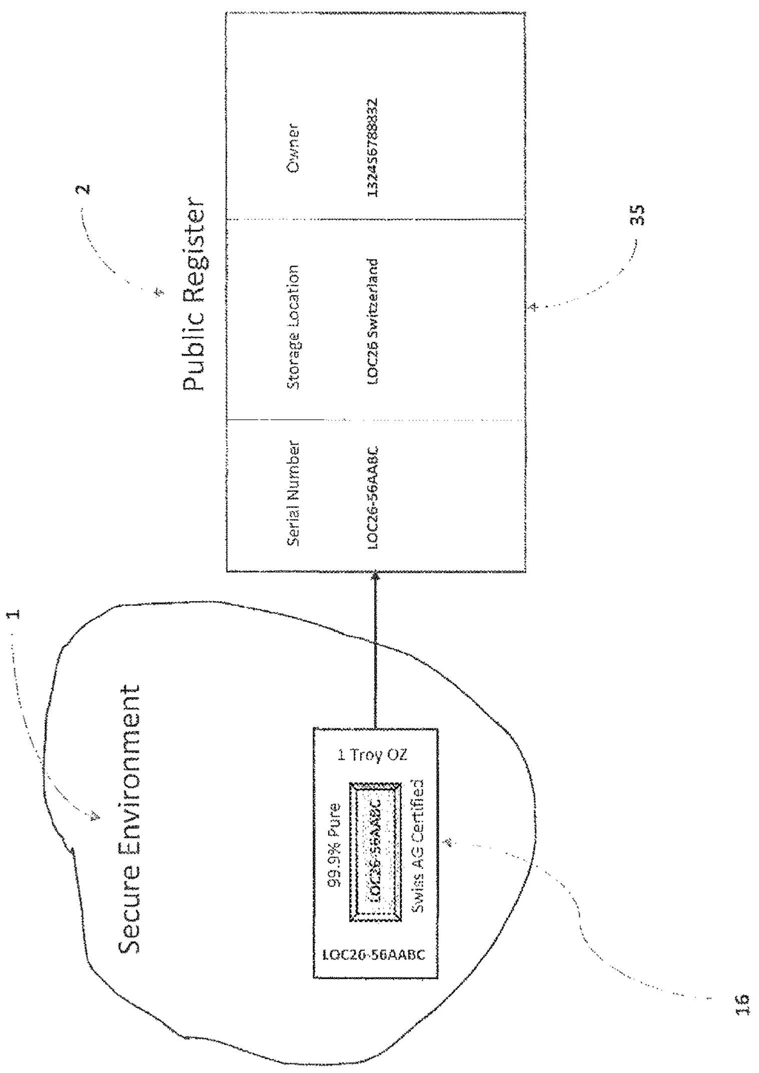
FIG. 9 illustrates several data requirements that are on each metal bar and information that would be in the public ledger or blockchain ledger.

FIG. 9 illustrates certified metal bars 16 in a physically secure environment 1 providing to the public/private register 2 of a specific record 35 of identification, storage and owner information.

Figure 10:
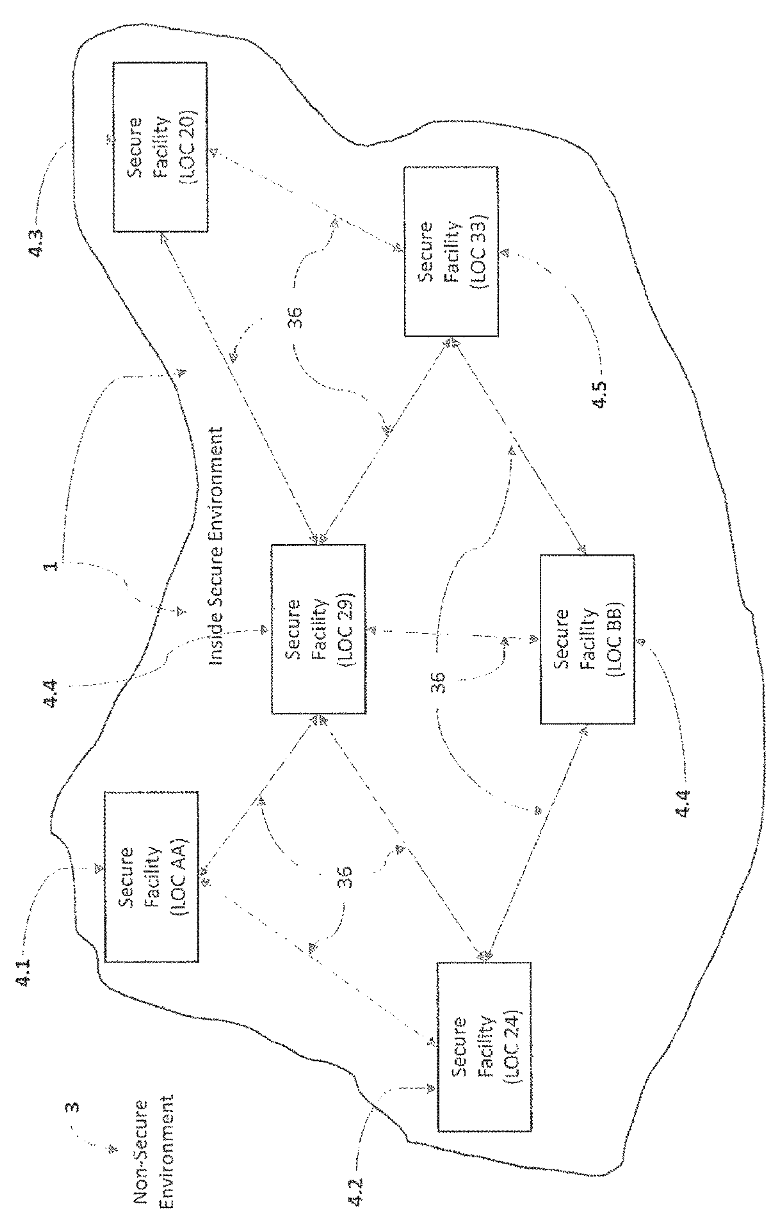
FIG. 10 illustrates normal transactions of metals and/or metal bars transitioning throughout the secure environment.

FIG. 10 illustrates virtual and physical transactions 36 between physically secure storage facilities 4.1, 4.2, 4.3, 4.4, and 4.5 inside a physically secure environment 1.

Figure 11:
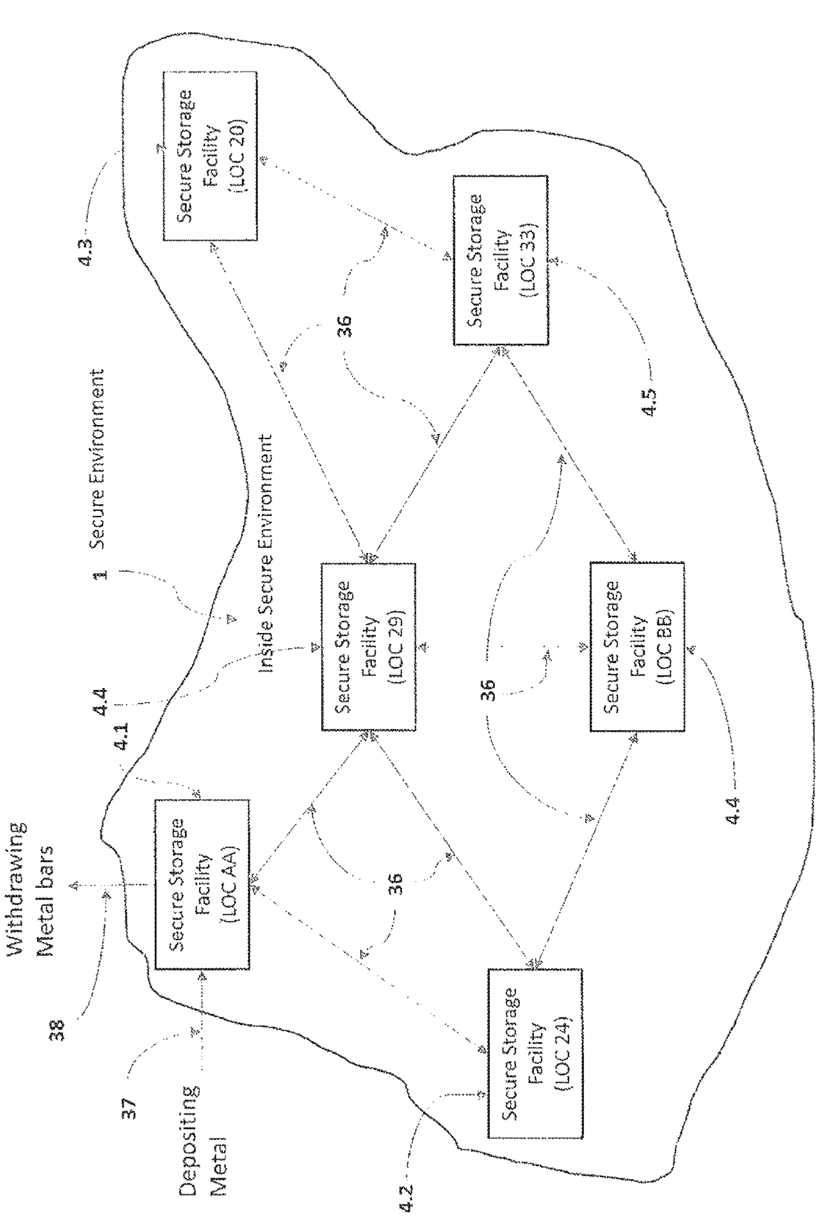
FIG. 11 illustrates normal transaction of metals and/or metal bars being deposited into the secure environment, moving around within the secure environment, and withdrawn from the secure environment.

FIG. 11 illustrates depositing metals 37 from a non-secure environment 3 to a physically secure storage facility 4.1, for processing inside a physically secure environment 1. Once the deposited gold or other metal is processed and in the form of certified metal bars, the certified metal bar(s) can be transferred either virtually or physically 36 between physically secure storage facilities 4.2, 4.3, 4.4, and 4.5. Certified gold bars can be withdrawn 38 from the physically secure environment 1 to the non-secure environment 3.

Figure 12:
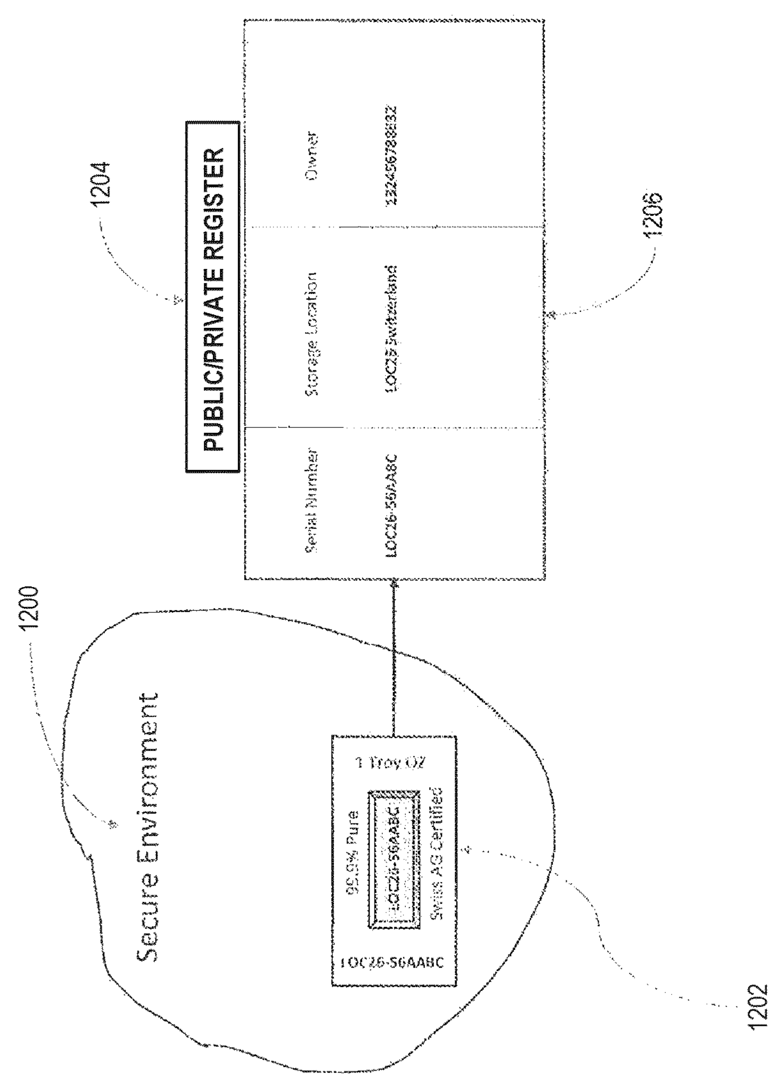
FIG. 12 illustrates a private register that documents the ownership of each precious metal bar.

FIG. 12 illustrates a private register 1204, (similar to the public register 2 of FIG. 9). that documents the ownership of each precious metal bar or unit 1202 within a physically secure environment 1200. In contrast, public register 2, as illustrated in FIG. 9, would be similar to a public Block Chain register or any register that is open to the public. A private register 1204 would be similar to an established commodities market or brokerage firm that controls and documents which of their client owns particular commodities or securities. The Secure Environment 1200 of FIG. 12 thus relies on a private register 1204 to record private register records 1206 that reflect ownership for each precious metal bar or unit 1202. A key configuration is that each precious metal bar unit 1202 has a unique owner where commodities are not in a single common ownership pool. An example private register record 1206 illustrates a serial number for a precious metal bar or unit, a storage location and an owner identifier number for each precious metal bar or unit.

PSE System Description

The physical secure environment system 1300 is comprised of secure environment components including PSE (Physical Secure Environment) management components, regional PSE facilities at national and international levels, communication paths between the PSE management components and the regional PSE facilities, PSE transportation paths between the PSE regional facilities, and PSE couriers that operate within the physical secure environment system 1300 along the PSE transportation paths. The physical secure environment system 1300 further includes other components outside of the secure environment that may include account holder facing components, transactional components and public facing components.

The PSE management components include a PSE service center 1322 that manages aspects of communication between PSE facilities, record keeping of all certified precious metal units within the physical secure environment system 1300, coordination of transportation between PSE facilities, coordination of intake and processing of any raw precious metal into the physical secure environment system 1300, receiving account holder information regarding any account related actions or activity of certified precious metal within the physical secure environment system 1300, maintaining records of certified precious metal records, maintaining user accounts of account holders within the physical secure environment system 1300, providing account holder user interface for maintaining account holder user sessions with the physical secure environment system 1300, and providing account holder cost information related to processing raw precious metal, transporting and/or withdrawal of certified precious metal units within or out of the physical secure environment system 1300, assignment of ownership between PSE storage facilities, external transfers of value from account holders outside of PSE facilities, and financial transactions using debit cards at merchant points-of-sale in e-commerce APIs and at physical locations.

The PSE Management Components further include a PSE registration database 1324 in communication with the PSE service center 1322 that may store a plurality of certified precious metal unit registration records 1326, each record having been initially created during a certification facility within the physical secure environment system 1300, and updated during the lifecycle of the certified precious metal unit with transportation, location and account holder ownership information until the corresponding certified precious metal unit is deprocessed out of the physical secure environment system 1300 by physical transfer.

The PSE Management Components further includes an account user interface 1318 in communication via a fifth communication path 1320 that provides a portal for inputting and outputting communication between an account holder 1302 and the PSE service center 1322.

The PSE Management Components further includes a PSE account holder registry 1332 in communication with the PSE service center 1322 that provides for the generation and maintenance of a user account 1334 corresponding to each account holder of the physical secure environment system 1300. The PSE account holder registry 1332 functions to account for certified precious metal units held by each account holder 1302 in addition to any number of fiat currencies also held by each account holder 1302 in their respective PSE user account 1334.

The physical secure environment system 1300 is further comprised of regionally distributed PSE facilities that perform various functions, allow particular transactions, and coordinate transportation related to the certified precious metal units within the physical secure environment system 1300. The following are representative examples of regionally distributed PSE facilities that operate within the physical secure environment system 1300.

For example, a Country Y first PSE facility 1354, represented by solid double lines in the drawings, may include processing, certification and shipping facilities for certified precious metal units at a first location in a particular country or region.

In another example, a Country Y second PSE facility 1362, represented by solid double lines in the drawings, may include processing, certification and shipping facilities for certified precious metal units at a second location in the same particular country or region.

In another example, a Country Y third PSE 1370, represented by solid double lines in the drawings, may include a first storage facility for certified precious metal units at a first location in the same particular country or region.

In another example, a Country Y fourth PSE 1374, represented by solid double lines in the drawings, may include a second storage facility for certified precious metal units at a second location in the same particular country or region.

Furthermore, in an example of another country or region distinct from the above examples, a Country Z first PSE 1384, represented by solid double lines in the drawings, may include processing, certification and shipping facilities for certified precious metal units at a first location in a second particular country or region.

Additionally, in another example, a Country Z second PSE 1388, represented by solid double lines in the drawings, may include a storage facility for certified precious metal units at a location in the second particular country or region PSE Communication Paths The physical secure environment system 1300 may maintain a centralized communication system with the PSE service center 1322 via a plurality of communication paths, represented by dot-dash-dot lines in the drawings, to each of the distributed PSE facilities of the physical secure environment system 1300.

The PSE service center 1322 may maintain a PSE service center communication path 1336 with a second wide area network 1338 to receive and transmit information regarding instructions, transactions, transportation, certification and deprocessing of certified precious metal units within the physical secure environment system 1300 by means of, for example, a first PSE data communication path 1340 with the Country Y first PSE facility 1354; a second PSE data communication path 1342 with the Country Y second PSE facility 1362; a third PSE data communication path 1344 with the Country Y first storage facility 1372; a fourth PSE data communication path 1346 with the Country Y second storage facility 1376; a fifth PSE data communication path 1348 with the Country Z first PSE 1384; and, a sixth PSE data communication path 1350 with the country Z storage facility 1389.

PSE Transportation Paths

PSE transportation path or routes, represented by solid double lines in the drawings between PSE facilities, are routes that provide transportation of the certified precious metal units between PSE facilities in the physical secure environment system 1300. The following are representative examples of routes that may be taken between PSE facilities.

An exemplary Country Y first PSE transportation route 1378 may be provided between either or both the Country Y first PSE facility 1354 and/or the Country Y second PSE facility 1362 to either of the Country Y first storage facility 1372 or the Country Y second storage facility 1376. The purpose of the Country Y first PSE transportation route 1378 may be to provide transportation of the certified precious metal units from the processing and certification that takes place within the Country Y first PSE facility 1354 to any of the PSE storage facilities within Country Y 1352.

Another exemplary Country Y second PSE transportation route 1381 may be provided between both of the PSE storage facilities of Country Y 1352, for example, between Country Y first storage facility 1372 and Country Y second storage facility 1376. The purpose of Country Y second PSE transportation route 1381 may be to provide transportation of certified precious metal units between PSE storage facilities based on account holder's instructions processed by the PSE service center 1322.

An exemplary Country Z first PSE transportation route 1390 may be provided between the Country Z first PSE 1384 and the country Z storage facility 1389. The purpose of the Country Z first PSE transportation route 1390 may be to provide transportation of the certified precious metal units from the processing and certification that takes place within the Country Z first PSE 1384 to the PSE storage facility within Country Z 1383.

A further exemplary first international PSE transportation route 1392 may be provided between the Country Y first storage facility 1372 of Country Y 1352 and the country Z storage facility 1389 of Country Z 1383. The purpose of first international PSE transportation route 1392 may be to provide transportation of certified precious metal units between PSE storage facilities of different nations based on account holder's instructions processed by the PSE service center 1322.

A further exemplary second international PSE transportation route 1396 may be provided between the Country Y second storage facility 1376 of Country Y 1352 and the country Z storage facility 1389 of Country Z 1383. The purpose of second international PSE transportation route 1396 may be to provide transportation of certified precious metal units between PSE storage facilities of different nations based on account holder's instructions processed by the PSE service center 1322.

PSE Couriers

PSE couriers are provided by the physical secure environment system 1300 to maintain secure continuity of the certified precious metal units within the physical secure environment system 1300 while being transported between PSE facilities, whether upon initial processing at a processing facility like Country Y first PSE facility 1354, or between national or international PSE storage facilities. The following are examples of PSE couriers that may operate within the physical secure environment system 1300 to maintain physical control of certified precious metal units within the physical secure environment system 1300.

For example, a country Y first national PSE courier 1380 may provide transportation of certified precious metal units between PSE processing facilities and storage facilities within a particular nation, for example, Country Y 1352.

In another example, country Y second national PSE courier 1382 may provide transportation of certified precious metal units between different storage facilities within a particular nation, for example, Country Y 1352.

In another example, a country Z first national PSE courier 1391 may provide transportation of certified precious metal units between PSE processing facilities and storage facilities within a particular nation, for example, Country Z 1383.

In another example, a country Z second national PSE courier 1394 and a country Z third national PSE courier 1398 may provide transportation of certified precious metal units between international couriers outside of their respective nation, to a PSE storage facility, for example, country Z storage facility 1389 within their Country Z 1383.

In another example, a first international PSE courier 1393 and a second international PSE courier 1397 may provide transportation of certified precious metal units between storage facilities of a first nation, for example, Country Y 1352, and PSE couriers corresponding with storage facilities of a second nation, for example Country Z 1383.

PSE System at National and International Levels

At a national level, the physical secure environment system 1300 may include at least two types of PSE facilities, namely, a precious metal processing and certification facilities, and storage facilities. There may be instances where a particular country may not have any PSE processing and certification facility, but only PSE storage facilities. The drawings illustrate the pairing of PSE processing and certification facilities with PSE storage facilities for illustration purposes of the description, but the description is not necessarily limited by the requirement of both types of PSE facilities in the same country.

The following anticipates the PSE facilities may be found in paired national combinations or may be nationally isolated from each other. The following PSE national-level facilities are provided as exemplary representations for the following description.

In one example, a Country Y 1352 may include a Country Y first PSE facility 1354 having a Country Y first PSE precious metal processing facility 1356 for receiving and processing raw or uncertified precious metal thereto, a Country Y first PSE certification facility 1358 for certifying the processed precious metal from the country Y first PSE precious metal processing facility 1356 and communicating certification information for each certified precious metal unit to the PSE service center 1322 to generate one certified precious metal unit registration record 1326 to be stored in the PSE registration database 1324, and a Country Y first PSE shipping facility 1360 to coordinate shipping or transporting the certified precious metal units to various storage facilities within the physical secure environment system 1300.

In another example, the Country Y 1352 may include a Country Y second PSE facility 1362 having a country Y second PSE precious metal processing facility 1364 for receiving and processing raw or uncertified precious metal thereto, a country Y second PSE certification facility 1366 for certifying the processed precious metal from the country Y second PSE precious metal processing facility 1364 and communicating certification information for each certified precious metal unit to the PSE service center 1322 to generate one certified precious metal unit registration record 1326 to be stored in the PSE registration database 1324, and a country Y second PSE shipping facility 1368 to coordinate shipping or transporting the certified precious metal units to various storage facilities within the physical secure environment system 1300.

In other example, the Country Y 1352 may include a Country Y first storage facility 1372 for storing, receiving and transporting certified precious metal units to other PSE storage facilities within the same country or to a different country within the physical secure environment system 1300, or when a certified precious metal unit is deprocessed by transporting it to a location outside of the physical secure environment system 1300.

In other example, the Country Y 1352 may include a Country Y fourth PSE 1374 for storing, receiving and transporting certified precious metal units to other PSE storage facilities within the same country or to a different country within the physical secure environment system 1300, or when a certified precious metal unit is deprocessed by transporting it to a location outside of the physical secure environment system 1300.

National PSE Transportation System

In one example, a Country Y first PSE transportation route 1378 may be established between the PSE processing facilities, for example, the Country Y first PSE facility 1354 and the Country Y second PSE facility 1362, and the PSE storage facilities, for example, the Country Y first storage facility 1372 and/or Country Y second storage facility 1376.

In another example, a country Y first national PSE courier 1380 may be established for the Country Y first PSE transportation route 1378 to maintain certified precious metal units within the physical secure environment system 1300.

In another example, a Country Y second PSE transportation route 1381 may be established between PSE storage facilities, for example, Country Y first storage facility 1372 and Country Y second storage facility 1376.

In another example, a country Y second national PSE courier 1382 may be established for the Country Y second PSE transportation route 1381 to maintain certified precious metal units within the physical secure environment system 1300.

In one example, another Country Z 1383 may include a Country Z first PSE 1384 having a country Z processing facility 1385 for receiving and processing raw or uncertified precious metal thereto, a country Z certification facility 1386 for certifying the processed precious metal from the country Z processing facility 1385 and communicating certification information for each certified precious metal unit to the PSE service center 1322 to generate one certified precious metal unit registration record 1326 to be stored in the PSE registration database 1324, and a country Z shipping facility 1387 to coordinate shipping or transporting the certified precious metal units to various storage facilities within the physical secure environment system 1300.

In other example, the Country Y 1352 may include a Country Y first storage facility 1372 for storing, receiving and transporting certified precious metal units to other PSE storage facilities within the same country or to a different country within the physical secure environment system 1300, or when a certified precious metal unit is deprocessed by transporting it to a location outside of the physical secure environment system 1300.

In one example, a Country Z first PSE transportation route 1390 may be established between the PSE processing facility, for example, the Country Z first PSE 1384 and the PSE storage facilities, for example, the country Z storage facility 1389.

In another example, a country Z first national PSE courier 1391 may be established for the Country Z first PSE transportation route 1390 to maintain certified precious metal units within the physical secure environment system 1300.

International PSE Transit Between PSE Facilities

In one example, a first international transportation route may be between a first PSE storage facility located in a first country and a PSE storage facility of another country. For example, a first international PSE courier 1393 may provide transportation of certified precious metal units between the Country Y first storage facility 1372 and the Country Z 1383. Thereafter, a country Z second national PSE courier 1394 may provide transportation of the certified precious metal units along country Z second PSE transportation route 1395 to the country Z storage facility 1389 in the Country Z second PSE 1388. At each point in the transportation between the PSE facilities, physical custody of the certified precious metal units are maintained by the PSE couriers.

In another example, a second international transportation route may be between another PSE storage facility located in the first country and the PSE storage facility of the other country. For example, a second international PSE courier 1397 may provide transportation of certified precious metal units between the Country Y second storage facility 1376 and the Country Z 1383. Thereafter, a country Z third national PSE courier 1398 may provide transportation of the certified precious metal units along country Z third PSE transportation route 1399 to the country Z storage facility 1389 in the Country Z second PSE 1388. Again, at each point in the transportation between these PSE facilities, physical custody of the certified precious metal units is maintained by the PSE couriers.

Communication within Physical Secure Environment System

The PSE service center 1322 may be in communication with each PSE component and facility in the physical secure environment system 1300. To accomplish this communication, the PSE service center 1322 may provide two categories of communication. The first category is with other PSE facilities within the physical secure environment system 1300, and the second category is with other components outside of the physical secure environment system 1300, which may typically be account holder facing components and transactional components.

Communication with PSE Facilities

The PSE service center 1322 may communicate along a PSE service center communication path 1336 with a second wide area network 1338. The second wide area network 1338 may be in distributed communication with various PSE facilities within the physical secure environment system 1300.

For example: a first PSE data communication path 1340 may provide communication with the Country Y first PSE facility 1354; a second PSE data communication path 1342 may provide communication with the Country Y second PSE facility 1362; a third PSE data communication path 1344 may provide communication with the Country Y first storage facility 1372; a fourth PSE data communication path 1346 may provide communication with the Country Y second storage facility 1376; a fifth PSE data communication path 1348 may provide communication with the Country Z first PSE 1384; and a sixth PSE data communication path 1350 may provide communication with the country Z storage facility 1389.

Communication between the PSE service center 1322 and each of the above identified PSE facilities may include receiving information regarding certified precious metal units within the physical secure environment system 1300; generating, maintaining and updating records for all certified precious metal units within the physical secure environment system 1300; coordinating and tracking the transportation of all certified precious metal units between PSE facilities; coordinating the intake and processing of raw or uncertified precious metal into the physical secure environment system 1300; maintaining user accounts of account holders within the physical secure environment system 1300; providing account holder user interface for maintaining account holder user sessions with the physical secure environment system 1300; receiving account holder information regarding any account related actions or activity of certified precious metal units within the physical secure environment system 1300; providing account holder cost information related to processing raw precious metal or transporting certified precious metal units between PSE facilities; transporting and/or withdrawal of certified precious metal units within or out of the physical secure environment system 1300; assigning ownership of certified precious metal units between PSE storage facilities; transferring certified precious metal units or its associated value outside the PSE system; and conducting a financial transaction with a merchant using a merchant point-of-sale e-commerce API or physical device with a PSE account holder using certified precious metal units to enable the financial transaction in the merchant financial institution's currency of choice.

PSE Service Center—Communication External to the Physical Secure Environment System 1300

The PSE service center 1322 may further communicate with PSE components outside of the physical secure environment system 1300 for client-facing, record keeping and information publication purposes.

The PSE service center 1322 may provide a fifth communication path 1320 to maintain an account user interface 1318 to support user interaction. For example, an account holder 1302 may communicate with the PSE service center 1322 via an account holder input device 1310, for example, a mobile device and/or a web browser, via a first wide area network 1314 that interfaces with the account user interface 1318.

The PSE service center 1322 may further provide a PSE registration database 1324 for storing a plurality of certified precious metal unit registration records 1326 corresponding to each of the certified precious metal units held within the physical secure environment system 1300 in real time.

The PSE service center 1322 may further provide a PSE account holder registry 1332 that maintains a PSE user account 1334 for each of a plurality of account holders within the physical secure environment system 1300 that may track both the account holder's certified precious metal units and fiat currencies.

Record keeping data that updates certified precious metal unit registration records 1326 of the PSE registration database 1324 may include owner information of each certified precious metal unit, location information of each certified precious metal unit, a transportation information or status of each certified precious metal unit, and deprocessing information of each certified precious metal unit.

PSE service center 1322 may further generate and publish price information to account holders or the general public for solicitation of business, regarding a conversion price publication 1330, or a contract price publication, (disclosed later herein), or any other price publication related to transfer, assignment or conversion of raw precision metal into the physical secure environment system 1300.

Exemplary Embodiment: Account Holder Conversion of Raw Precious Metal into the PSE System To convert raw PM to certified precious metal units of a PSE predetermined standard weight and quality, and store the certified precious metal units, of standardized weight and quality, under control of the PSE system in at least one PSE storage facility(ies), whereby the PSE system creates a new certified precious metal unit record for each certified precious metal unit processed and certified by the PSE facility, creates or updates a corresponding account of the account holder to reflect the ownership status of account holder's certified precious metal units at a corresponding location of a PSE storage facility(ies), and provides access to the account holder to enable transfer of ownership, transport to a different PSE facility, physical withdrawal, or conversion to a fiat currency for wire or ACH/IAT transfer, any or all of the account holder's certified precious metal units.

The PSE service center 1322 generates at least one conversion price publication 1330 that is published via a publication path 1328 to be viewed by any account holder of the physical secure environment system 1300 or members of the general public for purposes of solicitation. Additionally, the PSE service center 1322 may provide any number of published conversion price publications for various combinations of precious metal types, qualities, and currency type per standardized unit pairs, for example, PSE gold 999.99 in US Dollars per ounce, PSE silver 958 in British Pounds per ounce, etc.

The conversion price publication 1330 includes a series of conversion prices per unit value of raw precious metal related to a particular national PSE processing facility and a particular national storage facility. In the illustrated example, the first line of conversion price publication 1330 illustrates a price per unit value of 48 USD at country Y first PSE precious metal processing facility 1356 and storage of the converted certified precious metal unit(s) at Country Y first storage facility 1372.

In the illustration of FIG. 13, for example, an account holder may choose between two PSE processing facilities and two PSE storage facilities in Country Y 1352, and a single PSE processing facility and storage facility combination in Country Z 1383. Any number of combinations of PSE processing facilities and PSE storage facilities in any number of countries having PSE facilities may be contemplated and not limited to the examples of FIG. 13 for inclusion in the conversion price publication 1330 of PSE service center 1322.

An account holder 1302 may log onto the physical secure environment system 1300 via the account user interface 1318 maintained by PSE service center 1322. When the account holder 1302 communicates that they would like to initiate a conversion of raw or uncertified precious metal into the physical secure environment system 1300, the PSE service center 1322 transmits an intake request form 1306 via second communication path 1308 to the account holder 1302 via the fifth communication path 1320 to the account user interface 1318, the fourth communication path 1316 to the first wide area network 1314, the third communication path 1312 to the account holder input device 1310.

The account holder 1302 may then, via a first communication path 1304, input conversion request data into the intake request form 1306, and via the second communication path 1308, communicate the conversion input data from the intake request form 1306 to the PSE service center 1322 via the account holder input device 1310, the first wide area network 1314 and the first wide area network 1314.

FIG. 14 illustrates an account holder conversion intake request form 1400 including a number of information input records: a conversion request identifier record 1410, a raw precious metal input description record 1420, a certified precious metal unit and PSE processing facility record 1430, and a requested PSE storage facility record 1440.

The conversion request identifier record 1410 may include any number of input fields that may identify a request identifier (ID), an owner (or account holder) identifier (ID) number, and a request date.

The raw precious metal input description record 1420 may include a number of input fields, wherein the account holder may identify a first input description field 1422 identifying a first raw precious metal type being shipped to a PSE processing facility, a corresponding first raw precious metal weight, a corresponding first raw precious metal quality, and a corresponding first raw precious metal PSE destination processing facility location.

The account holder may include a second raw precious metal type to be converted into certified precious metal unit(s), wherein the raw precious metal input description record 1420 may further include a second input description field 1424 that may include an identification of a second raw precious metal type being shipped to the same or a different PSE processing facility, a corresponding second raw precious metal weight, a corresponding second raw precious metal quality, and a corresponding second raw precious metal PSE destination processing facility location that may be the same as the first PSE destination processing facility or a different PSE destination processing facility.

The account holder may include a nth raw precious metal type to be converted into certified precious metal unit(s), wherein the raw precious metal input description record 1420 may further include an nth input description field 1426 that may include an identification of an nth raw precious metal type being shipped to the same or a different PSE processing facility, a corresponding nth raw precious metal weight, a corresponding nth raw precious metal quality, and a corresponding nth raw precious metal PSE destination processing facility location that may be the same as the first or second PSE destination processing facility or a different PSE destination processing facility.

The certified precious metal unit and PSE processing facility record 1430 may include a number of input fields, wherein the account holder may identify a first requested certified precious metal unit description field 1432 identifying a first requested certified precious metal type, a first requested certified precious metal weight, a first requested certified precious metal quality, a first requested quantity of PSE standardized, (i.e., in precious metal type, weight and quality), units, and a first requested PSE processing facility.

The account holder may include a second requested certified precious metal unit description field 1434 to identify a second requested certified precious metal type, a second requested certified precious metal weight, a second requested certified precious metal quality, a second requested quantity of PSE standardized, (i.e., in precious metal type, weight and quality), units, and a second requested PSE processing facility that may be the same as the first PSE processing facility or a different PSE processing facility.

The account holder may include an nth requested certified precious metal unit description field 1436 to identify an nth requested certified precious metal type, an nth requested certified precious metal weight, an nth requested certified precious metal quality, an nth requested quantity of PSE standardized, (i.e., in precious metal type, weight and quality), units, and an nth requested PSE processing facility that may be the same as the first or second PSE processing facility or a different PSE processing facility.

The requested PSE storage facility record 1440 may include a number of input fields, wherein the account holder may identify a first requested certified precious metal unit PSE storage facility 1442 including an identification of a first processed and certified precious metal type, a first processed and certified precious metal weight, a first requested processed and certified precious metal quality, a first requested quantity of PSE standardized, (i.e., in precious metal type, weight and quality), units, and a first requested PSE storage facility for storing the first requested quantity of PSE standardized units.

The account holder may include a second requested certified precious metal unit PSE storage facility 1444 including an identification of a second processed and certified precious metal type, a second processed and certified precious metal weight, a second requested processed and certified precious metal quality, a second requested quantity of PSE standardized, (i.e., in precious metal type, weight and quality), units, and a second requested PSE storage facility for storing the second requested quantity of PSE standardized units.

The account holder may include an nth requested certified precious metal unit PSE storage facility 1446 including an identification of an nth processed and certified precious metal type, an nth processed and certified precious metal weight, an nth requested processed and certified precious metal quality, an nth requested quantity of PSE standardized, (i.e., in precious metal type, weight and quality), units, and an nth requested PSE storage facility for storing the nth requested quantity of PSE standardized units.

Once the PSE service center 1322 receives and processes the account holder input date from the intake request form 1306, the PSE service center 1322 transmits the PSE processing facility specific information to each of the PSE processing facilities corresponding to the account holder data on the intake request form 1306. For example, if the account holder 1302 requested that 10 oz. of 999.9 raw gold be processed into ten (10) 1.0 oz units of PSE certified precious metal units in Country Y 1352 at the Country Y second PSE precious metal processing facility 1364 at $46 USD/oz.

The PSE service center 1322 then sends these processing details to Country Y second PSE facility 1362 via second PSE data communication path 1342 such that Country Y second PSE facility 1362 may inspect the specified portion of the account holder raw precious metal 1301 when it is received from the account holder 1302 via second physical transportation path 1305.

In the same manner, account holder 1302 may cause the physical transport of the account holder's raw precious metal 1301 to, for example, Country Y first PSE facility 1354 via first physical transportation path 1303, and to Country Z first PSE 1384 via third physical transportation path 1307. Similarly, PSE service center 1322 would send relevant data to each of the PSE processing facilities enumerated in the intake request form 1306 to anticipate each delivery of the account holder raw precious metal 1301.

When any target PSE processing facility, (per specified information in the intake request form 1306), receives the account holder raw precious metal 1301, an inspection process is performed to verify the type, weight and quality of the received account holder raw precious metal 1301 and validate it against the information from the transmitted intake request form 1306.

If there is any discrepancy found in the inspection of the account holder raw precious metal 1301 by the target PSE processing facility as compared to the data in the intake request form 1306, the PSE facility may communicate directly with the account holder 1302 or via the PSE service center 1322 that an adjustment needs to be made to the requested certified precious metal units by the account holder 1302. For example, if the quality of the received RAW precious metal was less than specified and required further costs in refinement to the predetermined PSE standardized metal, weight and quality value, the PSE facility may propose a reduction in final number of standardized certified precious metal units to be processed by the PSE facility to offset the increased refining cost.

In another example, if the inspected raw precious metal weight of received account holder raw precious metal 1301 was less than the value specified in the intake request form 1306, then the PSE facility may propose a reduction in the final number of standardized certified precious metal units to be processed by the PSE facility to offset the discrepancy of raw precious metal weight.

Once an agreement has been made between the physical secure environment system 1300 and the account holder 1302 as to any discrepancies between the received account holder raw precious metal 1301 and the data on the intake request form 1306, or if there were no discrepancies, the PSE processing facility processes the received account holder raw precious metal 1301 into the requested standardized certified precious metal units specified by the account holder 1302 in the intake request form 1306.

The PSE processing facility may be compensated for the processing the account holder raw precious metal 1301 by reducing the amount of standardized certified precious metal unit equal to the price per unit, (per the conversion price publication 1330), multiplied by the total number of units of raw precious metal supplied by the account holder 1302. In the alternative, the account holder 1302 may pay the conversion price in a national currency or other cash equivalent to the physical secure environment system 1300.

After the PSE processing facility has completed processing the received raw precious metal into the PSE standardized precious metal unit(s), the corresponding target PSE certification facility, (usually associated with the target PSE processing facility), certifies the precious metal unit(s) according to the predetermined physical secure environment system 1300 standardized unit values, for example, precious metal type, weight value and quality value.

The certification process includes verifying the standardized unit values, and either rejecting the processed precious metal unit if the verification process fails, or, if the verification process is validated, first placing a physical CUSIP-type code with a unique precious metal unit specific serialized code on the certified precious metal unit, and then recording and sending the CUSIP-type code and serialized code via a corresponding PSE communication path to the PSE service center 1322 for generation of a new certified precious metal unit record to be stored in the one certified precious metal unit registration record 1326 for each certified precious metal unit.

The certified precious metal unit registration record 1326 may further capture information about each certified precious metal unit's origin, transportation, storage location, ownership information, and deprocessing information, if applicable.

FIG. 15 illustrates a certified precious metal unit registration record 1500 that corresponds with a record illustrated in FIG. 13 from the certified precious metal unit records 1326 stored in the PSE certified precious metal unit registry.

Exemplary registration record structure 1502 is provided that indicates a possible structure of the data of a certified precious metal unit. For example, registration record name 1504 header indicates the name or type of record in the registration record. Within the specified record are a number of fields categorized into two groups: a first group including status options fields 1506; and a second group, separated by a field type delimiter 1508, for example, a semicolon, including information fields 1510.

The status options fields 1506 may include a plurality of status option flags, for example, first status option field 1512, separated by an option field delimiter 1514, for example, a comma, from other status option fields in the record. Status option fields may be information that denotes a particular single status of a particular record type in the certified precious metal unit registration record 1500. For example, a record name may indicate that the status of the certified precious metal unit is either in transit via a PSE courier or in a PSE storage facility. There may be instances where more than one flag may be indicated for a particular record type.

The information fields 1510 may include a plurality of information fields, for example, a first information field 1516, separated by an information field delimiter 1518, for example, a comma, from other information fields in the record. Information fields may include any number of fields that further identify information about the certified precious metal unit.

A unit identifier record 1520 may include an information type field including a CUSIP-type code 1521 that uniquely identifies the certified precious metal unit based on the type of financial instrument or its issuer. ("CUSIP" Committee on Uniform Securities Identification Procedures). The CUSIP-type code 1521, for example, may identify the physical security environment system 1300 or any of a number of subsidiaries or trusted partners of the system.

The unit identifier record 1520 may further include an information type field including a unique certified precious metal unit identification code 1522 that may be uniquely serialized per precious metal unit to identify each certified precious metal unit.

A precious metal unit certification record 1530 may include an option type field including a certification flag 1531 that may indicate the certified precious metal unit has been certified by a particular PSE processing facility with a corresponding certification date.

The precious metal unit certification record 1530 may further include an option type field including a deprocessed flag 1532 that may indicate within the certified precious metal unit record, that a previously certified precious metal unit has been decertified and/or deprocessed from the PSE system 1300 and has a corresponding deprocessing date.

The precious metal unit certification record 1530 may further include an information type field including a certified precious metal type 1533 identifying a particular type of precious metal of the particular unit, for example, gold, silver, platinum, palladium, etc.

The precious metal unit certification record 1530 may further include an information type field including a certified precious metal quality 1534 identifying a particular quality or "fineness" of the particular unit, for example, gold fineness of "999.9", "999", "916", etc. Fineness, in gold, silver and other precious metals, typically expresses the percentage of precious metal to other metals in the certified unit in parts per thousand.

The precious metal unit certification record 1530 may further include an information type field including a certified precious metal weight 1535 identifying a particular weight of the particular unit, for example, 1.0 oz., 0.5 oz., 1.0 g, 1.0 kg, etc.

The precious metal unit certification record 1530 may further include an information type field including a certified precious metal packaging type 1536 identifying a packaging type of the particular unit, when a particular certify precious metal unit is enclosed within an external casing or housing. If the certified precious metal unit has no packaging, the certified precious metal packaging type 1536 may indicate a null value, accordingly.

A precious metal unit transit record 1540 may include an option type field including a transportation active flag 1541 that may indicate the certified precious metal unit is currently in an active PSE transportation route with a PSE courier, and a corresponding date that transportation was initiated.

A precious metal unit transit record 1540 may further include an option type field including a transportation inactive flag 1542 that may indicate the certified precious metal unit is currently in an inactive transportation mode, and a corresponding date that transportation was completed.

A precious metal unit transit record 1540 may further include an information type field including a departure location 1543 identifying a particular departure location of a particular unit and a corresponding departure date.

A precious metal unit transit record 1540 may further include an information type field including an estimated arrival location 1544 identifying a particular target or estimated arrival location of a particular unit and a corresponding estimated arrival date.

A precious metal unit transit record 1540 may further include an information type field including a PSE courier identifier 1545 identifying a particular PSE courier corresponding to particular travel activity of the certified precious metal unit.

A precious metal unit storage location record 1550 may include an option type field including a storage flag 1551 that may indicate the certified precious metal unit is currently in a particular PSE storage facility and a date corresponding to the particular unit been initially stored at that PSE storage facility.

A precious metal unit storage location record 1550 may further include an option type field including a transit flag 1552 that may indicate the certified precious metal unit is currently in a PSE transportation route and a date corresponding to the particular unit initiating travel in the PSE transportation route.

A precious metal unit storage location record 1550 may further include an information type field including an arrival location 1553 identifying a particular PSE storage facility that the particular unit has arrived at upon the conclusion of travel within a PSE transportation route, and a corresponding date of arrival at the corresponding PSE storage facility.

A precious metal unit storage location record 1550 may further include an information type field including a departure location 1554 identifying a particular PSE storage facility that the particular unit has departed from upon the initiation of travel within a PSE transportation route, and a corresponding date of departure from the corresponding PSE storage facility.

A precious metal unit ownership record 1560 may include an option type field including an original owner flag 1561 that may indicate that the certified precious metal unit is assigned to an "original" owner who either requested the owner's processed raw precious metal be converted to the particular certified precious metal unit within the PSE system, or an "original" or first owner of a PSE system unassigned certified precious metal unit. The original owner flag 1561 may further include a date on which the original owner was assigned an ownership right to the certified precious metal unit.

A precious metal unit ownership record 1560 may further include an option type field including a current owner flag 1562 that may indicate the certified precious metal unit is assigned to a non-original owner, or a "current" owner other than an original owner. The current owner flag 1562 may further include a date on which the current owner was assigned an ownership right to the certified precious metal unit from any other owner.

A precious metal unit ownership record 1560 may further include an option type field including an unassigned owner flag 1563 that may indicate the certified precious metal unit is unassigned and has no current assigned owner, and aid date on which a certified precious metal unit became designated as "unassigned" in the PSE system.

A precious metal unit ownership record 1560 may further include an information type field including an owner identifier number 1564 identifying a particular owner identification code associated with a certified precious metal unit and a date on which the corresponding owner identification number was last assigned to that particular certified precious metal unit. If a certified precious metal unit has no current owner assigned thereto, the owner identifier number 1564 may contain a null value indicating the corresponding certified precious metal unit is unassigned within the PSE system, and the last transaction date may correspond to when a previous ownership record was removed and not replaced with any new ownership record information.

A precious metal unit additional record 1570 may include any additional information about the certified precious metal unit including option type fields and information type fields.

Thereafter, the PSE facility coordinates with a PSE shipping facility to provide PSE courier transportation to a target PSE storage facility per the requested information of the account holder in the intake request form 1306. In one example, a target PSE storage facility may be remote from the PSE facility where the processing and certification of the certified precious metal units took place, for instance in FIG. 13, if Country Y first storage facility 1372 was located remotely from the Country Y first PSE facility 1354.

In addition, a PSE storage facility may be co-located with a PSE facility already including a PSE processing and certification facility. In this instance, a PSE courier would merely transport the certified precious metal units to a storage facility located in the PSE facility.

When the PSE courier receives the certified precious metal units, an information signal is sent back to the PSE service center 1322 via a PSE communication path to update each relevant certified precious metal unit registration record to identify the certified precious metal unit is in transit under PSE courier services.

When the PSE courier delivers the certified precious metal units to the PSE storage facility, whether local or remote for the PSE processing and certification facility, another information signal is send back to the PSE service center 1322 via the PSE communication path to update reach relevant certified precious metal unit registration record to identify the certified precious metal unit has been received from the PSE courier and is now stored in the PSE storage facility.

Thereafter, the PSE service center 1322 may validate the target PSE storage facility based on the account holder 1302 intake request form 1306 data requesting particular certified precious metal units to be stored at a requested target PSE storage facility. If the PSE service center 1322 determines an error in storage based on the information in the intake request form 1306, the PSE service center 1322 may direct the incorrect PSE storage facility to transport the relevant certified precious metal unit to the correct target PSE storage facility.

FIG. 16 illustrates a method that may be conducted in the physical secure environment system 1300 of FIG. 13 comprising the following procedures:

A PSE service center publishes 1610 conversion prices based on precious metal type, quality, weight, target PSE processing facility and target PSE storage facility;

PSE account holder fills out 1620 conversion form with options from published conversion prices, sends conversion form to PSE service center, and ships non-PSE precious metal to target PSE processing facility;

PSE service center sends 1630 conversion form information to target PSE processing facility to determine any discrepancies in received non-PSE precious metal to conversion form data from PSE account holder;

PSE processing center processes 1640 non-PSE precious metal into certified precious metal unit(s) per conversion form data from PSE account holder;

PSE processing center charges 1650 conversion costs of precious metal of PSE account holder by 1) reducing a certified precious metal unit value by the conversion costs, or 2) charging the account holder to pay the conversion cost in a currency;

PSE certification facility certifies 1660 the processed precious metal units and provides a CUSIP-type number and/or a unique serialized number for each certified precious metal unit, and transmits certification information for the certified precious metal unit to the PSE service center to create a certified precious metal unit record for storage in a certified precious metal unit registry;

PSE facility coordinates 1670 with PSE courier to transport certified precious metal unit to target PSE storage facility as designated in conversion form, ship certified precious metal unit with PSE courier along PSE transportation route to target storage facility, and transmit shipping status information to PSE service center to update transportation information in certified precious metal unit record;

receive 1680 certified precious metal unit via PSE courier at target PSE storage facility and transmit storage status information to PSE service center to update storage information in certified precious metal unit record; and PSE service center updates 1690 PSE account holder account with newly processed, certified and stored certified precious metal unit.

FIGS. 17-19 illustrate a configuration of the physical secure environment system 1300 where an account holder requests to purchase at least one certified precious metal unit through a contract with the PSE service center 1322.

Note that reference numbers from FIG. 13 identifying PSE components, PSE transportation paths, PSE couriers and PSE communication paths with the PSE service center 1332 are being used for consistency and brevity of description.

FIG. 17 illustrates a second configuration of a physical secure environment system 1700, similar to that of physical secure environment system 1300 of FIG. 13, for enabling an account holder 1302 to purchase at least one certified precious metal unit(s) to be added to a corresponding PSE user account 1334.

PSE service center 1322 publishes by a publication path 1328 one of a plurality of a contract price publication 1710 for existing PSE account holders and any non-PSE account holders to view. The contract price publication 1710 may include a price per unit amount of a particular precious metal in a predetermined unit value, for a given month to settle the terms of a contract to purchase at least one certified and precious metal unit. For each precious metal price per unit for a given contract month, a PSE processing facility and a PSE storage facility are paired for the given price per unit. Additionally, the PSE service center 1322 may provide any number of contract price publications for various combinations of precious metal qualities, contract performance month, and currency type per standardized unit pairs, for example, PSE gold 999.9 for 31 July in Euros per gram, PSE silver 958 for 30 June in British Pounds per ounce, etc.

For example, contract price publication 1710 illustrates a price per unit of $2725 per ounce of gold at a 999.9 purity quality value, for a contract to be fulfilled by the last day of the month of June at processing facility "Y1", (for example, country Y first PSE precious metal processing facility 1356), and to be stored at storage facility "YA", (for example, country Y first storage facility 1372).

Any price per unit value in the contract price publication 1710 as published by the PSE service center 1322 takes into consideration a current market spot price of the precious metal commodity, a cost per unit of processing the precious metal at the associated PSE processing facility, and any transportation and storage costs associated with the target PSE storage facility.

After an account holder 1302 determines they would like to purchase PSE certified precious metal units, the account holder 1302 requests via their account holder input device 1310 and the first wide area network 1314 to the account user interface 1318 that the PSE service center 1322 transmit an account holder contract 1720 to the account holder input device 1310 so the account holder 1302 may fill in the account holder contract 1720 with their contract details and send it back to the PSE service center 1322.

The account holder contract 1720 may allow data input by the account holder contract 1800 of FIG. 18 as described below.

FIG. 18 illustrates an account holder contract 1800, that corresponds with a record illustrated in FIG. 17 as the account holder contract 1720, which may further include a plurality of similar records used to input information by the account holder for subsequent transfer to the PSE service center 1322 and to any other relevant PSE facility.

An identifier record 1810 may include information related to account holder identification 1812 and a contract request date 1814.

A first purchase request record 1820 may include information related to a request by an account holder to purchase a certain amount of precious metal units according to any published precious metal type, contract month and currency per unit pairing. The first purchase request record 1820 may include a first certified precious metal type 1821 specifying a first type of certified precious metal unit, a first certified precious metal quality 1822 specifying a purity value of the precious metal, a first requested contract month 1823 specifying a contract delivery date, a first currency per unit pair 1824 specifying the type of currency and type of measurement unit, and a price per unit 1825. The account holder may further specify the terms of the contract by inputting a first target PSE processing facility 1826 the account holder would like the certified precious metal unit(s) to be processed, and a first target PSE storage facility 1827 the account holder would like the certified precious metal unit(s) to be transported to and stored. Each of these information fields may be taken from and identify certain published pairings of the contract price publication 1710 by the PSE service center 1322 of FIG. 17.

Finally, the account holder may further specify a first purchase request quantity 1828 of certified precious metal unit(s), and a first purchase request total price 1829 which is the product of the first purchase request quantity 1828 and the price per unit 1825.

A second purchase request record 1830 may include information related to a request by an account holder to purchase a certain amount of precious metal units according to any published precious metal type, contract month and currency per unit pairing. The second purchase request record 1830 may include a second certified precious metal type 1831 specifying a second type of certified precious metal unit, a second certified precious metal quality 1832 specifying a purity value of the precious metal, a second requested contract month 1833 specifying a contract delivery date, a second currency per unit pair 1834 specifying the type of currency and type of measurement unit, and a price per unit 1835. The account holder may further specify the terms of the contract by inputting a second target PSE processing facility 1836 the account holder would like the certified precious metal unit(s) to be processed, and a second target PSE storage facility 1837 they would like the certified precious metal unit(s) to be transported to and stored. Each of these information fields may be taken from and identify certain published pairings of the contract price publication 1710 by the PSE service center 1322 of FIG. 17.

Finally, the account holder may further specify a second purchase request quantity 1838 of certified precious metal unit(s), and a second purchase request total price 1839 which is the product of the second purchase request quantity 1838 and the price per unit 1835.

An nth purchase request record 1840 may include information related to a request by an account holder to purchase a certain amount of precious metal units according to any published precious metal type, contract month and currency per unit pairing. The nth purchase request record 1840 may include a nth certified precious metal type 1841 specifying a nth type of certified precious metal unit, a nth certified precious metal quality 1842 specifying a purity value of the precious metal, a nth requested contract month 1843 specifying a contract delivery date, a nth currency per unit pair 1844 specifying the type of currency and type of measurement unit, and a price per unit 1845. The account holder may further specify the terms of the contract by inputting a nth target PSE processing facility 1846 the account holder would like the certified precious metal unit(s) to be processed, and a nth target PSE storage facility 1847 the account holder would like the certified precious metal unit(s) to be transported to and stored. Each of these information fields may be taken from and identify certain published pairings of the contract price publication 1710 by the PSE service center 1322 of FIG. 17.

Finally, the account holder may further specify a nth purchase request quantity 1848 of certified precious metal unit(s), and a nth purchase request total price 1849 which is the product of the nth purchase request quantity 1848 and the price per unit 1845.

A requestor currency record 1850 may include a requestor currency type 1851 identifying the type of currency the account holder will use during the transaction, a requestor currency amount 1852 that should reflect the sum of all the total prices of every request included in the account holder contract 1800, requestor ACH/IAT and or wire information 1853 sufficient for the PSE service center to authorize and initiate a transfer from an account holder bank account, and an ACH/IAT or wire transmission date 1854 reflecting a requestor specified transfer date for such a transfer to initiate.

Upon receipt of the account holder contract 1720, (similarly account holder contract 1800 of FIG. 18), the PSE service center 1322 confirms with the account holder account holder 1302 the terms of the account holder contract 1720 and make any necessary adjustments to the account holder contract 1720 with full consent and authorization by the account holder 1302.

Thereafter, the account holder 1302 authorizes the PSE service center 1322 to debt the bank account of the account holder 1302 per the terms of the account holder contract 1720 or initiates a transfer of funds to a bank account specified by the PSE service center 1322 to fund the terms of account holder contract 1720.

Once the PSE service center 1322 has verified receipt of the funds from the account holder 1302, the PSE service center has until the end of the term of the contract to fulfill the terms of the contract for the account holder 1302.

The PSE service center 1322 first determines if the target PSE storage facility, (i.e., the PSE storage center as specified in the terms of the contract), had enough unassigned certified precious metal units to fulfill the terms of the account holder contract 1720. Unassigned certified precious metal units may be physical secure environment system 1700 owned and controlled certified precious metal units that have no associated account holder ownership records. These unassigned certified precious metal units may be originally owned by the physical secure environment system 1700 or previously owned by account holders who have sold their ownership interest in the certified precious metal units back to the physical secure environment system 1700 for various purposes.

If the PSE service center 1322 determines there is enough unassigned certified precious metal units at the target PSE storage facility to fulfill the terms of the account holder contract 1720, the PSE service center 1322 may assign certain unassigned certified precious metal units that fulfill the precious metal type, quality, weight and quantity requirements of the account holder contract 1720 to the account holder, and then update an ownership record 1560 of the corresponding certified precious metal unit registration records 1326 in the PSE registration database 1324 with the account holder ownership information.

The PSE service center 1322 then updates a corresponding PSE user account 1334 of the account holder 1302 in the PSE account holder registry 1332 communicates to the account holder 1302 via the account user interface 1318 to the account holder input device 1310 that the account holder contract 1720 has been fulfilled and the corresponding PSE user account 1334 has been updated accordingly.

If the PSE service center 1322 determines there are not enough unassigned certified precious metal units at the target PSE storage facility to fulfill the terms of the account holder contract 1720, the PSE service center 1322 has three fulfillment options to fulfill the terms of the account holder contract 1720.

A first fulfillment option may require the PSE service center 1322 to coordinate with the target PSE processing center, as specified in the account holder contract 1720, to purchase raw precious metal, privately or on a public commodities market, and process the purchased raw precious metal sufficient in type, quality, weight and quantity to satisfy the requirements of the account holder contract 1720. The processed precious metal units are then certified by a corresponding PSE certification facility and the corresponding certified precious metal unit registration records 1326 are transmitted to the PSE registration database 1324 via PSE service center 1322 with both PSE certification information, (for example, to update the precious metal unit certification record 1530), and account holder ownership information, (for example, to update the precious metal unit ownership record 1560), per the terms of the account holder contract 1720. Thereafter, the certified precious metal unit(s) are transported from the PSE certification facility via a PSE transportation route, by a PSE courier, to the target PSE storage facility per the terms of the account holder contract 1720. When the certified precious metal unit(s) is/are received by the target PSE storage facility, the PSE storage facility updates the corresponding certified precious metal unit registration records 1326 at the PSE registration database 1324 via the PSE service center 1322.

The PSE service center 1322 then updates a corresponding PSE user account 1334 of the account holder 1302 in the PSE account holder registry 1332 communicates to the account holder 1302 via the account user interface 1318 to the account holder input device 1310 that the account holder contract 1720 has been fulfilled and the corresponding PSE user account 1334 has been updated accordingly.

A second fulfillment option may require the PSE service center 1322 to determine a location in a PSE storage facility of available unassigned certified precious metal unit(s) within the physical secure environment system 1700 sufficient in type, quality, weight and quantity to satisfy the requirements of the account holder contract 1720.

When the PSE service center 1322 locates available unassigned certified precious metal unit(s) sufficient in type, quality, weight and quantity to satisfy the requirements of the account holder contract 1720 at a single PSE storage facility or more than one PSE storage facility, the PSE service center 1322 may then assign those particular unassigned certified precious metal units to the account holder per the terms of the account holder contract 1720, and subsequently transmit account holder ownership information to the corresponding certified precious metal unit registration record(s) 1326 stored at the PSE registration database 1324, (for example, to update the precious metal unit ownership record 1560).

If the newly assigned certified precious metal unit(s) are located at the target PSE storage facility as specified by the account holder contract 1720, then no further transportation of the certified precious metal units need take place, and the corresponding certified precious metal unit registration record(s) 1326 are updated with corresponding PSE storage facility information, (for example, to update the precious metal unit storage location record 1550).

If any newly assigned certified precious metal unit(s) are not located at the target PSE storage facility as specified by the account holder contract 1720, then transportation instructions are issued by the PSE service center 1322 to transport the corresponding certified precious metal units via appropriate PSE transportation routes to the target PSE storage facility. Again, the PSE service center 1322 may coordinate the update of the corresponding certified precious metal unit registration records 1326 by updating the corresponding precious metal unit transit record(s) 1540 with PSE transportation and PSE courier information and updating the corresponding precious metal unit storage location record 1550 with the target PSE storage location information when storage of the certified precious metal unit(s) is completed.

The PSE service center 1322 then updates a corresponding PSE user account 1334 of the account holder 1302 in the PSE account holder registry 1332 communicates to the account holder 1302 via the account user interface 1318 to the account holder input device 1310 that the account holder contract 1720 has been fulfilled and the corresponding PSE user account 1334 has been updated accordingly.

A third fulfillment option may require the PSE service center 1322 to determine if and where located is an account holder or other holders offering for sale a combined quantity of certified precious metal units in the physical secure environment system 1700 sufficient in type, quality, weight and quantity to satisfy the requirements of the account holder contract 1720.

When the PSE service center 1322 locates available "for sale" certified precious metal unit(s) sufficient in type, quality, weight and quantity to satisfy the requirements of the account holder contract 1720 at one or more PSE storage facilities, the PSE service center 1322 may then broker a sale and purchase of the "for sale" certified precious metal units between the respective account holders, and then assign those particular "for sale" certified precious metal units to the account holder per the terms of the account holder contract 1720, and subsequently transmit account holder ownership information to the corresponding certified precious metal unit registration record(s) 1326 stored at the PSE registration database 1324, (for example, to update the precious metal unit ownership record 1560).

If the newly assigned certified precious metal unit(s) are located at the target PSE storage facility as specified by the account holder contract 1720, then no further transportation of the certified precious metal units need take place, and the corresponding certified precious metal unit registration record(s) 1326 are updated with corresponding PSE storage facility information, (for example, to update the precious metal unit storage location record 1550).

If any newly assigned certified precious metal unit(s) are not located at the target PSE storage facility as specified by the account holder contract 1720, then transportation instructions are issued by the PSE service center 1322 to transport the corresponding certified precious metal units via appropriate PSE transportation routes to the target PSE storage facility. The PSE service center 1322 may coordinate the update of the corresponding certified precious metal unit registration records 1326 by updating the corresponding precious metal unit transit record(s) 1540 with PSE transportation and PSE courier information and update the corresponding precious metal unit storage location record 1550 with the target PSE storage location information when storage of the certified precious metal unit(s) is completed.

The PSE service center 1322 then updates a corresponding PSE user account 1334 of the account holder 1302 in the PSE account holder registry 1332 communicates to the account holder 1302 via the account user interface 1318 to the account holder input device 1310 that the account holder contract 1720 has been fulfilled and the corresponding PSE user account 1334 has been updated accordingly.

When the account holder 1302 purchases a contract 1730 per the contract price publication 1710 from the PSE service center 1322, for example, precious metal type and quality GOLD 999.9, delivery date 30 JUN, the Y1 PSE processing facility, and the YB PSE storage facility, as the account holder 1302 holds the contract 1730 before the delivery date of the contract, for example, before 30 JUN, the contract is a futures contract 1732 up until the delivery day is reached. When the delivery day, for example, 30 JUN, is reached, the contract expires and the holder of the futures contract 1732 has the right to take "delivery" and full ownership of the certified precious metal units within the PSE system at the PSE storage facility as specified in the contract's original designation by the original contract purchaser.

For example, the account holder 1302 may be the original purchaser of a contract 1730, and may take the contract 1730 to a futures market 1740 having a plurality of futures market participants 1750. The account holder 1032 becomes a futures market seller 1752 when the contract 1730 is offered for sale as a futures contract 1732 on the futures market 1740.

When a futures market participant purchases the futures contract 1732, becoming a futures market buyer 1754 and then a holder of the futures contract 1732, they have the rights to take "delivery" of the PSE certified precious metal unit specified in the original contract 1730 on the contract delivery date.

If in the alternative, the futures market buyer 1754 of the futures contract 1732 decides to sell the futures contract 1732 in the futures market 1740 to the futures market participants 1750, and if a new futures buyer offers to buy and purchases the futures contract 1732, the new futures buyer has the right to take "delivery" of the PSE certified precious metal unit specified in the original contract 1730 on the contract delivery date.

Thus, purchased contracts giving the right to take delivery and ownership of PSE certified precious metal units, (as originally published in the contract price publication 1710 of the PSE service center 1322), may be publicly traded in any capable public market or may be bought and sold privately.

FIG. 19 illustrates a method that may be conducted in the physical secure environment system 1700 of FIG. 17 comprising the following procedures:

- a PSE service center publishes 1910 PSE precious metal purchase contract prices based on precious metal type, quality, weight, and target PSE storage facility;
- the PSE account holder fills out 1920 purchase contract form with options from published purchase contract prices, sends purchase contract form to PSE service center with purchase price amount in currency;
- the PSE service center sends 1930 information from purchase contract to target PSE storage facility;
- a target PSE storage facility determines 1940 if inventory of unassigned certified precious metal unit at target PSE storage facility is sufficient to cover purchase contract terms;
- if so, PSE storage facility assigns 1950 unassigned certified precious metal units to account holder and updates certified precious metal unit record at certified precious metal unit registry via PSE service center;
- if not, target PSE storage determines 1960 other PSE storage locations with either unassigned or for sale certified precious metal units sufficient to cover the purchase contract terms;
- if so, target PSE storage facility assigns 1970 available unassigned certified precious metal unit with account holder ownership information and transport via PSE courier to target location;
- if not, target PSE storage facility purchases 1980 raw precious metal on open market, processes and certifies precious metal into PSE certified precious metal units, and transport, if necessary, certified precious metal unit to target PSE storage facility; and
- the target PSE storage facility updates 1990 certified precious metal unit record in certified precious metal unit registry via PSE service center and updated account holder account accordingly.

Figure 20:
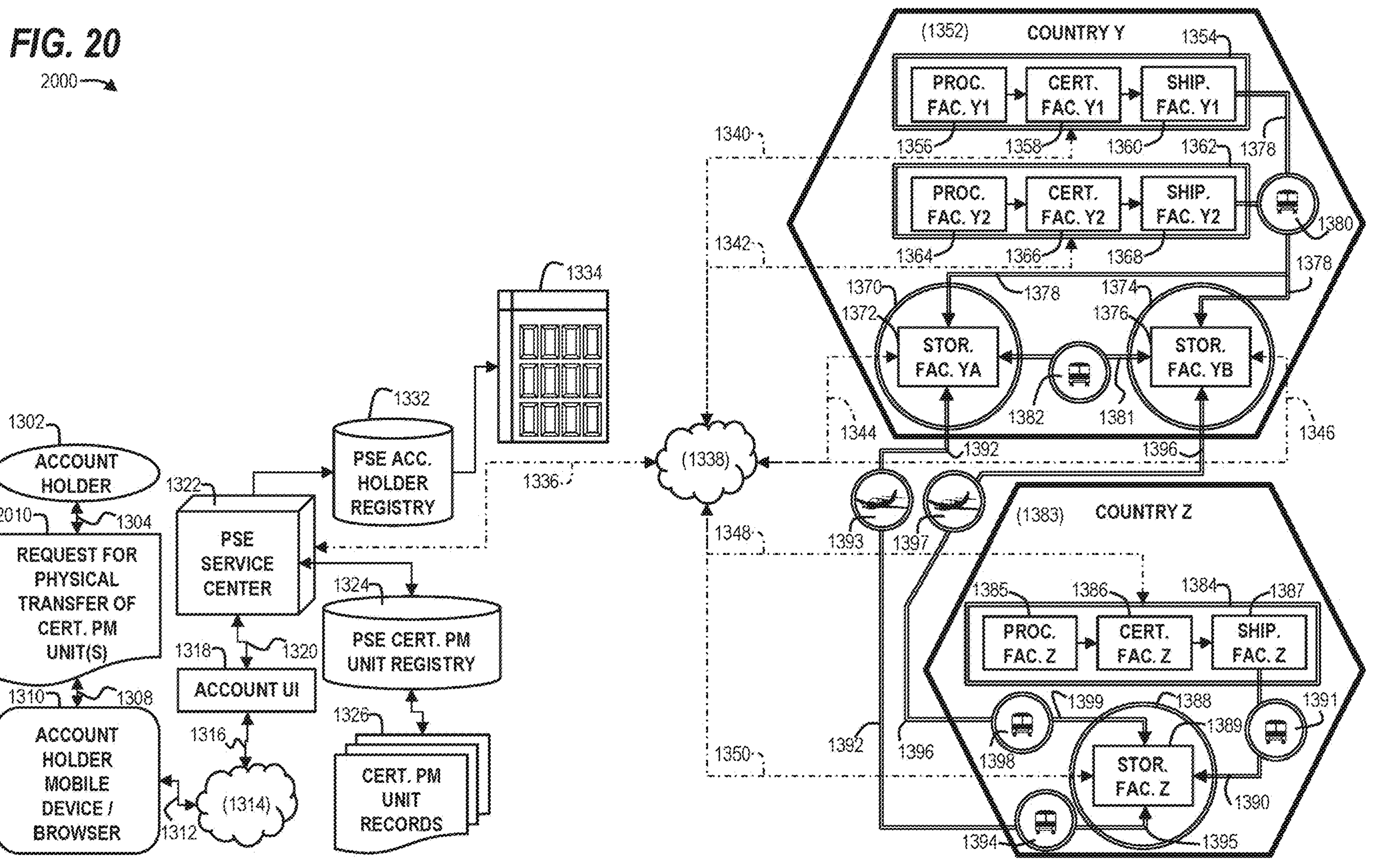
FIG. 20 illustrates a third physical secure environment system and a method of requesting the physical transfer of certified precious metal units within the physical secure environment system.

FIGS. 20-22 illustrate a configuration of a physical secure environment system 2000 where an account holder requests to physically transfer at least one certified precious metal unit to a target PSE storage facility in the physical secure environment system 2000 through a transfer request with the PSE service center 1322.

Note that reference numbers from FIG. 13 identifying PSE components, PSE transportation paths, PSE couriers and PSE communication paths with the PSE service center 1332 are being used for consistency and brevity of description.

FIG. 20 illustrates a third configuration of a physical secure environment 2000, similar to that of physical secure environment system 1300 of FIG. 13, for enabling an account holder 1302 to request the physical transfer of at least one certified precious metal unit(s) from one PSE storage facility to a target PSE storage facility and update corresponding certified precious metal unit registration records 1326 in the PSE registration database 1324 accordingly.

After an account holder 1302 determines they would like to transfer any number of PSE certified precious metal units, the account holder 1302 requests via their account holder input device 1310 and the first wide area network 1314 to the account user interface 1318 that the PSE service center 1322 transmit a physical transfer request form 2010 to the account holder input device 1310 so the account holder 1302 may fill in the physical transfer request form 2010 with their physical transfer details and send it back to the PSE service center 1322.

The physical transfer request form 2010 may allow data input by the account holder contract 1800 of FIG. 21 as described below.

FIG. 21 illustrates a physical transfer request form 2100 that corresponds with a record illustrated in FIG. 20 of the physical transfer request form 2010, that may include a plurality of records used to input information by the account holder and subsequently transfer to the PSE service center 1322 and to any other relevant PSE facilities.

A transfer request identifier record 2110 may include information related to account holder information, a transfer request date, a payment method type, and payment method account information. The payment method type may include payment from a bank account of an account holder using fiat currency and the payment method account information may include ACH/IAT or wire corresponding to the bank account. The payment method type may include in the alternative information enabling the PSE service center 1322 debt transfer cost against the account holder's PSE account of certified precious metal units, and the payment method account information may specify the account holder's PSE account containing certified precious metal units.

Transfer request storage facility records 2120 may include a plurality of transfer requests to various PSE storage facilities for specified certified precious metal units.

For example, a first transfer request storage facility record 2122 may include information related to a first transfer request specifying at least a first one or a first series of certified precious metal unit identification serial numbers and a corresponding first target PSE storage facility. The certified precious metal unit identification serial numbers may correspond to the unit identifier record 1520 of FIG. 15 and may include a CUSIP-type code 1521 that uniquely identifies the certified precious metal unit based on the type of a financial instrument or its issuer, and a unique certified precious metal unit identification code 1522 that may be uniquely serialized per precious metal unit to identify each certified precious metal unit.

In a further example, a second transfer request storage facility record 2124 may include information related to a second transfer request specifying at least a second one or a second series of certified precious metal unit identification serial numbers and a corresponding second target PSE storage facility.

In a further example, an nth transfer request storage facility record 2124 may include information related to an nth transfer request specifying at least an nth one or an nth series of certified precious metal unit identification serial numbers and a corresponding nth target PSE storage facility.

Upon receipt of the physical transfer request form 2010, (similarly physical transfer request form 2100 of FIG. 21), the PSE service center 1322 confirms with the account holder account holder 1302 the terms of the physical transfer request form 2010 and communicate any transfer costs to the account holder 1302 for full consent and authorization by the account holder 130.

Thereafter, the account holder 1302 may authorize the PSE service center 1322 to debit the bank account of the account holder 1302 per the terms of the physical transfer request form 2010, or initiate a transfer of funds to a bank account specified by the PSE service center 1322 to fund the communicated cost of the transfer per the physical transfer request form 2010.

In the alternative, the account holder 1302 may be given the option to pay the transfer costs with value from their own account of certified precious metal units. With this option, the PSE service center 1322 may take a requisite number of certified precious metal units from the account holder's corresponding PSE user account 1334 to be reassigned to the physical secure environment system 2000.

Once the PSE service center 1322 has verified receipt of the funds from the account holder 1302, the PSE service center 1322 may send instructions to the PSE storage facility where the requested certified precious metal units are located to coordinate transportation to the target PSE storage facility per the terms of the physical transfer request form 2010.

The PSE service center 1322 may then update an ownership record 1560 of the corresponding certified precious metal unit registration records 1326 in the PSE registration database 1324 with transit information, (for example, PSE transportation route and PSE courier information), for the transit record 1540, and storage location information, (for example, the target PSE storage facility information), for the storage location record 1550.

The PSE service center 1322 may then updates a corresponding PSE user account 1334 of the account holder 1302 in the PSE account holder registry 1332 communicates to the account holder 1302 via the account user interface 1318 to the account holder input device 1310 that the physical transfer request form 2010 has been fulfilled and the corresponding PSE user account 1334 has been updated accordingly.

FIG. 22 illustrates a method that may be conducted in the physical secure environment system 2000 of FIG. 20 comprising the following procedures:

- a PSE account holder fills out 2210 physical transfer form, sends physical transfer form to PSE service center;
- PSE service center confirms 2220 physical transfer request with PSE account holder and calculates a cost of proposed transfer from original PSE storage facility to target storage facility;
- PSE account holder 2230 either 1) transfers via ACH/IAT or wire transfer cost to PSE service center, or 2) authorizes the PSE service center to deduct the transfer cost from account holder account either in certified precious metal units or currency;

PSE service center sends 2240 transfer request information to origin PSE storage facility and target PSE storage facility;

origin PSE storage facility 2250 1) coordinates with PSE courier to transport designated certified precious metal units via PSE transport route to target PSE storage facility; and 2) send corresponding certified precious metal unit record information with transportation information to PSE service center;

target PSE storage facility 2260 1) confirms receipt of designated certified precious metal unit; and 2) send corresponding certified precious metal unit record information with storage information to PSE service center; and update 2270 certified precious metal unit record in certified precious metal unit registry via PSE service center and updated account holder account accordingly.

Figure 23:
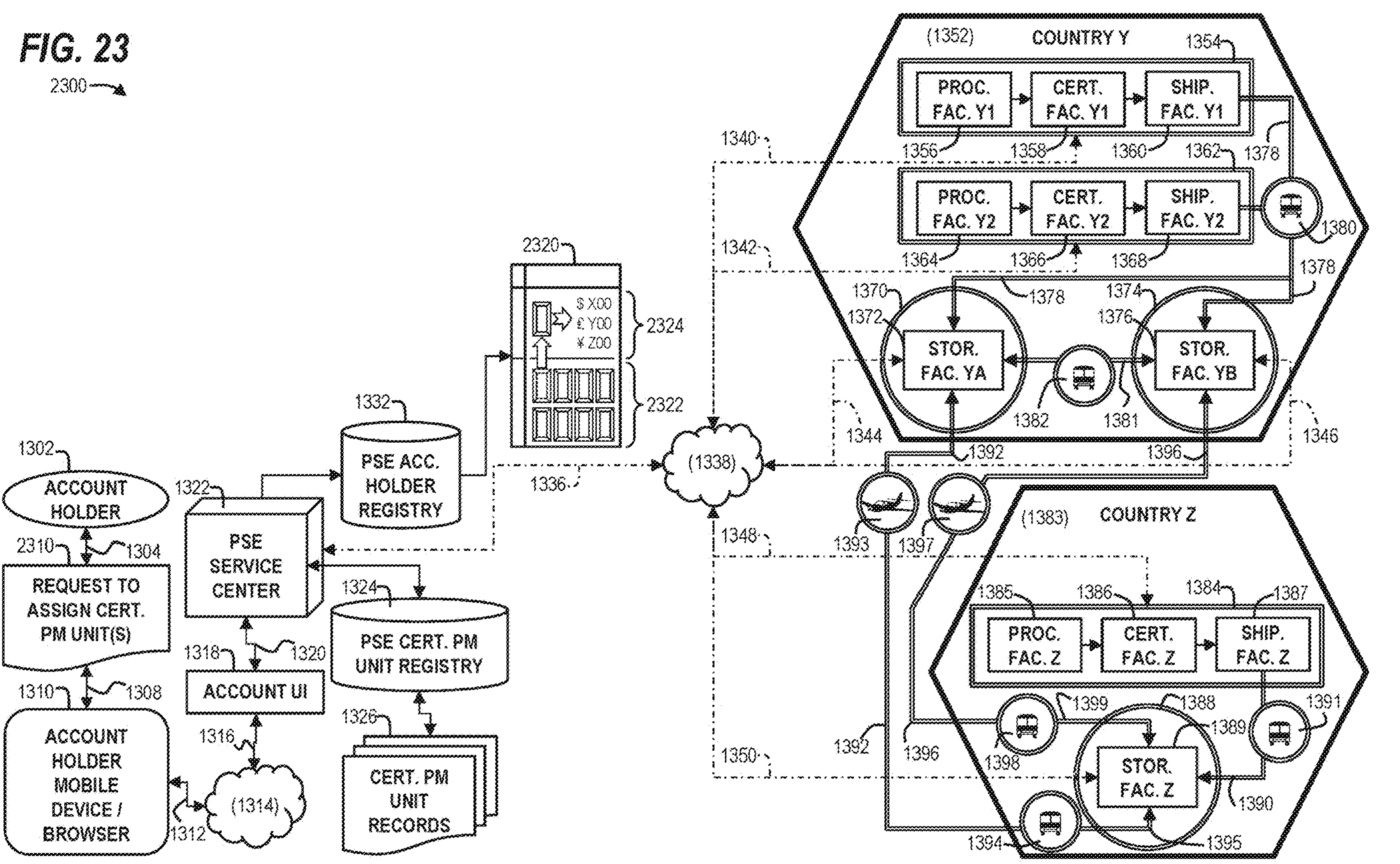
FIG. 23 illustrates a fourth physical secure environment system and a method of requesting to assign designated certified precious metal units to an assignee within the physical secure environment system.

FIGS. 23-25 illustrate a configuration of a physical secure environment system 2300 where an assignor account holder requests via the PSE service center 1322 to assign their ownership rights in at least one certified precious metal unit to a different assignee account holder. The newly assigned certified precious metal unit may also be located at different PSE storage facility from an original PSE storage facility of the assignor account holder, or may be at the same original PSE storage facility of the assignor account holder.

Note that reference numbers from FIG. 13 identifying PSE components, PSE transportation paths, PSE couriers and PSE communication paths with the PSE service center 1332 are being used for consistency and brevity of description.

FIG. 23 illustrates fourth configuration of a physical secure environment system 2300, similar to that of physical secure environment system 1300 of FIG. 13, for enabling an account holder 1302 to request the assignment of at least one certified precious metal unit(s) to another recipient assignee PSE account holder, and update corresponding certified precious metal unit registration records 1326 in the PSE registration database 1324 accordingly. Additionally, an assignor account holder may assign at least one certified precious metal unit to an assignee account holder at a PSE storage facility that is different from assigned certified precious metal unit(s) stored the original PSE storage facility of the assignor account holder. The benefit of any assigning certified precious metal unit to a different PSE storage facility is, if there are unassigned or “for sale” certified precious metal units at the target assignee PSE storage facility, the assignment eliminates the need for any physical transportation of any assigned certified precious metal unit(s).

When an assignor PSE account holder 1302 determines they would like to assign any number of PSE certified precious metal units from their account to an assignee PSE account holder, the assignor PSE account holder 1302 requests, via their account holder input device 1310 and the first wide area network 1314 to the account user interface 1318, that the PSE service center 1322 transmit an assignment request 2310 to the account holder input device 1310. Thereafter, the assignor account holder 1302 may fill in the assignment request 2310 with corresponding details and send the assignment request form 2310 back to the PSE service center 1322. The assignment request form 2310 may allow data input by an account holder assignment request 2400 of FIG. 24 as described below.

FIG. 24 illustrates an assignment request form 2400 that corresponds with a record illustrated in FIG. 23 as the assignment request form 2310, which may further include a plurality of similar records used to input information by the assignor account holder for subsequent transfer to the PSE service center 1322 and to any other relevant PSE facility.

An assignment request identifier record 2410 may include information related to assignor account holder information and an assignment request date.

A first assignment request 2420 may include information related to a first assignment request by an assignor account holder to assign at least one certified precious metal unit per the terms of the assignment request form 2400. The first assignment request 2420 may include specifying at least a first one or a first series of certified precious metal unit identification serial numbers 2422 corresponding to the first assignment request 2420. The certified precious metal unit identification serial numbers may correspond to the unit identifier record 1520 of FIG. 15 and may include a CUSIP-type code 1521 that uniquely identifies the certified precious metal unit based on the type of a financial instrument or its issuer, and a unique certified precious metal unit identification code 1522 that may be uniquely serialized per precious metal unit to identify each certified precious metal unit.

The first assignment request 2420 may further include a first original PSE storage facility 2424 identifying where the assignor's certified precious metal unit are stored in the PSE system, a first assignee PSE account identifier 2426, and optionally, first destination PSE storage facility 2428 where the assignor may intend to assign unassigned or “for sale” certified precious metal units to the assignee without having to physically transfer any certified precious metal unit between PSE storage locations.

A second assignment request 2430 may include information related to a second assignment request by an assignor account holder to assign at least one certified precious metal unit per the terms of the assignment request form 2400. The second assignment request 2430 may include specifying at least a second one or a second series of certified precious metal unit identification serial numbers 2432 corresponding to the second assignment request 2430. The certified precious metal unit identification serial numbers may correspond to the unit identifier record 1520 of FIG. 15 and may include a CUSIP-type code 1521 that uniquely identifies the certified precious metal unit based on the type of a financial instrument or its issuer, and a unique certified precious metal unit identification code 1522 that may be uniquely serialized per precious metal unit to identify each certified precious metal unit.

The second assignment request 2430 may further include a second original PSE storage facility 2434 identifying where the assignor's certified precious metal unit are stored in the PSE system, a second assignee PSE account identifier 2436, and optionally, a second destination PSE storage facility 2438 where the assignor may intend to assign unassigned or “for sale” certified precious metal units to the assignee without having to physically transfer any certified precious metal unit between PSE storage locations.

An nth assignment request 2440 may include information related to an nth assignment request by an assignor account holder to assign at least one certified precious metal unit per the terms of the assignment request form 2400. The nth assignment request 2440 may include specifying at least an nth one or an nth series of certified precious metal unit identification serial numbers 2442 corresponding to the nth assignment request 2440. The certified precious metal unit identification serial numbers may correspond to the unit identifier record 1520 of FIG. 15 and may include a CUSIP-type code 1521 that uniquely identifies the certified precious metal unit based on the type of a financial instrument or its issuer, and a unique certified precious metal unit identification code 1522 that may be uniquely serialized per precious metal unit to identify each certified precious metal unit.

The nth assignment request 2440 may further include an nth original PSE storage facility 2444 identifying where the assignor's certified precious metal unit are stored in the PSE system, an nth assignee PSE account identifier 2446, and optionally, an nth destination PSE storage facility 2448 where the assignor may intend to assign unassigned or "for sale" certified precious metal units to the assignee without having to physically transfer any certified precious metal unit between PSE storage locations.

Upon receipt of the assignment request 2310, (similarly the assignment request form 2400 of FIG. 24), the PSE service center 1322 confirms the intended assignment with the assignor account holder 1302 the terms of the assignment request 2310 and confirms the intended assignment with the corresponding recipient assignee account holder identified in the assignment request 2310.

The PSE service center 1322 then determines if there is a difference in location between the origin PSE storage facility and the target PSE storage facility as enumerated in the assignment request 2310 by the assignor account holder 1302.

If the PSE service center 1322 determines there is no difference in a PSE storage facility location, then the PSE service center 1322 removes the assignee account holder information in the ownership record 1570 of the identified certified precious metal unit registration record(s) 1326 stored in the PSE registration database 1324, and updates the ownership record 1570 of the same certified precious metal unit registration record(s) 1326 with the ownership information of the assignee account holder as enumerated in the assignment request 2310.

The PSE service center 1322 may then update a corresponding PSE user account 1334 of the account holder 1302 in the PSE account holder registry 1332 communicates to the account holder 1302 via the account user interface 1318 to the account holder input device 1310 that the assignment request 2310 has been fulfilled and the corresponding PSE user account 1334 has been updated accordingly.

If the PSE service center 1322 determines there is a difference in location between the origin PSE storage facility and the target PSE storage facility as enumerated in the assignment request 2310 by the assignor account holder 1302, then the PSE service center 1322 determines if there a requisite quantity of certified precious metal unit(s) at the target PSE storage facility sufficient to comply with the terms of the assignment request 2310. The requisite quantity may be fulfilled by unassigned certified precious metal units or "for sale" certified precious metal units.

The PSE service center 1322 may then determine if there is any assignment surcharge cost or assignment credit to the assignor associated with the assignment request 2310. Any assignment surcharge cost or assignment credit may be determined taking into account any differences in PSE processing value and/or differences in PSE storage facility cost per certified precious metal unit between the assignor's original PSE storage facility and the assignee's target PSE storage facility.

The PSE service center 1322 may then communicate either the assignment surcharge cost or the assignment credit associated with the assignment request 2310 to the assignor account holder 1302.

If the PSE service center 1322 determines there is an assignment surcharge cost, then the PSE service center 1322 may request the assignor account holder either 1) transfer currency by ACH/IAT or wire transfer to the PSE service center 1322 to cover the assignment surcharge cost, or 2) allow the PSE service center 1322 to cover the value of the assignment surcharge cost from any non-assigned certified precious metal units in the assignor account holder's PSE system account. The assignment surcharge cost is then forwarded by PSE service center 1322 to the assignee account holder's PSE account, accordingly.

If the PSE service center 1322 determines there is an assignment credit due to the assignor, then the PSE service center 1322 may request the assignee account holder either 1) transfer currency by ACH/IAT or wire transfer to the PSE service center 1322 to cover the assignment credit, or 2) allowed the PSE service center 1322 to cover the value of the assignment credit from any certified precious metal units in the assignee account holder's PSE system account. The assignment credit is then forwarded by PSE service center 1322 to the assignor account holder's PSE account, accordingly.

The account holder account 2320 may be divided into a certified precious metal unit sub-account 2322 and a currency sub-account 2324 to accommodate the single account holding both certified precious metal units and any type of currency. If authorized by the account holder, the PSE service center 1322 may "break" one or more certified precious metal units by selling them for an equivalent amount of any specified currency based on PSE precious metal prices, market spot prices, or a combination of both.

The PSE service center 1322 then removes the assignee account holder information in the ownership record 1570 of the identified certified precious metal unit registration record(s) 1326 stored in the PSE registration database 1324, and updates the ownership record 1570 of the same certified precious metal unit registration record(s) 1326 with the ownership information of the assignee account holder as enumerated in the assignment request 2310.

The PSE service center 1322 may then update a corresponding PSE user account 1334 of the account holder 1302 in the PSE account holder registry 1332 communicates to the account holder 1302 via the account user interface 1318 to the account holder input device 1310 that the assignment request 2310 has been fulfilled and the corresponding PSE user account 1334 has been updated accordingly.

FIG. 25 illustrates a method that may be conducted in the physical secure environment system 2300 of FIG. 23 comprising the following procedures:

- PSE account holder fills out 2510 assignment request form, sends physical assignment request form to PSE service center;
- PSE service center confirms 2520 assignment request form with assignor PSE account holder and assignee PSE account holder;
- PSE service center determines 2530 if there is a difference in location between an origin PSE storage facility and a target PSE storage facility from assignment request form;
- if no location change 2540, then no surcharge and PSE service center removes 2550 assignor account holder from ownership info of certified precious metal unit record in certified precious metal unit registry and update PSE assignor and assignee accounts;
- if difference in location 2560, then PSE service center determines unassigned or "for sale" certified precious metal units at the target PSE storage facility;

PSE service center determines 2570 surcharge cost or credit associated with the designated assignment taking into account differences in processing related value of PSE precious metal units and storage costs per precious metal unit between target and origin PSE storage facility;

PSE service center communicates 2580 surcharge cost/credit of the proposed assignment to the assignor and assignee PSE account holders respectively;

if cost to assignor 2585, assignor either 1) ACH/IAT or wires currency to PSE service center to cover assignment cost, or 2) authorizes PSE service center to deduct the cost equivalent value from the certified precious metal units of the account holder account;

if credit to assignor 2590, PSE service center credits assignor PSE account with credit amount; and update 2595 certified precious metal unit record in certified precious metal unit registry via PSE service center and updated account holder account accordingly.

Figure 26:
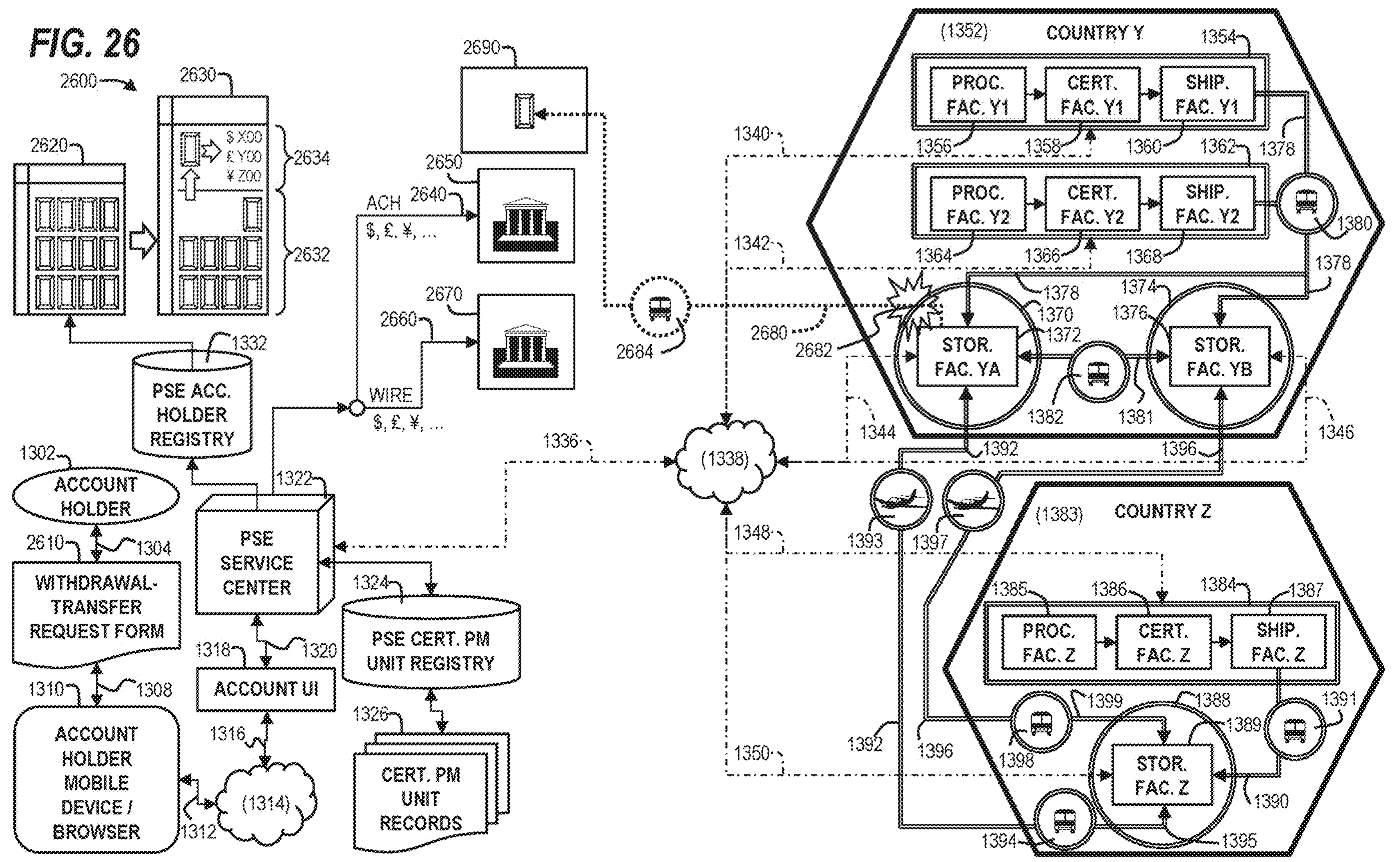
FIG. 26 illustrates a fifth physical secure environment system and a method of requesting to externally transfer designated certified precious metal units or the value of the designated certified precious metal units out of the physical secure environment system.

FIGS. 26-28 illustrate a configuration of a physical secure environment system 2600 where an account holder requests via the PSE service center 1322 transfer of a value of certified precious metal unit(s) to an external institution or physical withdrawal of a certified precious metal unit of certified precious metal unit.

Note that reference numbers from FIG. 13 identifying PSE components, PSE transportation paths, PSE couriers and PSE communication paths with the PSE service center 1332 are being used for consistency and brevity of description.

FIG. 26 illustrates fifth configuration of a physical secure environment system 2600, similar to that of physical secure environment system 1300 of FIG. 13, for enabling an account holder 1302 to request an external transfer of either at least one certified precious metal unit(s) outside of the PSE environment, or an external transfer of a specified currency to a specified recipient, the specified currency being generated by a PSE facility liquidating certified precious metal unit associated with the account holder's account.

When a PSE account holder 1302 determines they would like to externally transfer physical precious metal units or a currency valued based on a liquidate value of held certified precious metal units, the PSE account holder 1302 requests, via their account holder input device 1310 and the first wide area network 1314, to the account user interface 1318, that the PSE service center 1322 transmit an external transfer request form 2610 to the account holder input device 1310. Thereafter, the account holder 1302 may fill in the external transfer request 2610 with corresponding details and send the external transfer request form 2610 back to the PSE service center 1322. The external transfer form 2610 may allow data input by an account holder external transfer request form 2700 of FIG. 27 as described below.

FIG. 27 illustrates an external transfer request form 2400 that corresponds with a record illustrated in FIG. 26 as the external transfer request form 2610, which may further include a plurality of similar records used to input external transfer request information by the account holder for subsequent communication to the PSE service center 1322 and to any other relevant PSE facility.

A transfer request record 2710 may include information related to account holder information and a transfer request date.

A first external transfer request 2720 may include information related to a first transfer request by an account holder to assign at least one certified precious metal unit per the terms of the transfer request form 2700. The first transfer request 2720 may include specifying at least a first one or a first series of certified precious metal unit identification serial numbers 2722 corresponding to the first transfer request 2720. The certified precious metal unit identification serial numbers may correspond to the unit identifier record 1520 of FIG. 15 and may include a CUSIP-type code 1521 that uniquely identifies the certified precious metal unit based on the type of a financial instrument or its issuer, and a unique certified precious metal unit identification code 1522 that may be uniquely serialized per precious metal unit to identify each certified precious metal unit.

The first transfer request 2720 may further include a first destination type designator 2724 identifying a type of transfer destination. For example, a first type of transfer destination may be a physical location associated with a target recipient, a second type of transfer destination may be an ACH (Automated Clearing House network) type of financial transfer, and a third type of transfer destination may be a bank wire financial transfer.

The first transfer 2720 may further include first destination information 2726 identifying target destination information based on the specified destination type. For example, if the first designated destination type was a physical location associated with a target recipient, then destination information may include a physical address or details of a non-PSE transportation service provider that will arrange for pickup and transport of the designated precious metal units. If the first designated destination type was an ACH type of financial transfer, then destination information may include ACH transfer particulars associated with a target financial institution. If the first designated destination type was a wire type of financial transfer, then destination information may include wire transfer particulars associated with a target financial institution.

A second external transfer request 2730 may include information related to a second transfer request by an account holder to assign at least one certified precious metal unit per the terms of the transfer request form 2700. The second transfer request 2730 may include specifying at least a second one or a second series of certified precious metal unit identification serial numbers 2732 corresponding to the second transfer request 2730. The certified precious metal unit identification serial numbers may correspond to the unit identifier record 1520 of FIG. 15 and may include a CUSIP-type code 1521 that uniquely identifies the certified precious metal unit based on the type of a financial instrument or its issuer, and a unique certified precious metal unit identification code 1522 that may be uniquely serialized per precious metal unit to identify each certified precious metal unit.

The second transfer request 2730 may further include a second destination type designator 2734 identifying a type of transfer destination. For example, a second type of transfer destination may be a physical location associated with a target recipient, a second type of transfer destination may be an ACH type of financial transfer, and a third type of transfer destination may be a bank wire financial transfer.

The second transfer 2730 may further include second destination information 2736 identifying target destination information based on the specified destination type. For example, if the second designated destination type was a physical location associated with a target recipient, then destination information may include a physical address or details of a non-PSE transportation service provider that will arrange for pickup and transport of the designated precious metal units. If the second designated destination type was an ACH type of financial transfer, then destination information may include ACH transfer particulars associated with a target financial institution. If the second designated destination type was a wire type of financial transfer, then destination information may include wire transfer particulars associated with a target financial institution.

An nth external transfer request 2740 may include information related to an nth transfer request by an account holder to assign at least one certified precious metal unit per the terms of the transfer request form 2700. The first transfer request 2740 may include specifying at least an nth one or an nth series of certified precious metal unit identification serial numbers 2742 corresponding to the first transfer request 2740. The certified precious metal unit identification serial numbers may correspond to the unit identifier record 1520 of FIG. 15 and may include a CUSIP-type code 1521 that uniquely identifies the certified precious metal unit based on the type of a financial instrument or its issuer, and a unique certified precious metal unit identification code 1522 that may be uniquely serialized per precious metal unit to identify each certified precious metal unit.

The first transfer request 2740 may further include an nth destination type designator 2744 identifying a type of transfer destination. For example, an nth type of transfer destination may be a physical location associated with a target recipient, a second type of transfer destination may be an ACH type of financial transfer, and a third type of transfer destination may be a bank wire financial transfer.

The first transfer 2740 may further include first destination information 2746 identifying target destination information based on the specified destination type. For example, if the first designated destination type was a physical location associated with a target recipient, then destination information may include a physical address or details of a non-PSE transportation service provider that will arrange for pickup and transport of the designated precious metal units. If the first designated destination type was an ACH type of financial transfer, then destination information may include ACH transfer particulars associated with a target financial institution. If the first designated destination type was a wire type of financial transfer, then destination information may include wire transfer particulars associated with a target financial institution.

Upon receipt of the external transfer request 2610, (similarly the assignment request form 2700 of FIG. 27), the PSE service center 1322 confirms the terms of the assignment request 2310 with the account holder identified in the external transfer request 2610.

The PSE service center 1322 then determines from the external transfer request form 2610 a destination type for the external transfer request.

For example, a first external transfer request may specify a destination type as an ACH or IAT (International ACH Transaction) transfer request or a wire transfer request, and may include destination ACH/IAT account information or destination wire account information.

The PSE service center 1322 then may determine a specified amount from the external transfer request form and verify whether the account holder has sufficient certified precious metal units to cover the specified amount at the current price of PSE certified precious metal or the market spot price of the precious metal.

If the PSE service center 1322 determines the account hold account 2620 has sufficient value to cover the specified amount from the transfer request form, the PSE service center 1322 liquidates, or sells and converts to a specified currency from the external transfer form, sufficient certified precious metal unit(s) to generate a liquidated currency amount to cover the specified amount subject to the external transfer form.

The PSE service center 1322, using either the ACH/IAT account information or the wire account information from the external transfer form, initiates the respective ACH/IAT or wire transfer with the specified amount of the external transfer form. For example, PSE service center 1322 may initiate an ACH/IAT transfer according to the external transfer request form via ACH/IAT transmission path 2640 to an ACH/IAT recipient institution 2650. Alternatively, the PSE service center 1322 may initiate a wire transfer per the external transfer request form via wire transmission path 2660 to an wore recipient institution 2670.

The PSE service center 1322 then updates the certified precious metal unit registration records 1326 to remove ownership information of the account holder 1302 from the corresponding liquidated certified precious metal units, and may designate the liquidated as unassigned (if purchased by the PSE system for unassigned unit inventory purposes), or de-processed (if sold outside of the PSE system environment).

If there is any remaining currency from the liquidation of the account holder's certified precious metal unit(s) after the ACH/IAT or wire transfer, the remaining currency is posted to the account holder account 2630 that may include at least two sub-accounts: a certified precious metal unit sub-account 2632 for accounting the purchase, storage and sale or liquidation of certified precious metal units, and a currency sub-account 2634 that may receive fiat currency in various currencies from other account holders and from the PSE service center 1322, for example, upon the liquidation of any certified precious metal units.

The PSE service center 1322 may then update a corresponding account holder account 2630 of the account holder 1302 having both a certified precious metal unit sub-account 2632 and a currency sub-account 2634 in the PSE account holder registry 1332 and communicate to the account holder 1302 via the account user interface 1318 to the account holder input device 1310 that the external transfer request form 2610 has been fulfilled and the corresponding account holder account 2630 has been updated accordingly.

In another example, a second external transfer request may specify the destination type as a physical recipient address and/or a non-PSE system transportation service that will receive and transport the transferred precious metal units apart from the PSE system environment.

With this destination type of physical transfer, the PSE service center 1322 communicates with the PSE storage facility storing the specified certified precious metal units corresponding to the external transfer request form information.

The corresponding PSE storage facility may then coordinate with or communicate to confirm with the non-PSE transportation service provider designated in the external transfer request form to transport the designated precious metal units to the designated target receipt.

The PSE storage facility, under direction of the PSE service center 1322, de-processes the designated certified precious metal unit into non-certified precious metal units by first removing any physical PSE indicia and PSE unit identification from the surface of the precious metal and/or the container or packing of the precious metal. Thereafter the PSE storage facility may update the corresponding certified precious metal unit registration records 1326 of the now de-processed precious metal units stored in PSE registration database 1324 with: insertion of deprocessing information; removal of former ownership information; and the removal of certification information.

Thereafter, the PSE storage facility may release the de-processed precious metal units to the designated non-PSE transportation service provider 2684 having a non-PSE transportation route 2680 with a PSE system exit point 2682 to transport the precious metal units to the non-PSE physical target recipient 2690.

The PSE service center 1322 may then update a corresponding account holder account 2630 of the account holder 1302 having both a certified precious metal unit sub-account 2632 and a currency sub-account 2634 in the PSE account holder registry 1332 and communicate to the account holder 1302 via the account user interface 1318 to the account holder input device 1310 that the external transfer request form 2610 has been fulfilled and the corresponding account holder account 2630 has been updated accordingly.

FIG. 28 illustrates a method that may be conducted in the physical secure environment system 2600 of FIG. 26 comprising the following procedures:

- PSE account holder fills out 2810 external transfer request form, sends external transfer request form to PSE service center;
- PSE service center confirms 2820 external transfer request form with PSE account holder;
- based on external transfer request form data, PSE service center determines 2830 whether external transfer request form is for electronic fund transfer or physical transfer of precious metal unit value outside of PSE system;
- if electronic transfer type, determine 2840 amount of electronic transfer from external transfer request form;
- liquidate 2850 certified precious metal units from account holder account to cover amount;
- transfer 2860 amount to target financial institution via ACH/IAT or wire per external transfer request form;
- update 2870 account holder account with any remaining currency from liquidation after external transfer transaction;
- if physical transfer type, PSE service center communicates 2880 with PSE storage facility storing designated certified precious metal unit for external transfer by external transfer request form;
- PSE storage facility coordinates 2882 with non-PSE shipping transportation service provider;
- PSE storage facility de-processes 2884 designated certified precious metal unit by removing physical PSE identification indicia and updates certified precious metal unit record in registry to remove certification status and ownership information and add de-processing status;
- PSE storage facility releases 2886 de-processed designated precious metal unit into custody of non-PSE transportation service; and
- then, for both types of external transfer, update 2890 PSE account holder account to reflect external transfer of former certified precious metal units.

FIGS. 29-30 illustrate a configuration of a physical secure environment system 2900 where an account holder presents a debit card to complete a financial transaction with a merchant at either a point-of-sale device at a physical location of the merchant or on a merchant e-commerce platform, or website, and thereby requests the PSE service center 1322 transfer of a currency value of a transaction amount to a corresponding merchant financial institution, based on the account holder's account containing certified precious metal units and/or currency converted in exchange for at least one certified precious metal unit.

Note that reference numbers from FIG. 13 identifying PSE components, PSE transportation paths, PSE couriers and PSE communication paths with the PSE service center 1332 are being used for consistency and brevity of description.

FIG. 29 illustrates sixth configuration of a physical secure environment system 2900, similar to that of physical secure environment system 1300 of FIG. 13, for enabling an account holder 1302 to conduct a debit card financial transaction with a point-of-sale device (POS) of a merchant in a physical location or a POS API (Application Programming Interface) for an e-commerce platform of the merchant.

When a PSE account holder 1302 presents 2912 a PSE account holder debit card 2910 to a POS of a merchant, whether a POS physical device at a merchant's physical store or an on-line checkout utilizing an API on a merchant's e-commerce platform, the account holder debit card 2910 transmits account holder PSE account information to the POS device/API.

The merchant POS device/API then transfers 2922 the following information: 1) the account holder PSE account information as read or input by a user from the account holder account 2960, 2) the total amount of the financial transaction, 3) the currency type of the financial transaction, and 4) the target merchant institution account to receive the total amount in the currency of the financial transaction. This information is communicated to a debit card communication network 2930 that communicates 2932 with a debit card processor service 2940 to a wide area network 2950 via a communication path 2952 to the PSE service center 1322.

The PSE service center 1322 verifies the received information PSE account holder account 2960 from the merchant POS and determines whether the corresponding PSE account holder account 2960 has sufficient value in a currency sub-account and/or a certified precious metal unit sub-account to cover the total amount of the financial transaction. If the PSE service center 1322 determines there is insufficient value in the account holder account 2960, the PSE service center 1322 declines the total amount of the financial transaction and transmits a "decline" message via communication 2944 to the debit card communication network 2930 to 2934 the merchant POS indicating the financial transaction is declined.

If the PSE service center 1322 determines the is sufficient value in the account holder account 2960 to complete the financial transaction, the PSE service center 1322 authorizes the total amount of the financial transaction and transmits an "authorized" message via communication 2944 to the debit card communication network 2930 to 2934 the merchant POS indicating the financial transaction is authorized.

The PSE service center 1322 then determines if the total amount of the financial transaction in the designated currency type may be completely covered by currency value in the currency sub-account 2964 of the account holder account 2960. If so, then the PSE service center 1322 initiates an ACH, IAT or wire transfer to the merchant institution account for the total amount in the designated currency of the financial transaction as specified in the original merchant POS request for authorization. The PSE service center 1322 may additionally conduct foreign currency exchange between pairs of currencies for the currency in the currency sub-account 2964 to fulfill the financial transaction in the designated currency. The PSE service center 1322 may then debit the currency sub-account 2964 of the account holder account and thereafter communicate to the account holder 1302 via the account user interface 1318 to the account holder input device 1310 that the financial transaction with the merchant has been completed and the corresponding account holder account 2960 has been updated accordingly.

If the PSE service center 1322 determines that the value of currency sub-account 2964 of the account holder account 2960 is insufficient, either in whole or in part, to cover the total amount of the financial transaction in the designated currency type, the PSE service center 1322 may liquidate any necessary certified precious metal units in the certified precious metal unit sub-account 2962 of the account holder account 2960 to cover the complete amount of the financial transaction in the designated currency. The liquidation may be a sale of the liquidated certified precious metal units, either outside of the PSE system or by the PSE service center 1322 acting as a buyer to generate sale currency to be deposited into the currency sub-account 2694 of the account holder account 2960. The PSE service center 1322 may remove ownership information of the account holder on the liquidated certified precious metal units in the corresponding certified precious metal unit registration records 1326 as stored in the PSE registration database 1324.

The PSE service center 1322 may then initiate an ACH, IAT or wire transfer to the merchant institution account for the total amount in the designated currency of the financial transaction as specified in the original merchant POS request for authorization. The PSE service center 1322 may additionally conduct foreign currency exchange between pairs of currencies for the currency in the currency sub-account 2964 to fulfill the financial transaction in the designated currency. The PSE service center 1322 may then debit the currency sub-account 2964 of the account holder account and thereafter communicate to the account holder 1302 via the account user interface 1318 to the account holder input device 1310 that the financial transaction with the merchant has been completed and the corresponding account holder account 2960 has been updated to reflect the current balance of each sub-account of the certified precious metal units sub-account 2962 and the currency sub-account 2964.

FIG. 30 illustrates a method that may be conducted in the physical secure environment system 2900 of FIG. 29 comprising the following procedures:

- PSE account holder presents 3010 debit card to merchant POS device or POS API on e-commerce site;
- POS device or API transmits 3020 to PSE service center 1) transaction amount, 2) currency type, 3) merchant institution account no., and 4) PSE account holder account information;
- PSE service center verifies 3030 1) PSE account holder, and 2) transaction amount against PSE account holder account;
- PSE service center determines 3040 if a sufficient amount of currency type is in a currency sub-account of PSE account holder to cover the transaction amount;
- if sufficient currency to cover transaction amount, then transfer 3050 transaction amount via ACH/IAT or wire to merchant account designated from POS transferred information;
- if insufficient currency to cover transaction amount, then liquidate 3060 to currency value a quantity of certified precious metal units from the PSE account holder certified precious metal unit sub-account to cover the transaction amount in the currency type;
- transfer 3070 transaction amount via ACH/IAT or wire to merchant account designated from POS transferred information;
- determine 3080 if any remaining currency from the liquidation and deposit the remaining currency in the currency sub-account of the PSE account holder; and
- update 3090 PSE account holder account accordingly, and any corresponding certified precious metal unit records in the certified precious metal unit registry accordingly.

Figure 31:
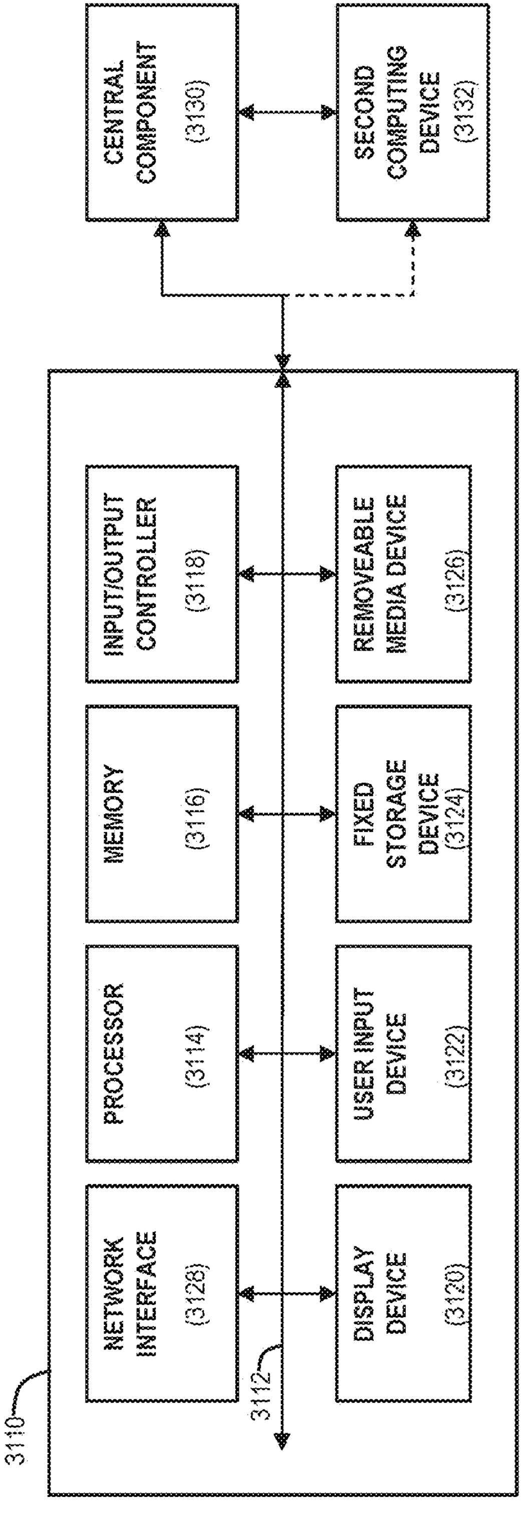
FIG. 31 illustrates a schematic diagram of an exemplary hardware environment that may be used to implement the aspects of the system as described in FIGS. 1-30.

With reference to FIG. 31, a schematic diagram illustrates an exemplary hardware environment that may be used to implement the above-identified aspects of the previous systems and methods of FIGS. 1-30.

Implementations of the presently disclosed subject matter may be implemented in and used with a variety of component and network architectures. FIG. 31 is an example computer environment 3100 and an example computer 3110 suitable for implementing implementations of the presently disclosed subject matter, particularly at the Country Y first PSE facility 1354, at the country Y first PSE precious metal processing facility 1356, at the Country Y first PSE certification facility 1358, at the Country Y first PSE shipping facility 1360, at the Country Y second PSE facility 1362, at the Y second PSE precious metal processing facility 1364, at the Y second PSE certification facility 1366, at the Y second PSE shipping facility 1368, at the Country Y third PSE 1370, at the Country Y first storage facility 1372, at the Country Y fourth PSE 1374, at the Country Y second storage facility 1376, at the Country Z first PSE 1384, at the country Z processing facility 1385, at the country Z certification facility 1386, at the country Z shipping facility 1387, at the Country Z second PSE 1388 and at the country Z storage facility 1389, as disclosed in each of the configurations of FIGS. 13, 17, 20, 23, 26 and 29.

As discussed in further detail herein, computer 3110 may be a single computer in a network of multiple computers. As shown in FIG. 31, computer 3110 may communicate with a central component 3130 (e.g., server, cloud server, database, etc.). The central component 3130 may communicate with one or more other computers such as the second computer 3132. According to this implementation, the information obtained to and/or from a central component 3130 may be isolated for each computer such that computer 3110 may not share information with second computer 3132. Alternatively, or in addition, computer 3110 may communicate directly with the second computer 3132.

The computer 3110, (e.g., user computer, enterprise computer, etc.), includes a bus 3112 which interconnects major components of the computer 3110, such as a central processor 3114, a memory 3116, (typically RAM, but which may also include ROM, flash RAM, or the like), an input/output controller 3118, a user display 3120, such as a display or touch screen via a display adapter, a user input interface 3122, which may include one or more controllers and associated user input or devices such as a keyboard, mouse, WIFI/cellular radios, touchscreen, microphone/speakers and the like, and may be closely coupled to the input/output controller 3118, fixed storage 3124, such as a hard drive, flash storage, Fiber Channel network, SAN device, SCSI device, and the like, and a removable media storage device 3126 operative to control and receive an optical disk, flash drive, and the like.

The bus 3112 enables data communication between the central processor 3114 and the memory 3116, which may include read-only memory (ROM) or flash memory (neither shown), and random-access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 3110 can be stored on and accessed via a computer readable medium, such as a hard disk drive, (e.g., fixed storage 3124), an optical drive, floppy disk, or another removable media storage device 3126.

The fixed storage 3124 may be integrated with the computer 3110 or may be separate and accessed through other interfaces. A network interface 3128 may provide a direct connection to a remote server via a telephone link, to the Internet via an internet service provider (ISP), or a direct connection to a remote server via a direct network link to the Internet via a POP (point of presence) or other technique. The network interface 3128 may provide such connection using wireless techniques, including digital cellular telephone connection, Cellular Digital Packet Data (CDPD) connection, digital satellite data connection or the like. For example, the network interface 3128 may enable the computer to communicate with other computers via one or more local, wide-area, or other networks.

Many other devices or components (not shown) may be connected in a similar manner (e.g., document scanners, digital cameras and so on). Conversely, all of the components shown in FIG. 31 need not be present to practice the present disclosure. The components can be interconnected in different ways from that shown. The operation of a computer such as that shown in FIG. 31 is readily known in the art and is not discussed in detail in this application. Code to implement the present disclosure can be stored in computer-readable storage media such as one or more of the memory 3116, fixed storage 3124, removable media storage device 3126, or on a remote storage location.

The foregoing description, for purposes of explanation, has been described with reference to specific arrangements and configurations. However, the illustrative examples provided herein are not intended to be exhaustive or to limit aspects of the disclosed subject matter to the precise forms disclosed. Many modifications and variations are possible in view of the disclosure provided herein. The aspects and arrangements were chosen and described in order to explain the principles of aspects of the disclosed subject matter and their practical applications. Various modifications may be used without departing from the scope or content of the disclosure and claims presented herein.

The invention claimed is:

1. A physical secure environment (PSE) system comprising:

a PSE service center configured to receive a conversion form from a PSE account holder, the conversion form including information regarding non-PSE precious metal of the PSE account holder received by a PSE processing facility and configured to be stored a target PSE storage facility after conversion into and certification of predetermined uniform characteristics;

the PSE processing facility further configured to:

convert the non-PSE precious metal of the PSE account holder into a certified precious metal unit per the information from the conversion form, wherein the certified precious metal unit includes the predetermined uniform characteristics of precious metal type, material quality, and weight; and determine a conversion cost of the non-PSE precious metal of the PSE account holder and either reduce an amount of certified precious metal units held by the PSE account holder by the conversion cost or invoice the PSE account holder with the conversion cost for payment in a currency; and a PSE certification facility configured to:

certify the converted precious metal unit providing an instruction to an equipment disposed in the PSE certification facility to engrave at least one unique serialized indicium on at least one of the certified precious metal unit and mark the at least one unique serialized indicium on a container configured to securely hold the certified precious metal unit;

transmit certification information of the certified precious metal unit to the PSE service center to create a corresponding certified precious metal unit record for storage in a certified precious metal unit registry; and ship the certified precious metal unit to the target PSE storage facility;

the target PSE storage facility, upon receipt of the certified precious metal unit, is configured to transmit storage status information to the PSE service center thereby to update storage location information in the corresponding certified precious metal unit record in the certified precious metal unit registry; and the PSE service center, upon receipt of the certified precious metal unit at the target PSE storage facility, is configured to update a PSE account holder account with information from the corresponding certified precious metal unit record.

2. A method of operating a physical secure environment (PSE) system, the method comprising:

providing a PSE service center to receive a conversion form from a PSE account holder, the conversion form including information regarding non-PSE precious metal of the PSE account holder received by a PSE processing facility and configured to be stored a target PSE storage facility after conversion into and certification of predetermined uniform characteristics;

providing the PSE processing facility to:

convert the received PSE account holder non-PSE precious metal into a certified precious metal unit per the information from the conversion form, wherein the certified precious metal unit includes the predetermined uniform characteristics of precious metal type, material quality, and weight; and determine a conversion cost of the non-PSE precious metal of the PSE account holder and either reduce an amount of certified precious metal units held by the PSE account holder by the conversion cost or invoice the PSE account holder with the conversion cost for payment in a currency; and providing a PSE certification facility to:

certify the converted precious metal unit by providing an instruction to an equipment disposed in the PSE certification facility to engrave at least one unique serialized indicium on at least one of the certified precious metal unit and mark the at least one unique serialized indicium on a container configured to securely hold the certified precious metal unit;

transmit certification information of the certified precious metal unit to the PSE service center to create a corresponding certified precious metal unit record for storage in a certified precious metal unit registry; and ship the certified precious metal unit to the target PSE storage facility;

the target PSE storage facility, upon receipt of the certified precious metal unit, transmits storage status information to the PSE service center thereby to update storage location information in the corresponding certified precious metal unit record in the certified precious metal unit registry; and the PSE service center, upon receipt of the certified precious metal unit at the target PSE storage facility, updates a PSE account holder account with information from the corresponding certified precious metal unit record.

* * * * *